(12) United States Patent
Sridharan et al.

(10) Patent No.: US 12,354,001 B2
(45) Date of Patent: *Jul. 8, 2025

(54) HARDWARE IMPLEMENTED POINT TO POINT COMMUNICATION PRIMITIVES FOR MACHINE LEARNING

(71) Applicant: Intel Corporation, Santa Clara, CA (US)

(72) Inventors: Srinivas Sridharan, Bangalore (IN); Karthikeyan Vaidyanathan, Bangalore (IN); Dipankar Das, Pune (IN)

(73) Assignee: Intel Corporation, Santa Clara, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 17/972,832

(22) Filed: Oct. 25, 2022

(65) Prior Publication Data
US 2023/0177328 A1 Jun. 8, 2023

Related U.S. Application Data

(62) Division of application No. 15/869,510, filed on Jan. 12, 2018, now Pat. No. 11,488,008.

(60) Provisional application No. 62/502,447, filed on May 5, 2017.

(51) Int. Cl.
| | |
|---|---|
| *G06N 3/08* | (2023.01) |
| *G06F 9/54* | (2006.01) |
| *G06N 3/04* | (2023.01) |
| *G06N 3/045* | (2023.01) |
| *G06N 3/063* | (2023.01) |
| *G06N 3/084* | (2023.01) |

(52) U.S. Cl.
CPC ............... *G06N 3/08* (2013.01); *G06F 9/547* (2013.01); *G06N 3/04* (2013.01); *G06N 3/045* (2023.01); *G06N 3/063* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 7,873,812 B1 | 1/2011 | Mimar | |
| 9,244,958 B1* | 1/2016 | MacCanti | ............. G06F 16/273 |
| 10,528,864 B2 | 1/2020 | Dally et al. | |

(Continued)

OTHER PUBLICATIONS

Message Passing Interface Forum (MPIF). MPI: A Message-Passing Interface Standard, ver. 3.1, Jun. 4, 2015, available at: https://www.mpi-forum.org/docs/mpi-3.1/mpi31-report.pdf, accessed Jan. 12, 22, 868 pages. (Year: 2015).*

(Continued)

*Primary Examiner* — Vincent Gonzales
(74) *Attorney, Agent, or Firm* — Jaffery Watson Hamilton & DeSanctis LLP

(57) ABSTRACT

One embodiment provides for a graphics processing unit including a fabric interface configured to transmit gradient data stored in a memory device of the graphics processing unit according to a pre-defined communication operation. The memory device is a physical memory device shared with a compute block of the graphics processing unit and the fabric interface. The fabric interface automatically transmits the gradient data stored in memory to a second distributed training node based on an address of the gradient data in the memory device.

20 Claims, 56 Drawing Sheets

(56) References Cited

U.S. PATENT DOCUMENTS

| | | | |
|---|---|---|---|
| 10,860,922 | B2 | 12/2020 | Dally et al. |
| 10,891,538 | B2 | 1/2021 | Dally et al. |
| 2016/0062947 | A1 | 3/2016 | Chetlur et al. |
| 2016/0321776 | A1* | 11/2016 | Zou .................. G06F 9/522 |
| 2017/0091615 | A1 | 3/2017 | Liu et al. |
| 2018/0046906 | A1 | 2/2018 | Dally et al. |

OTHER PUBLICATIONS

Strom N., Scalable distributed DNN training using commodity GPU cloud computing. In Sixteenth Annual Conference of the International Speech Communication Association 2015. (Year: 2015).*

Goodfellow, et al. "Adaptive Computation and Machine Learning Series", Book, Nov. 18, 2016, pp. 98-165, Chapter 5, The MIT Press, Cambridge, MA.

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junkins, "The Compute Architecture of Intel Processor Graphics Gen9", paper, Aug. 14, 2015, 22 pages, Version 1.0, Intel Corporation, Santa Clara, CA.

Notification of CN Publication for CN Application No. 201810419238.6 (Pub No. 108805795A), 119 pages, Nov. 13, 2018.

Notice of Allowance for U.S. Appl. No. 15/869,510, mailed Jun. 24, 2022, 8 pages.

Keuper et al., "Asynchronous Parallel Stochastic Gradient Descent", A Numeric Core for Scalable Distributed Machine Learning Algorithms, Nov. 15-20, 2015, 11 pages.

Notice of Allowance for CN201810419238.6, mailed Aug. 16, 2024, 3 pages.

Office Action for CN201810419238.6, mailed Jun. 19, 2024, 7 pages, to include CN language OA and reporting letter. No exact translation of OA.

* cited by examiner

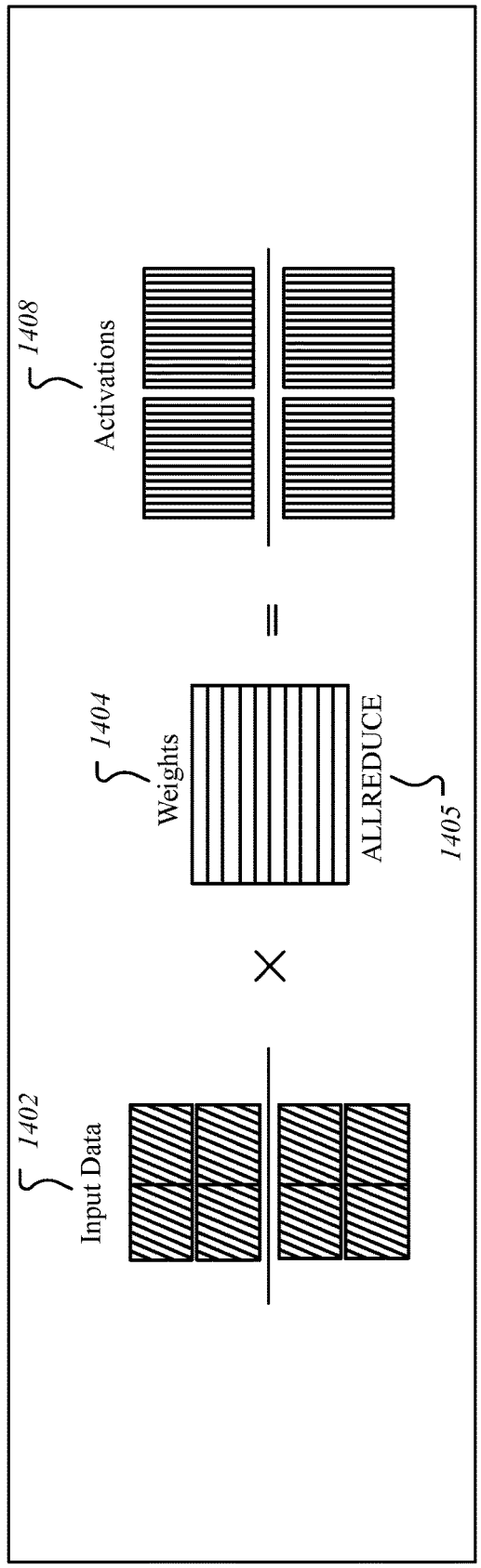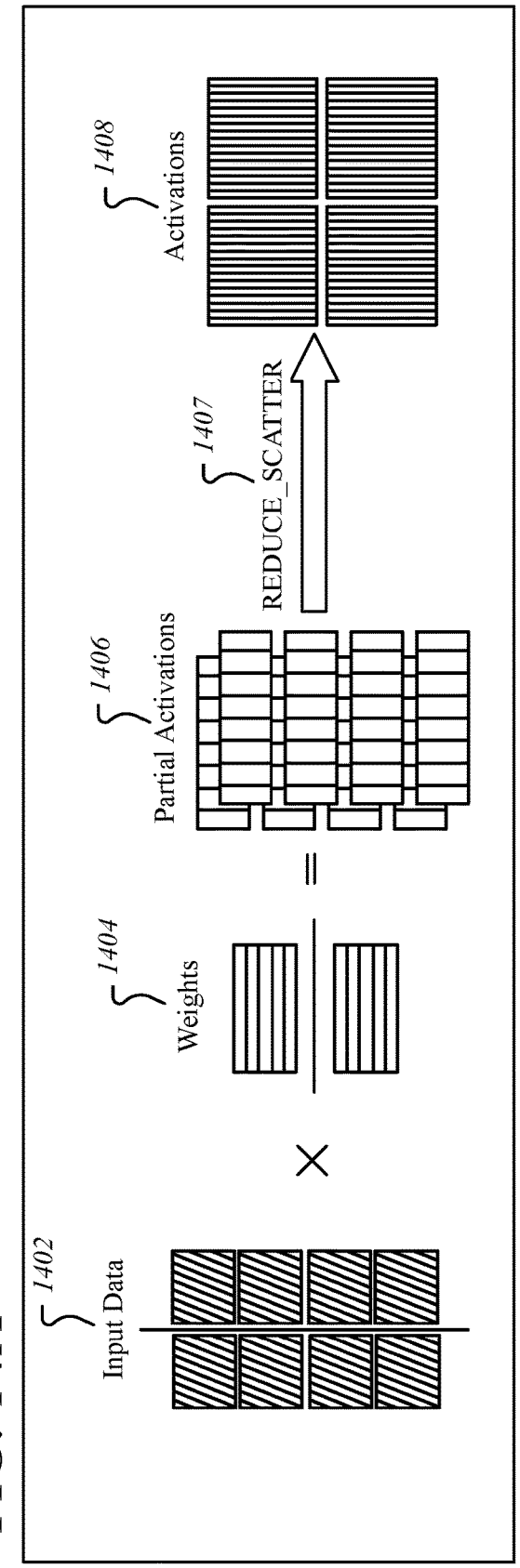
FIG. 14A
FIG. 14B

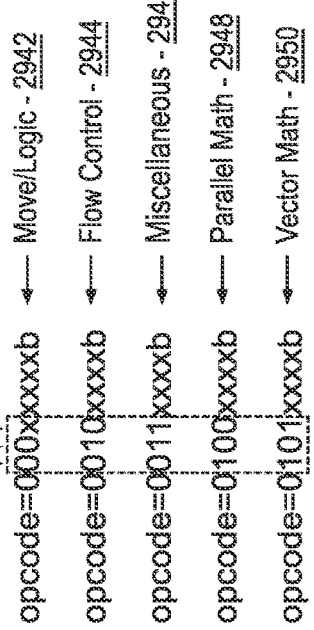
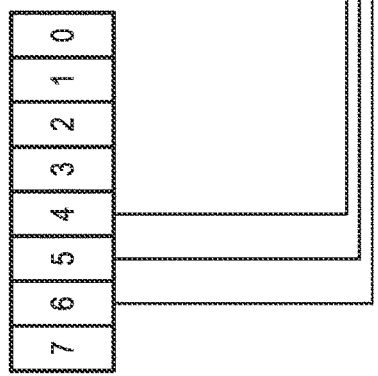
FIG. 29

FIG. 31A GRAPHICS PROCESSOR COMMAND FORMAT
3100
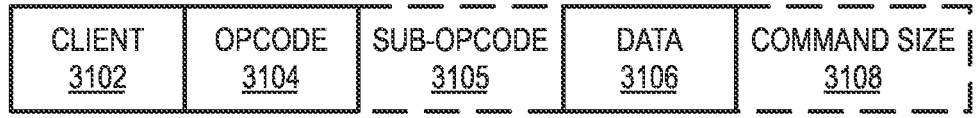
FIG. 31B GRAPHICS PROCESSOR COMMAND SEQUENCE
3110
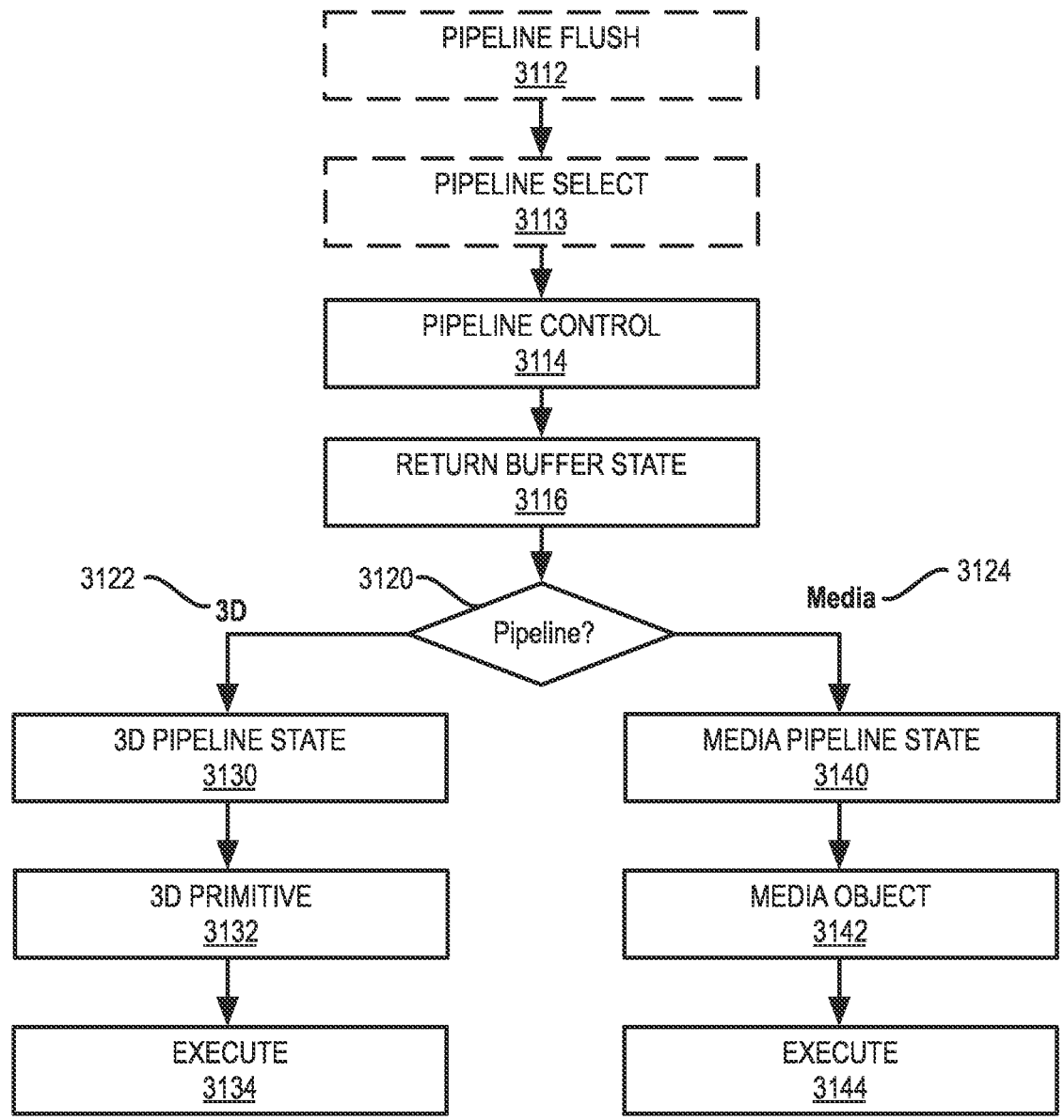

HARDWARE IMPLEMENTED POINT TO POINT COMMUNICATION PRIMITIVES FOR MACHINE LEARNING

CROSS-REFERENCE

The present application is a divisional application claiming priority from U.S. application Ser. No. 15/869,510, filed Jan. 12, 2018, issued as U.S. Pat. No. 11,488,008, which claims the benefit of U.S. Provisional Patent Application No. 62/502,447 filed May 5, 2017, the disclosure of which is incorporated by reference herein in its entirety.

FIELD

Embodiments relate generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming*, Chapter 3, pages 37-51 (2013) and/or Nicholas Wilt, *CUDA Handbook, A Comprehensive Guide to GPU Programming*, Sections 2.6.2 to 3.1.2 (June 2013).

BRIEF DESCRIPTION OF THE DRAWINGS

So that the features of the inventive concepts described herein can be understood in detail, a more particular description of may be had by reference to embodiments, some of which are illustrated in the appended drawings. It is to be noted, however, that the appended drawings illustrate only typical embodiments and are therefore not to be considered limiting of the scope of all embodiments.

FIG. 14A-14E illustrate communication patterns used during distributed machine learning compute operations performed across multiple compute nodes, according to embodiments described herein;

FIG. 29 is a block diagram illustrating graphics processor instruction formats according to some embodiments;

FIG. 31A-31B illustrate a graphics processor command format and command sequence, according to some embodiments;

DETAILED DESCRIPTION

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
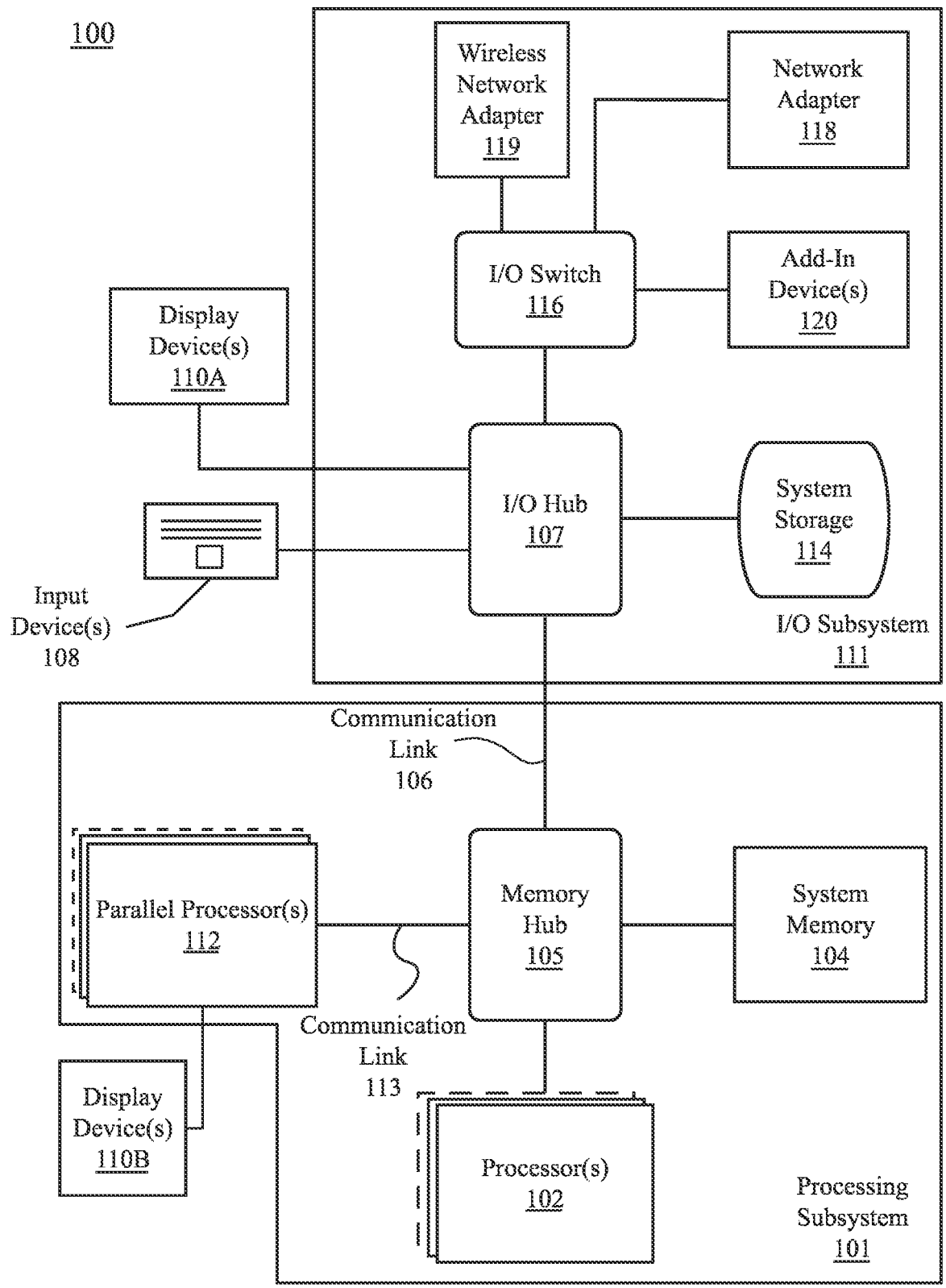
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that can include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
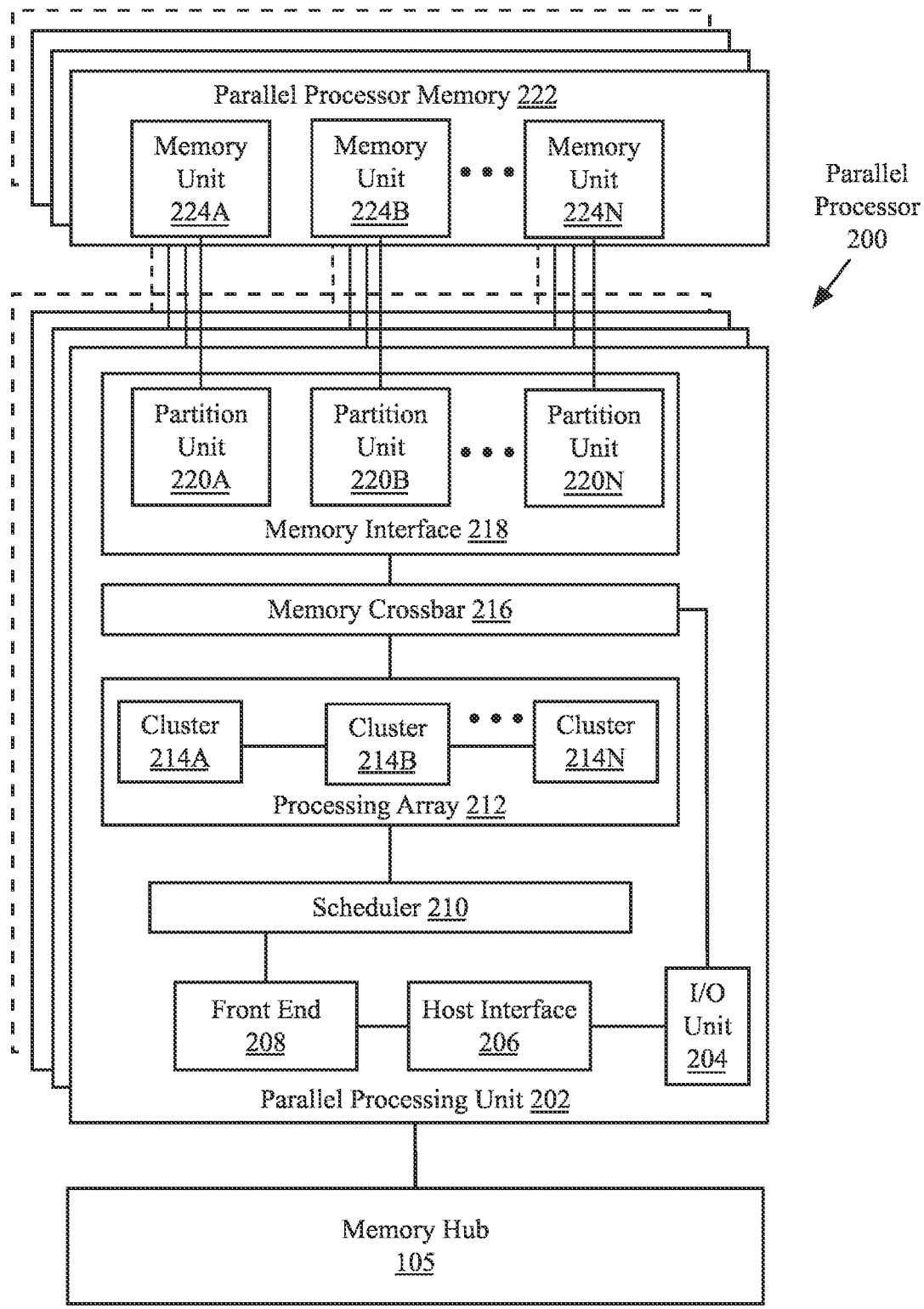
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212. In one embodiment the scheduler 210 is implemented via firmware logic executing on a microcontroller. The microcontroller implemented scheduler 210 is configurable to perform complex scheduling and work distribution operations at coarse and fine granularity, enabling rapid preemption and context switching of threads executing on the processing array 212. In one embodiment, the host software can prove workloads for scheduling on the processing array 212 via one of multiple graphics processing doorbells. The workloads can then be automatically distributed across the processing array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example, in one embodiment some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
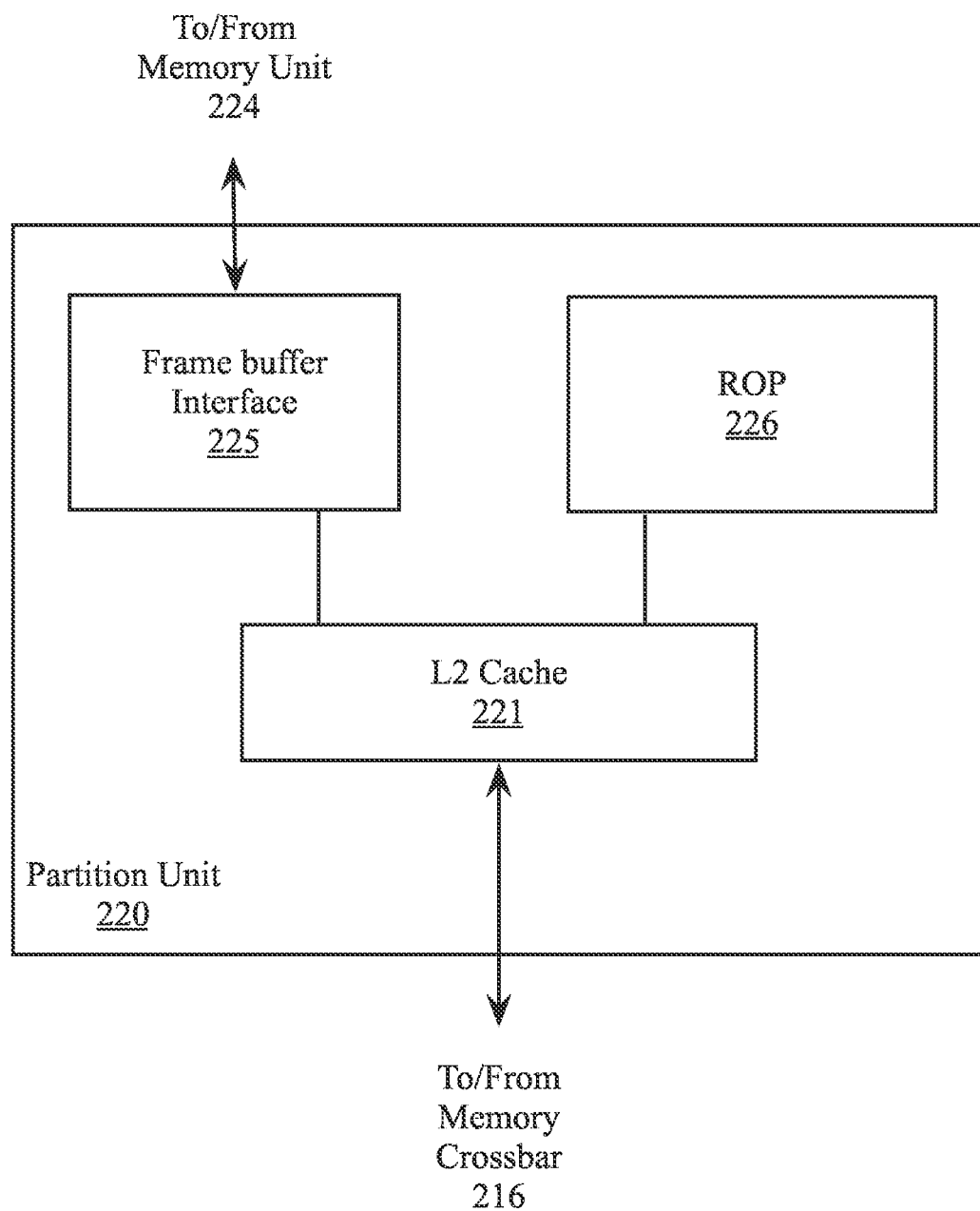

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110A-110B of FIG. 1, routed for further processing by the processor(s) 102, or routed for further processing by one of the processing entities within the parallel processor 200 of FIG. 2A.

Figure 2C:
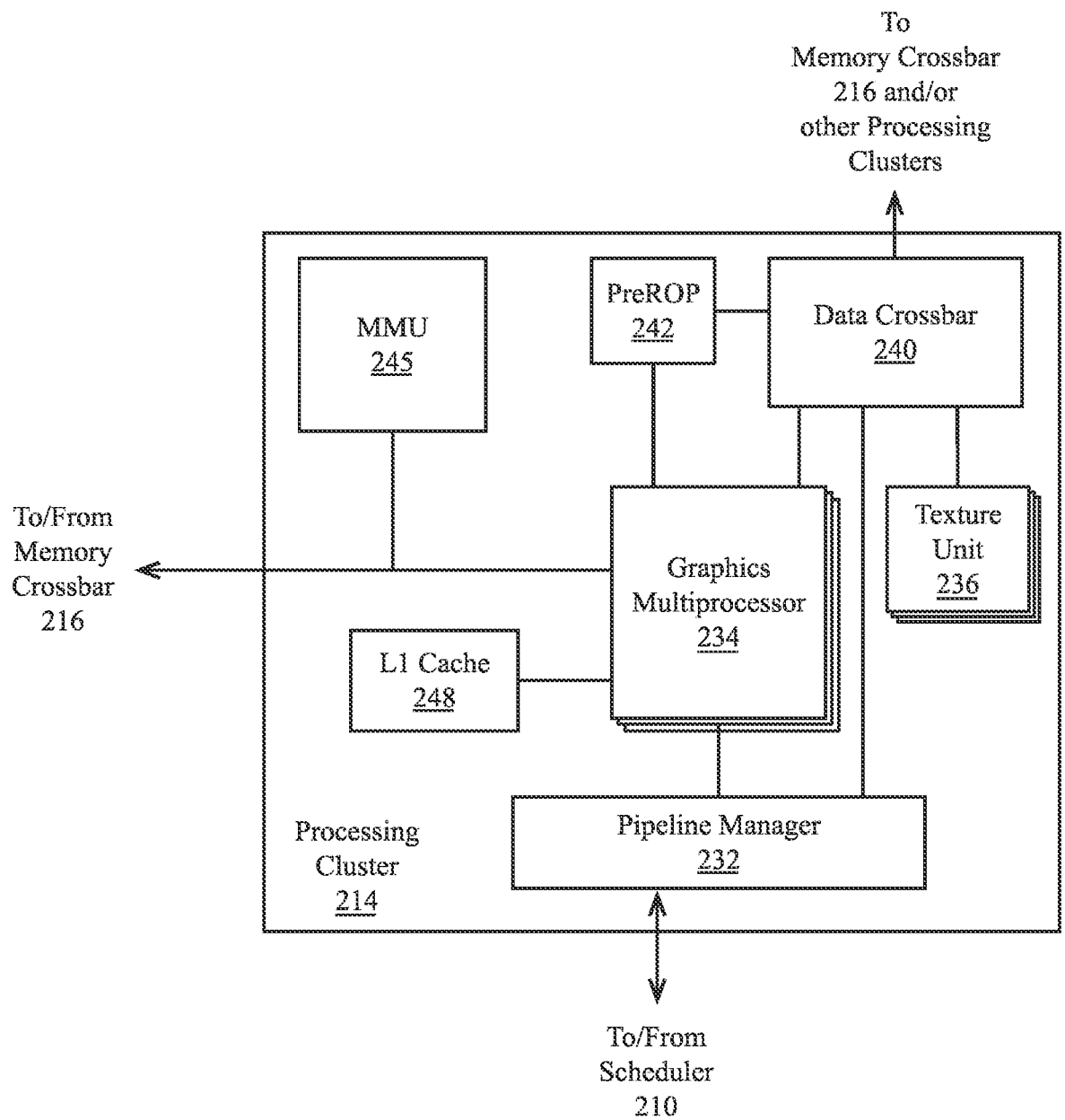

FIG. 2C is a block diagram of a processing cluster 214 within a parallel processing unit, according to an embodiment. In one embodiment the processing cluster is an instance of one of the processing clusters 214A-214N of FIG. 2A. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment multiple thread groups can be executed concurrently on a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
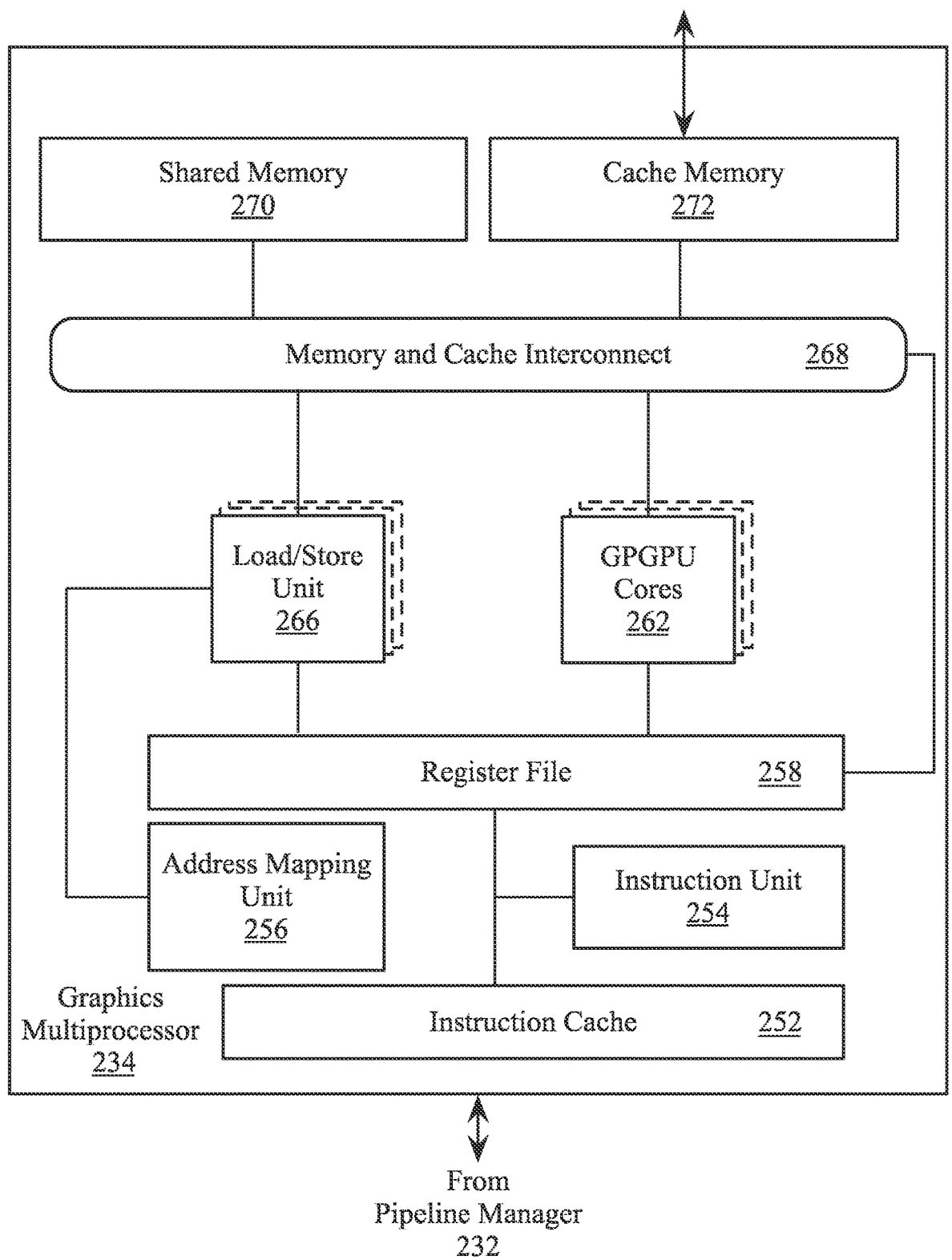

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. In one embodiment, the register file 258 is divided between each of the functional units such that each functional unit is allocated a dedicated portion of the register file 258. In one embodiment, the register file 258 is divided between the different warps being executed by the graphics multiprocessor 234.

The GPGPU cores 262 can each include floating point units (FPUs) and/or integer arithmetic logic units (ALUs) that are used to execute instructions of the graphics multiprocessor 234. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 234 can additionally include one or more fixed function or special function units to perform specific functions such as copy rectangle or pixel blending operations. In one embodiment one or more of the GPGPU cores can also include fixed or special function logic.

In one embodiment the GPGPU cores 262 include SIMD logic capable of performing a single instruction on multiple sets of data. In one embodiment GPGPU cores 262 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. Threads executing on the GPGPU cores 262 can programmatically store data within the shared memory in addition to the automatically cached data that is stored within the cache memory 272.

Figure 3A:
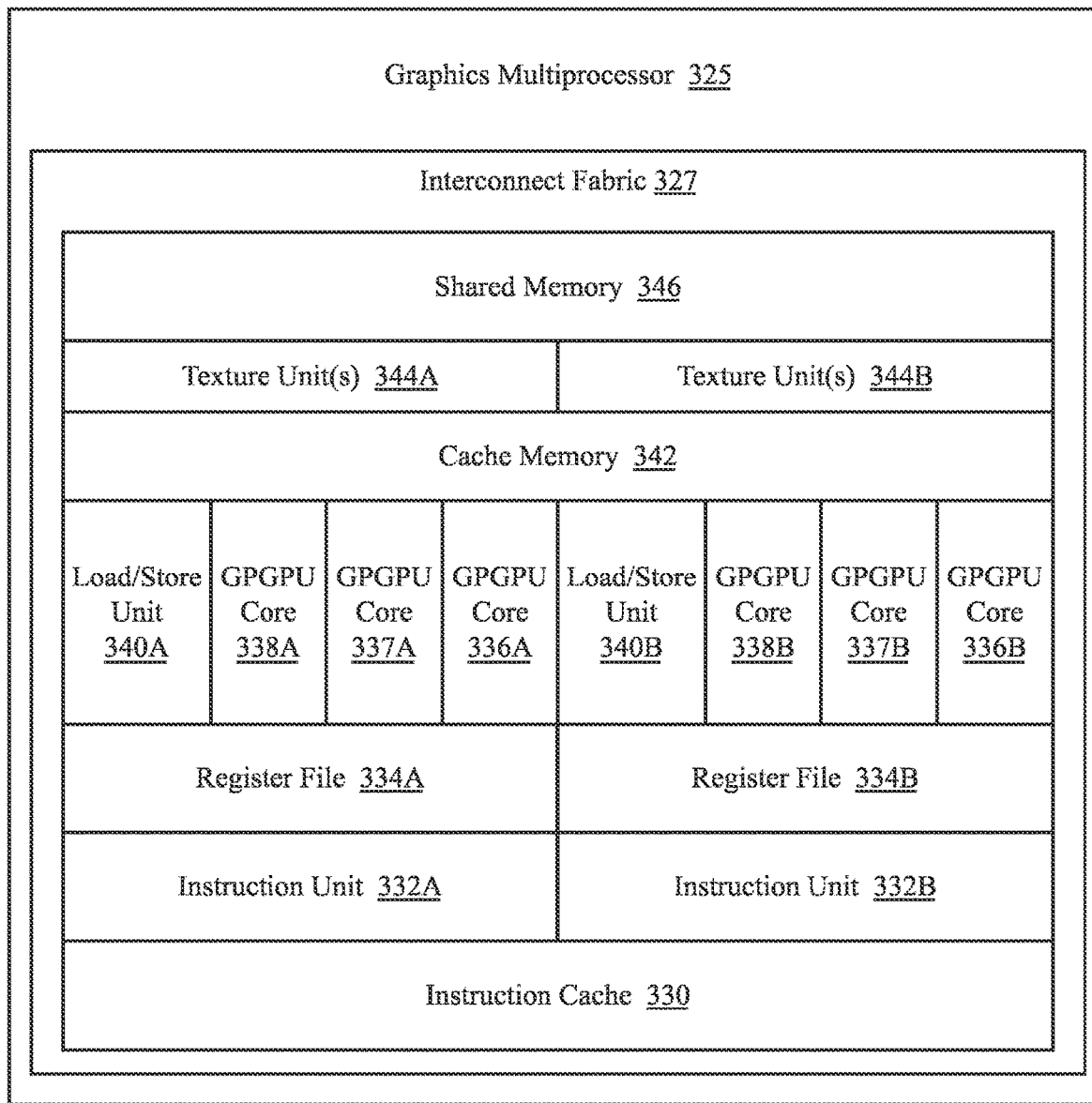
FIG. 3A-3B are block diagrams of graphics multiprocessors, according to embodiments.
Figure 3B:
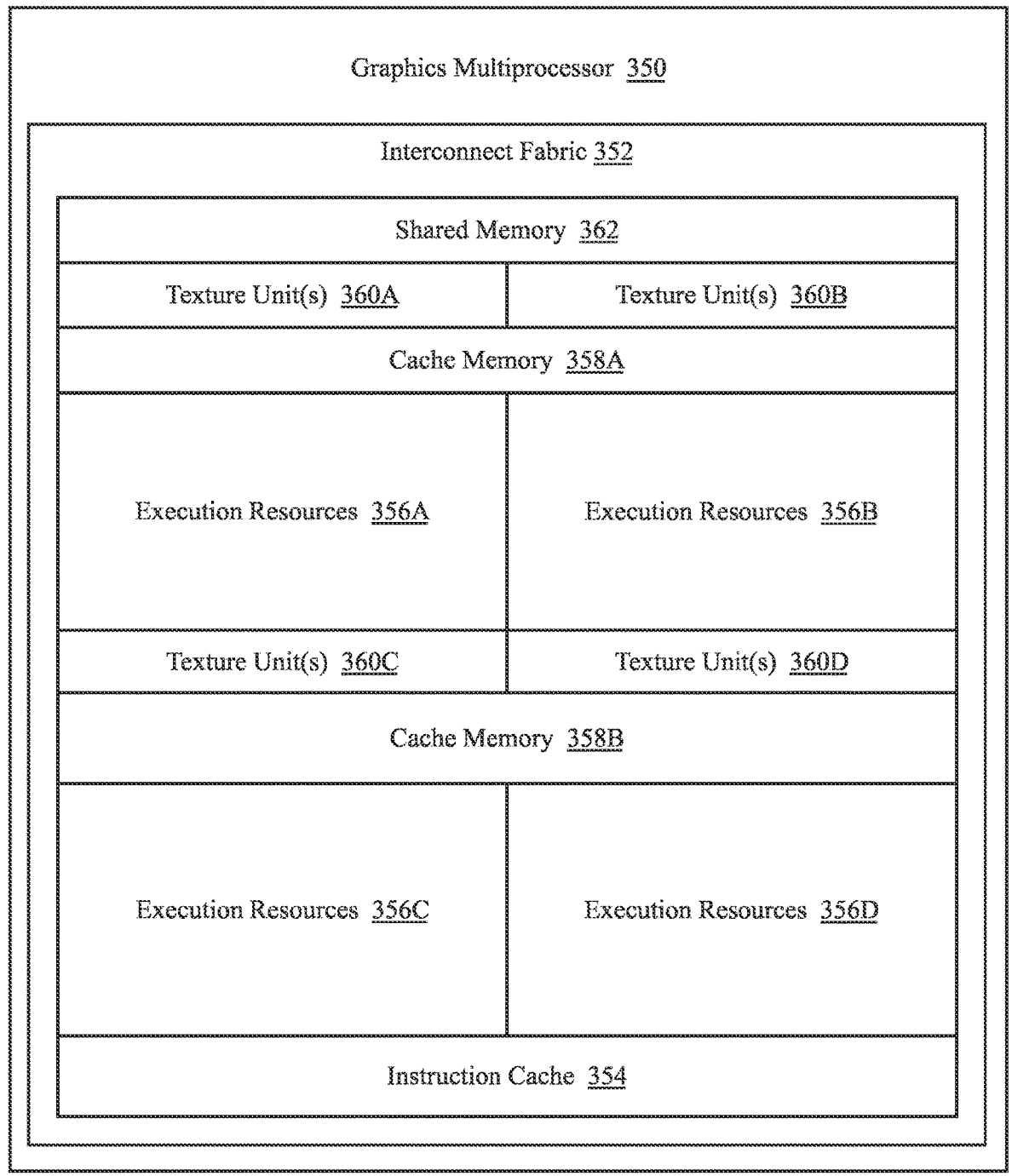

FIG. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346.

The various components can communicate via an interconnect fabric 327. In one embodiment the interconnect fabric 327 includes one or more crossbar switches to enable communication between the various components of the graphics multiprocessor 325. In one embodiment the interconnect fabric 327 is a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
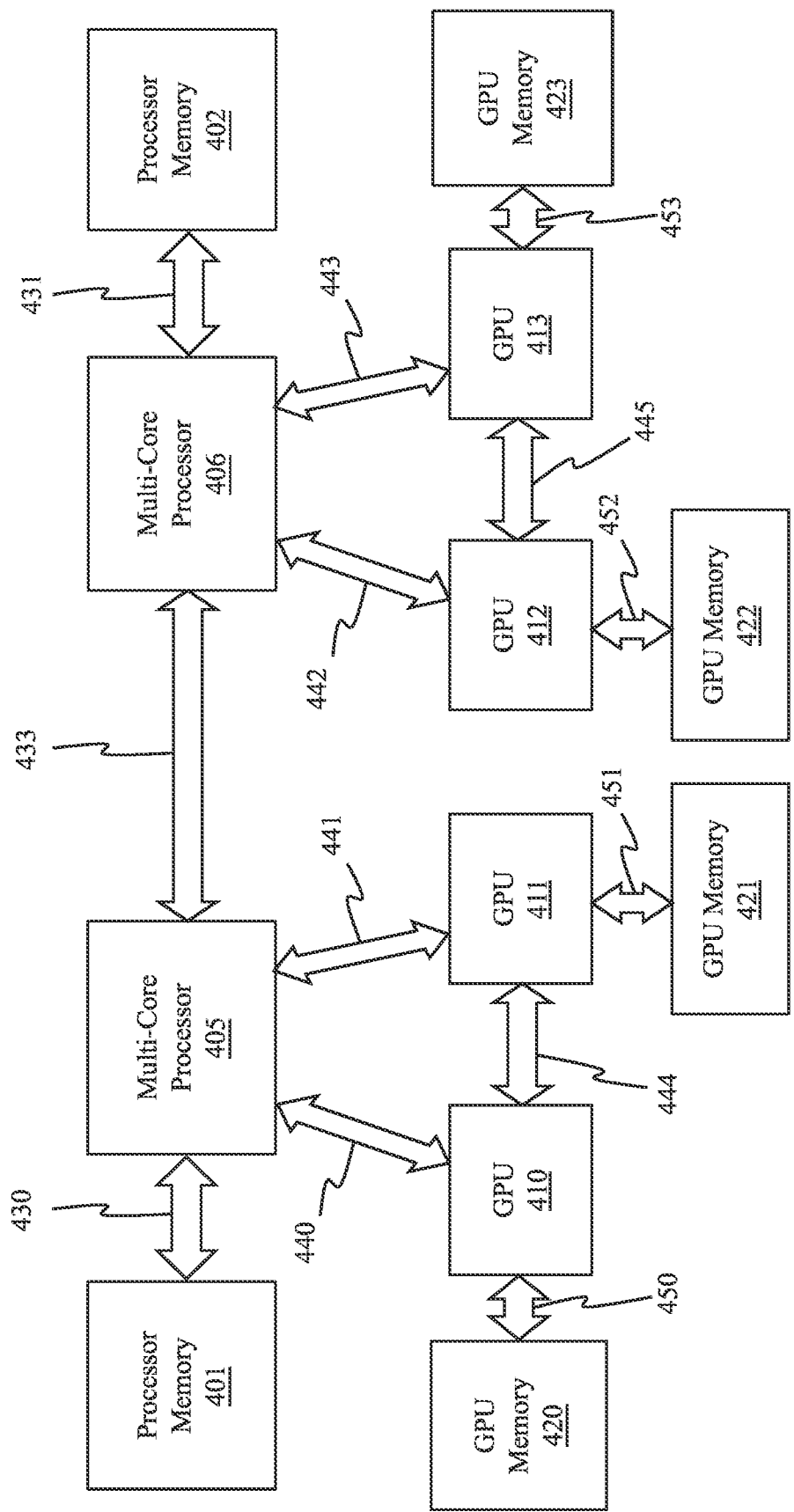
FIG. 4A-4F illustrate an exemplary architecture in which a plurality of GPUs is communicatively coupled to a plurality of multi-core processors.

FIG. 4A illustrates an exemplary architecture in which a plurality of GPUs 410-413 are communicatively coupled to a plurality of multi-core processors 405-406 over high-speed links 440A-440D (e.g., buses, point-to-point interconnects, etc.). In one embodiment, the high-speed links 440A-440D support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each of multi-core processor 405 and multi-core processor 406 is communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
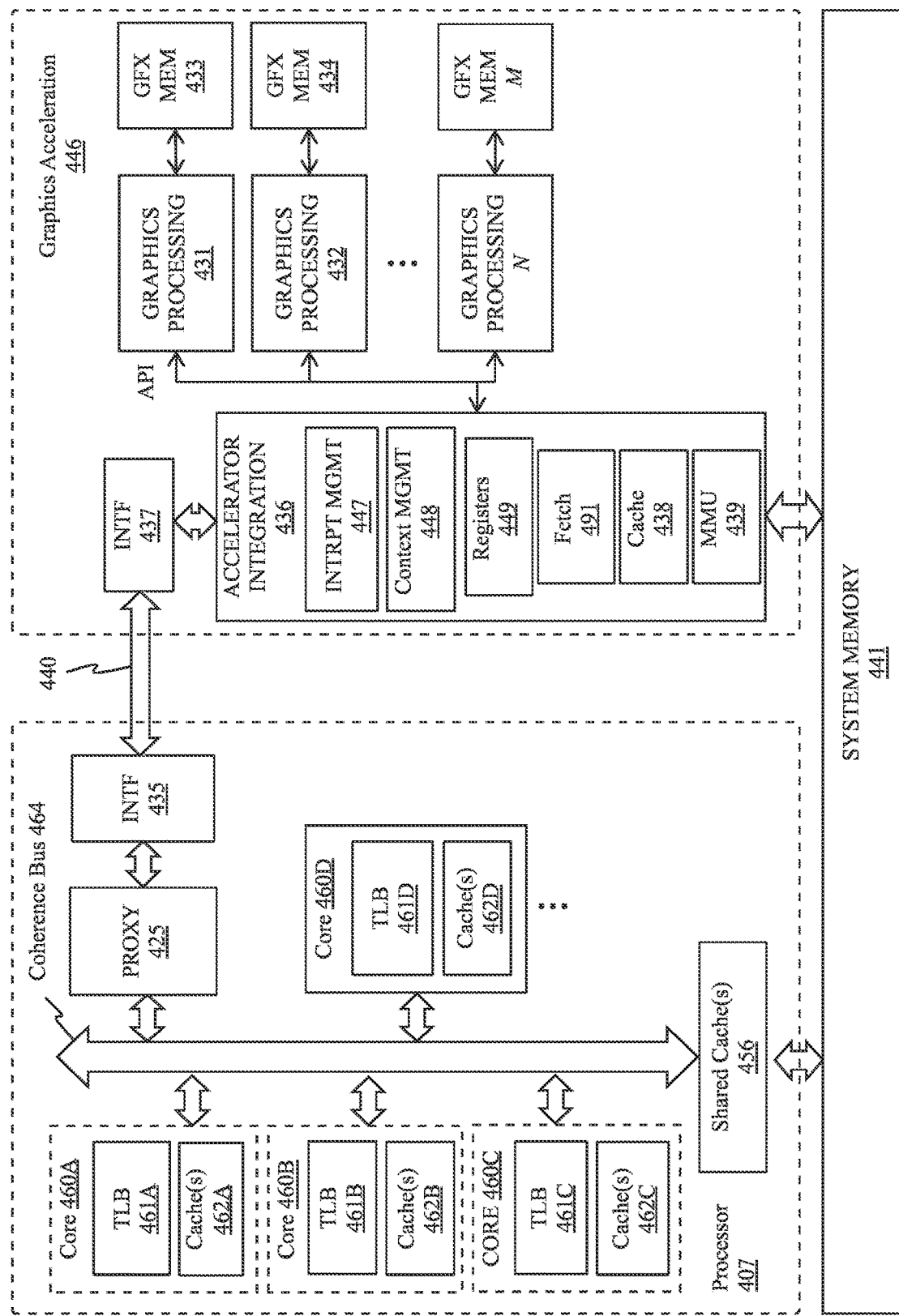

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440

(e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one embodiment, the accelerator integration circuit 436 includes a fetch unit 491 to fetch commands, instructions, work descriptors, etc., that define operations to be performed. In one implementation, a cache 438 stores commands and data for efficient access by the graphics processing engines 431-432, N. In one embodiment, the data stored in cache 438 and graphics memories 433-434, M is kept coherent with the core caches 462A-462D, 456 and system memory 411. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over the high-speed link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

Figure 4C:
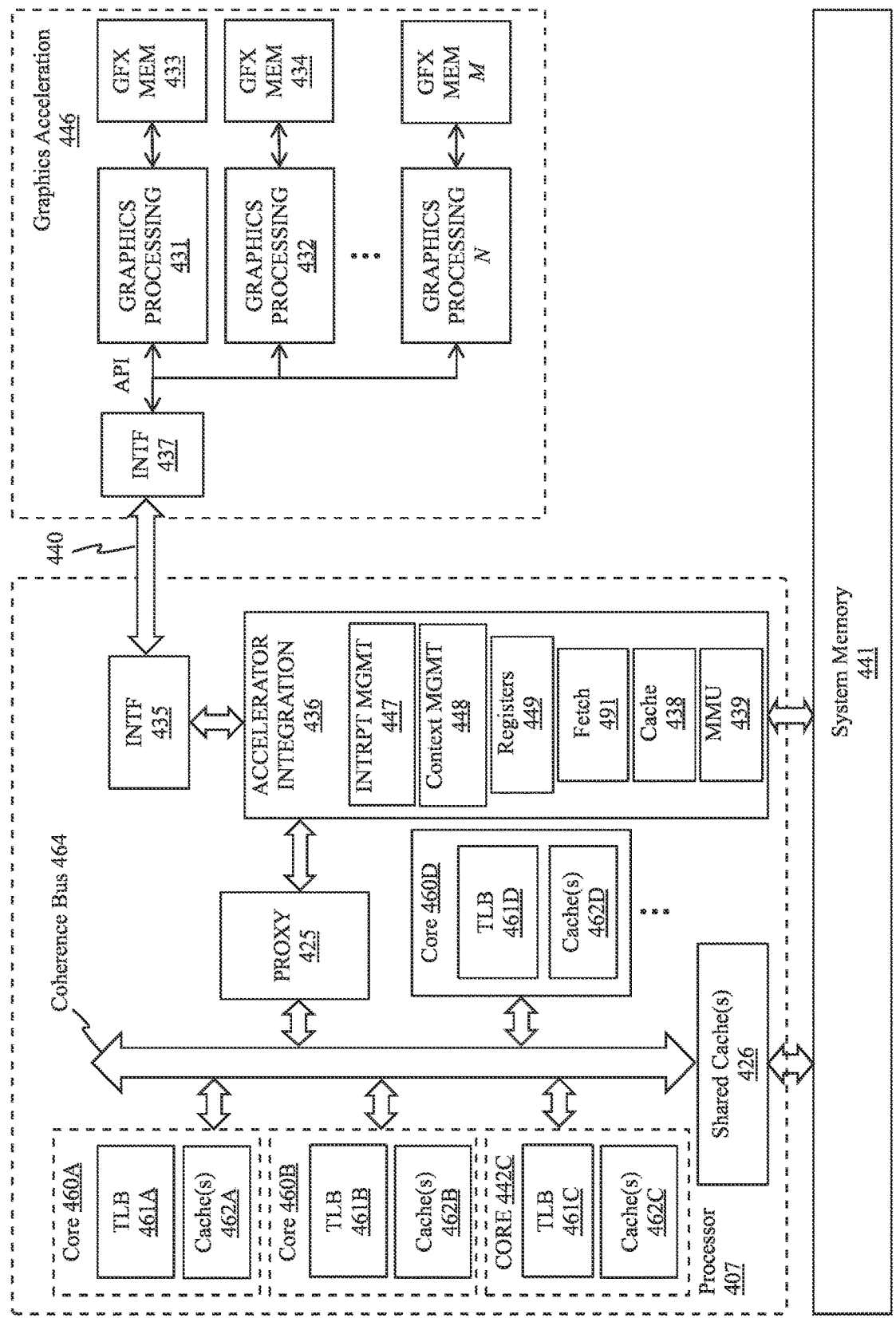

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherence bus 464 and caches 462A-462D, 456.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 411 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
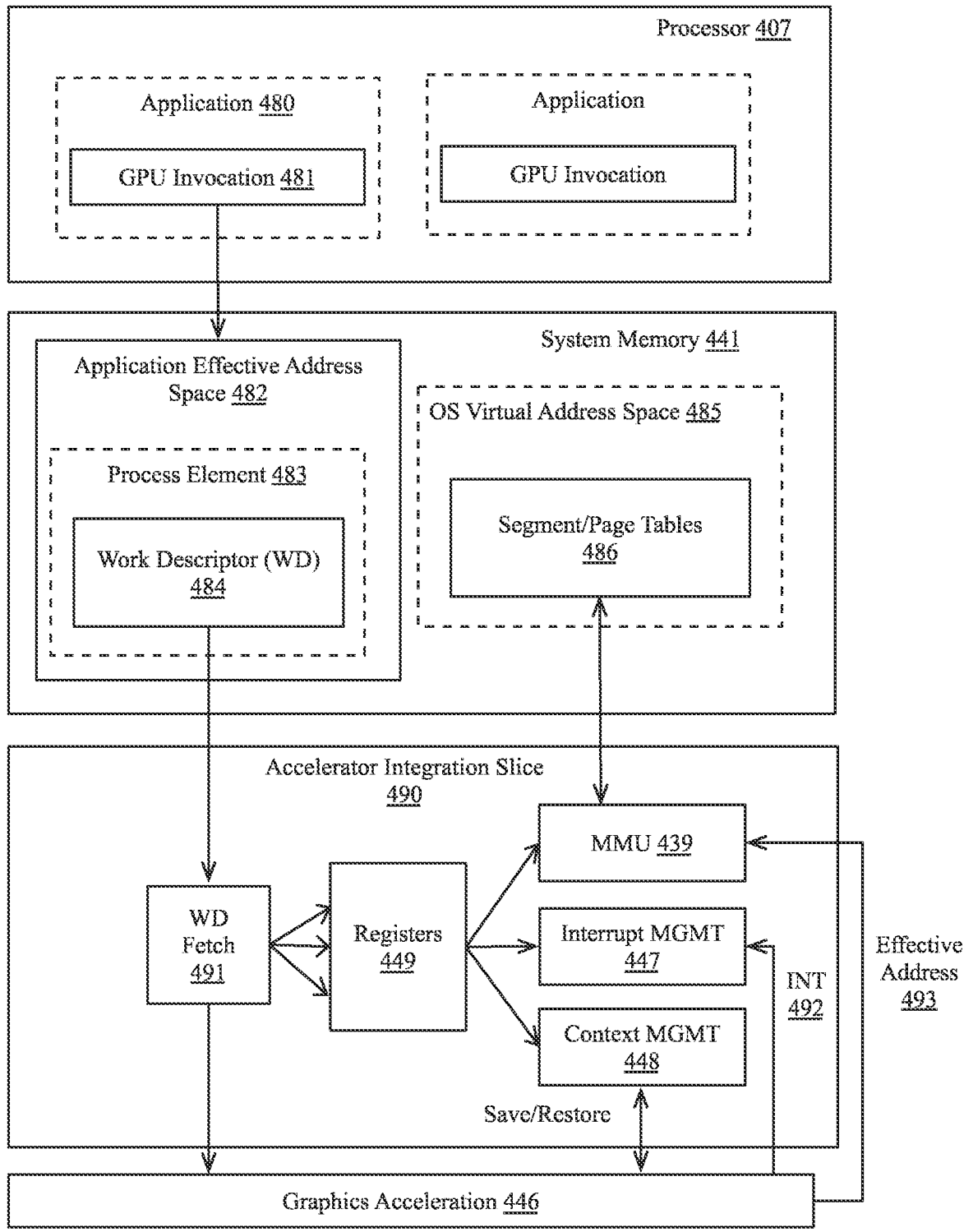

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
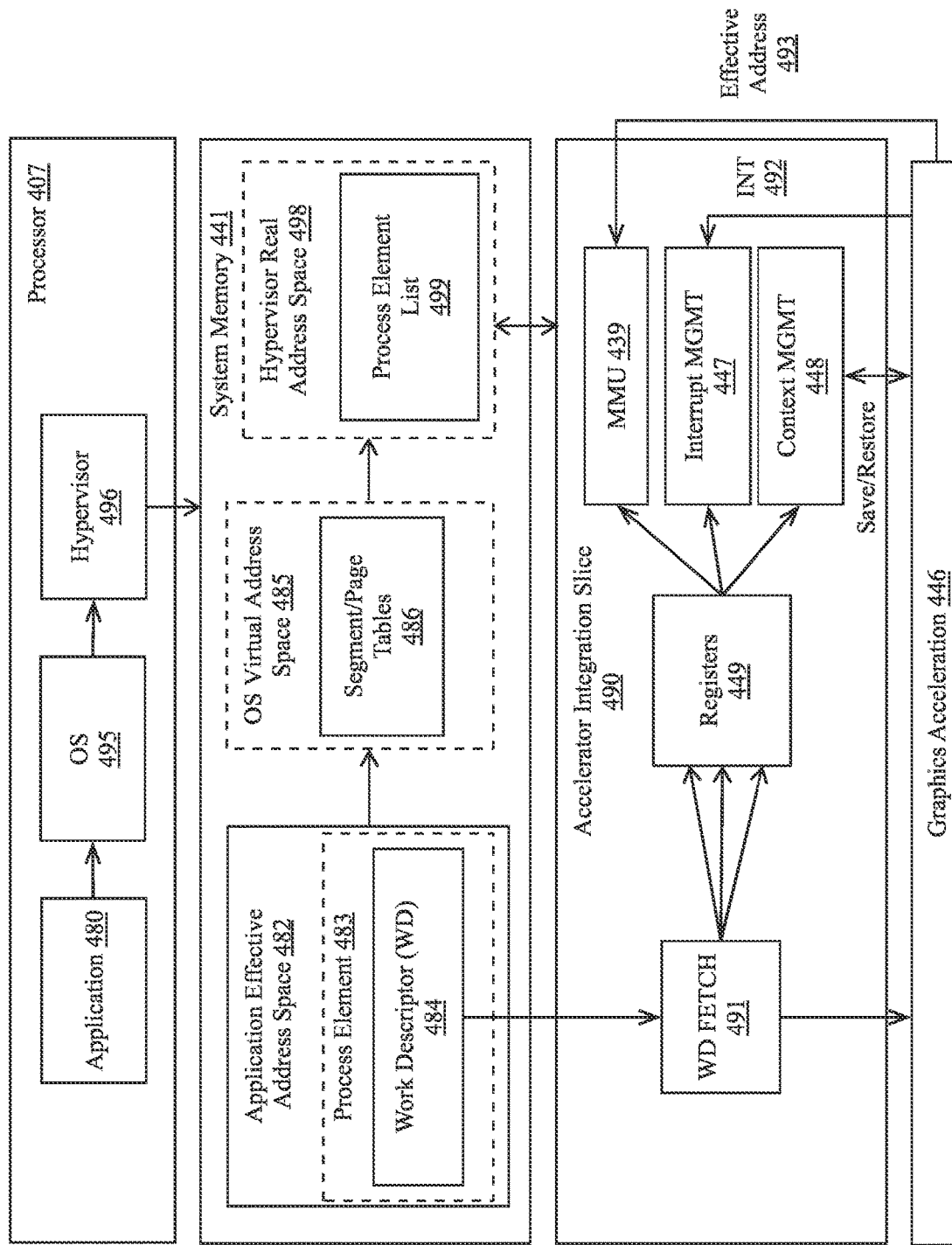

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |
| 8 | Interrupt vector table, derived from the hypervisor call parameters. |
| 9 | A state register (SR) value |
| 10 | A logical partition ID (LPID) |
| 11 | A real address (RA) hypervisor accelerator utilization record pointer |
| 12 | The Storage Descriptor Register (SDR) |

In one embodiment, the hypervisor initializes a plurality of accelerator integration slice 490 registers 445.

Figure 4F:
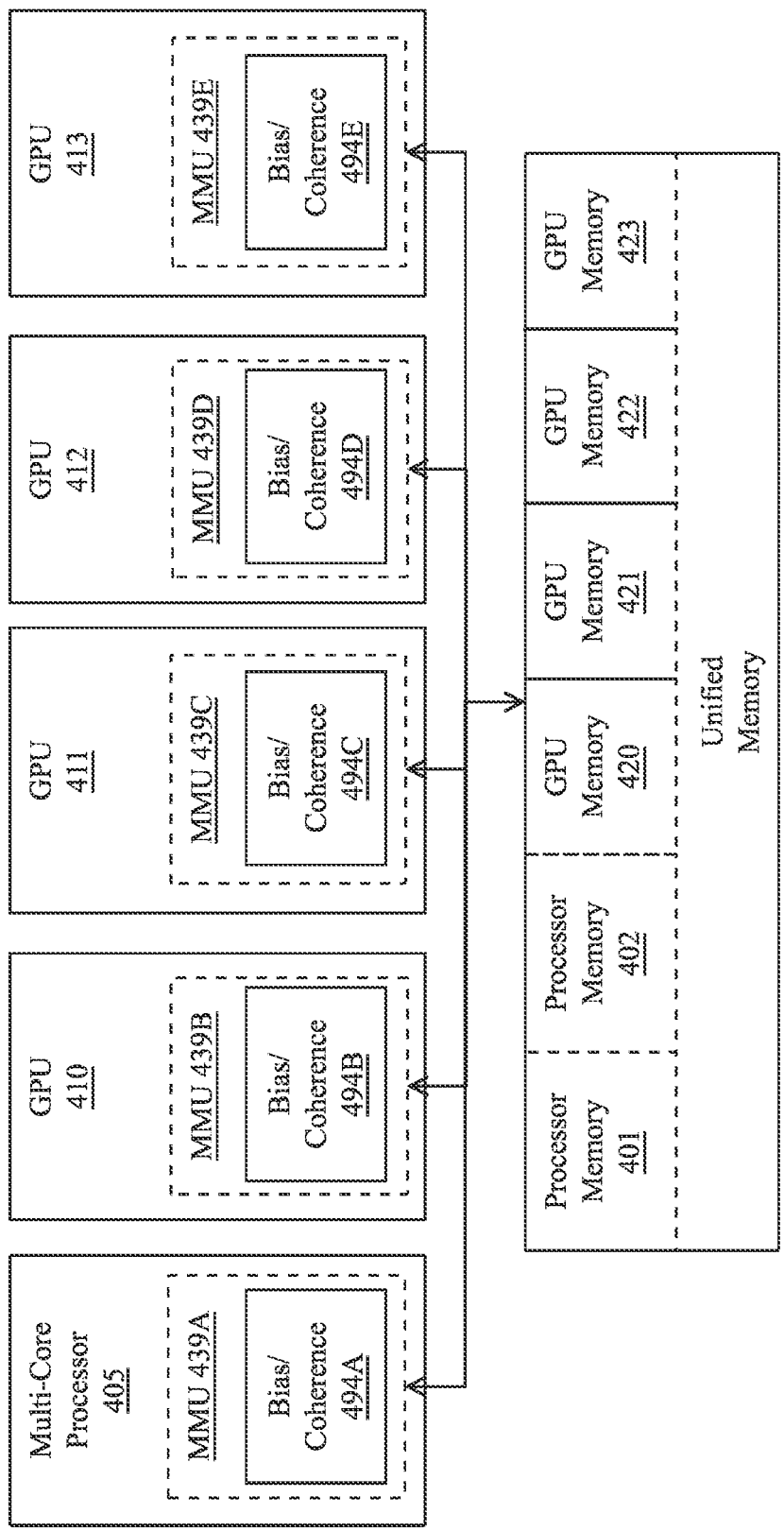

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

Figure 5:
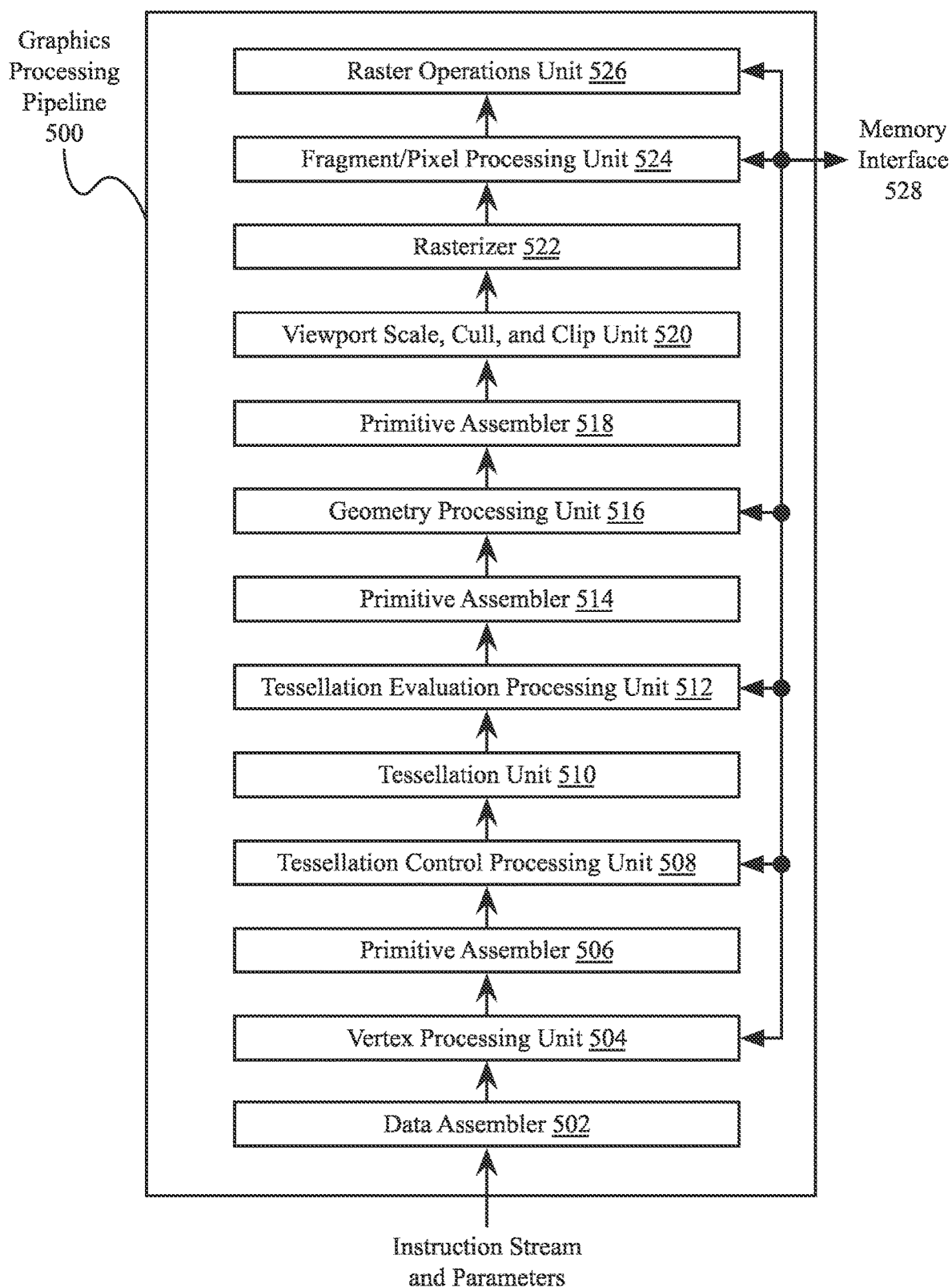
FIG. 5 illustrates a graphics processing pipeline, according to an embodiment.

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110A-110B or for further processing by one of the one or more processor(s) 102 or parallel processor(s) 112. In some embodiments the raster operations unit 526 is configured to compress z or color data that is written to memory and decompress z or color data that is read from memory.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 6:
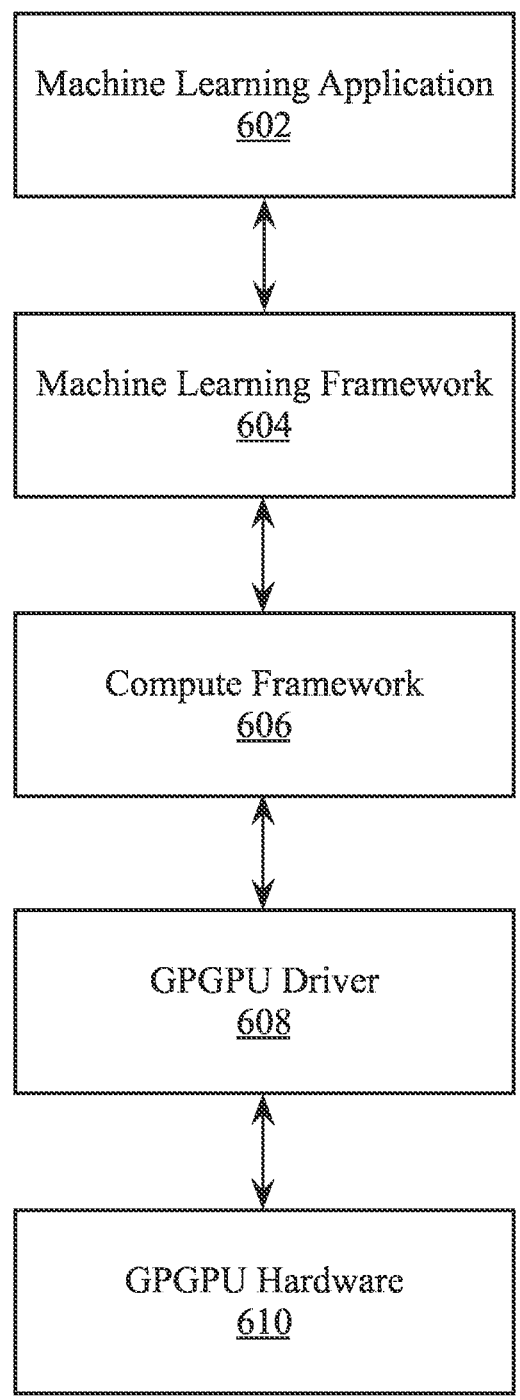
FIG. 6 illustrates a machine learning software stack, according to an embodiment.

FIG. 6 is a generalized diagram of a machine learning software stack 600. A machine learning application 602 can be configured to train a neural network using a training dataset or to use a trained deep neural network to implement machine intelligence. The machine learning application 602 can include training and inference functionality for a neural network and/or specialized software that can be used to train a neural network before deployment. The machine learning application 602 can implement any type of machine intelligence including but not limited to image recognition, mapping and localization, autonomous navigation, speech synthesis, medical imaging, or language translation.

Hardware acceleration for the machine learning application 602 can be enabled via a machine learning framework 604. The machine learning framework 604 can provide a library of machine learning primitives. Machine learning primitives are basic operations that are commonly performed by machine learning algorithms. Without the machine learning framework 604, developers of machine learning algorithms would be required to create and optimize the main computational logic associated with the machine learning algorithm, then re-optimize the computational logic as new parallel processors are developed.

Instead, the machine learning application can be configured to perform the necessary computations using the primitives provided by the machine learning framework 604. Exemplary primitives include tensor convolutions, activation functions, and pooling, which are computational operations that are performed while training a convolutional neural network (CNN). The machine learning framework 604 can also provide primitives to implement basic linear algebra subprograms performed by many machine-learning algorithms, such as matrix and vector operations.

The machine learning framework 604 can process input data received from the machine learning application 602 and generate the appropriate input to a compute framework 606. The compute framework 606 can abstract the underlying instructions provided to the GPGPU driver 608 to enable the machine learning framework 604 to take advantage of hardware acceleration via the GPGPU hardware 610 without requiring the machine learning framework 604 to have intimate knowledge of the architecture of the GPGPU hardware 610. Additionally, the compute framework 606 can enable hardware acceleration for the machine learning framework 604 across a variety of types and generations of the GPGPU hardware 610.

GPGPU Machine Learning Acceleration

Figure 7:
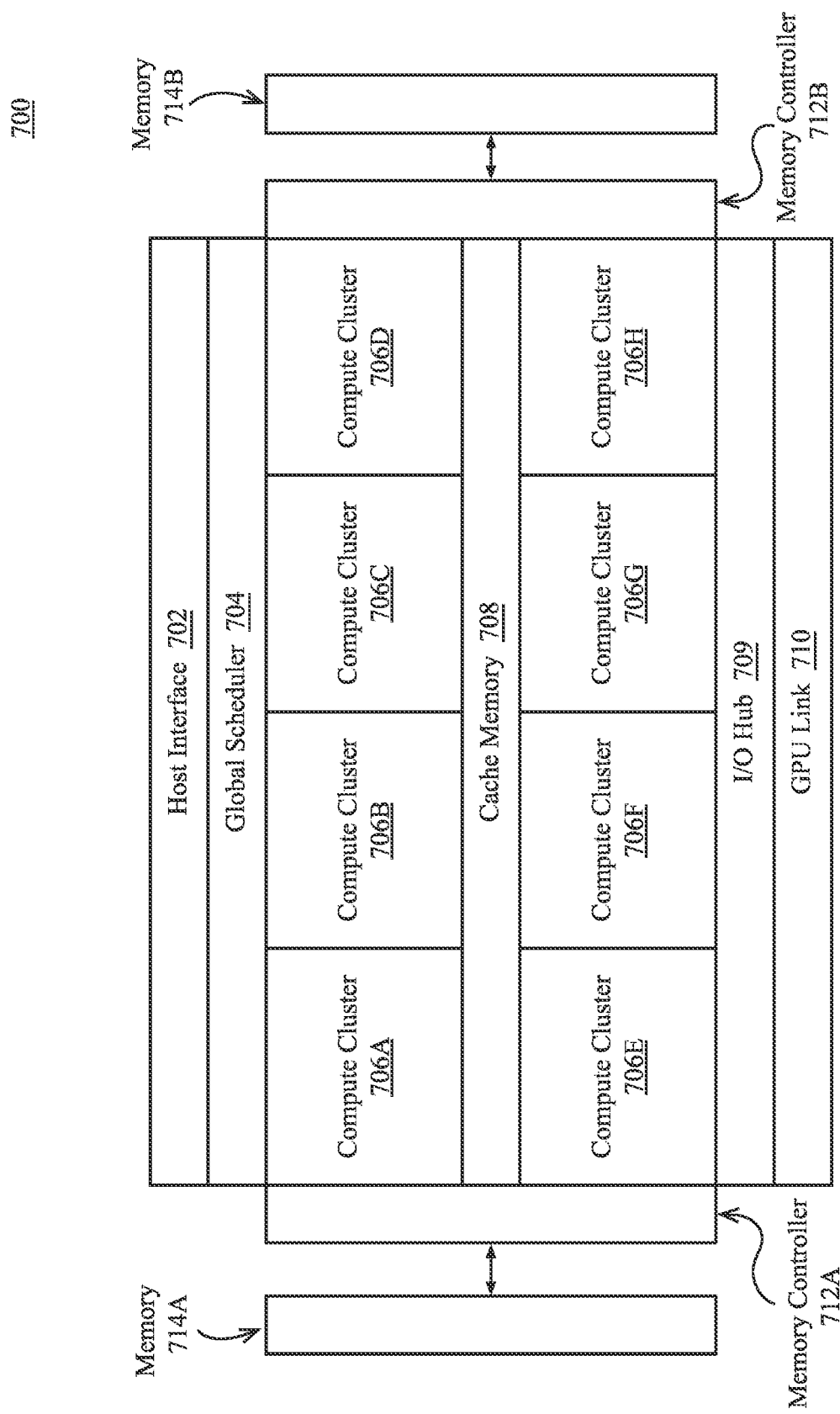
FIG. 7 illustrates a highly-parallel general-purpose graphics processing unit, according to an embodiment.

FIG. 7 illustrates a general-purpose graphics processing unit 700, according to an embodiment. In one embodiment, the general-purpose processing unit (GPGPU) 700 can be configured to be particularly efficient in processing the type of computational workloads associated with training deep neural networks. Additionally, the GPGPU 700 can be linked directly to other instances of the GPGPU to create a multi-GPU cluster to improve training speed for particularly deep neural networks.

The GPGPU 700 includes a host interface 702 to enable a connection with a host processor. In one embodiment the host interface 702 is a PCI Express interface. However, the host interface can also be a vendor specific communications interface or communications fabric. The GPGPU 700 receives commands from the host processor and uses a global scheduler 704 to distribute execution threads associated with those commands to a set of compute clusters 706A-706H. The compute clusters 706A-706H share a cache memory 708. The cache memory 708 can serve as a higher-level cache for cache memories within the compute clusters 706A-706H.

The GPGPU 700 includes memory 714A-B coupled with the compute clusters 706A-H via a set of memory controllers 712A-712B. In various embodiments, the memory 714A-714B can include various types of memory devices including dynamic random-access memory (DRAM) or graphics random access memory, such as synchronous graphics random access memory (SGRAM), including graphics double data rate (GDDR) memory. In one embodiment, the memory 714A-714N may also include 3D stacked memory, including but not limited to high bandwidth memory (HBM).

In one embodiment, each of the compute clusters 706A-706H includes a set of graphics multiprocessors, such as the graphics multiprocessor 234 of FIG. 2D. The graphics multiprocessors of the compute cluster multiple types of integer and floating-point logic units that can perform computational operations at a range of precisions including suited for machine learning computations. For example, and in one embodiment at least a subset of the floating-point units in each of the compute clusters 706A-H can be configured to perform 16-bit or 32-bit floating point operations, while a different subset of the floating-point units can be configured to perform 64-bit floating point operations.

Multiple instances of the GPGPU 700 can be configured to operate as a compute cluster. The communication mechanism used by the compute cluster for synchronization and data exchange varies across embodiments. In one embodiment, the multiple instances of the GPGPU 700 communicate over the host interface 702. In one embodiment the GPGPU 700 includes an I/O hub 709 that couples the GPGPU 700 with a GPU link 710 that enables a direct connection to other instances of the GPGPU. In one embodiment the GPU link 710 is coupled to a dedicated GPU-to-GPU bridge that enables communication and synchronization between multiple instances of the GPGPU 700. In one embodiment the GPU link 710 couples with a high-speed interconnect to transmit and receive data to other GPGPUs or parallel processors. In one embodiment the multiple instances of the GPGPU 700 are located in separate data processing systems and communicate via a network device that is accessible via the host interface 702. In one embodiment the GPU link 710 can be configured to enable a connection to a host processor in addition to or as an alternative to the host interface 702.

While the illustrated configuration of the GPGPU 700 can be configured to train neural networks, one embodiment provides alternate configuration of the GPGPU 700 that can be configured for deployment within a high performance or low power inferencing platform. In an inferencing configuration, the GPGPU 700 includes fewer of the compute clusters 706A-706H relative to the training configuration. Additionally, memory technology associated with the memory 714A-714B may differ between inferencing and training configurations. In one embodiment, the inferencing configuration of the GPGPU 700 can support inferencing specific instructions. For example, an inferencing configuration can provide support for one or more 8-bit integer dot product instructions, which are commonly used during inferencing operations for deployed neural networks.

Figure 8:
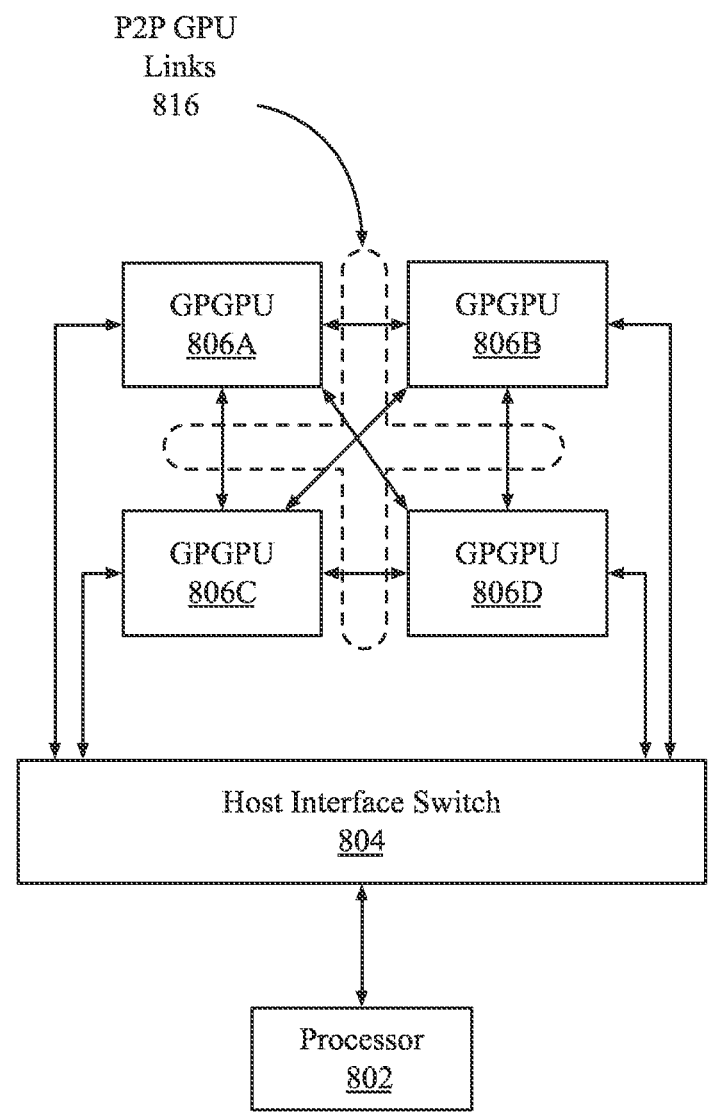
FIG. 8 illustrates a multi-GPU computing system, according to an embodiment.

FIG. 8 illustrates a multi-GPU computing system 800, according to an embodiment. The multi-GPU computing system 800 can include a processor 802 coupled to multiple GPGPUs 806A-806D via a host interface switch 804. The host interface switch 804, in one embodiment, is a PCI express switch device that couples the processor 802 to a PCI express bus over which the processor 802 can communicate with the set of GPGPUs 806A-806D. Each of the multiple GPGPUs 806A-806D can be an instance of the GPGPU 700 of FIG. 7. The GPGPUs 806A-806D can interconnect via a set of high-speed point to point GPU to GPU links 816. The high-speed GPU to GPU links can connect to each of the GPGPUs 806A-806D via a dedicated GPU link, such as the GPU link 710 as in FIG. 7. The P2P GPU links 816 enable direct communication between each of the GPGPUs 806A-806D without requiring communication over the host interface bus to which the processor 802 is connected. With GPU-to-GPU traffic directed to the P2P GPU links, the host interface bus remains available for system memory access or to communicate with other instances of the multi-GPU computing system 800, for example, via one or more network devices. While in the illustrated embodiment the GPGPUs 806A-D connect to the processor 802 via the host interface switch 804, in one embodiment the processor 802 includes direct support for the P2P GPU links 816 and can connect directly to the GPGPUs 806A-806D.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
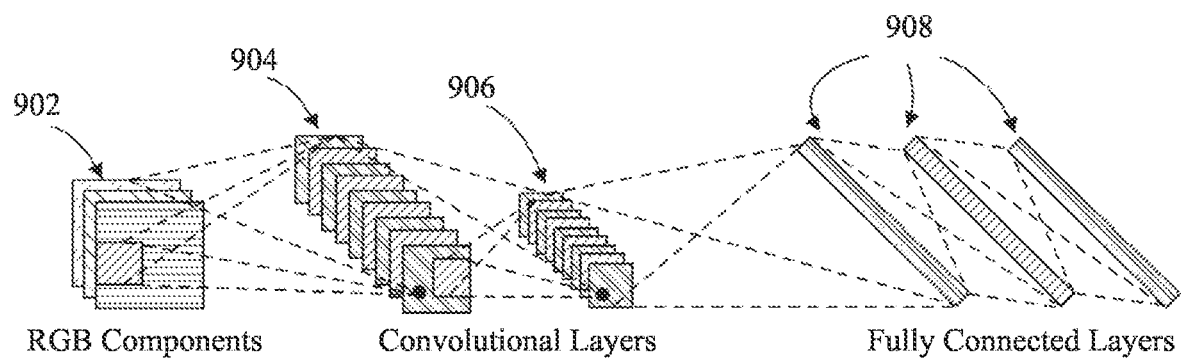
FIG. 9A-9B illustrate layers of exemplary deep neural networks.
Figure 9B:
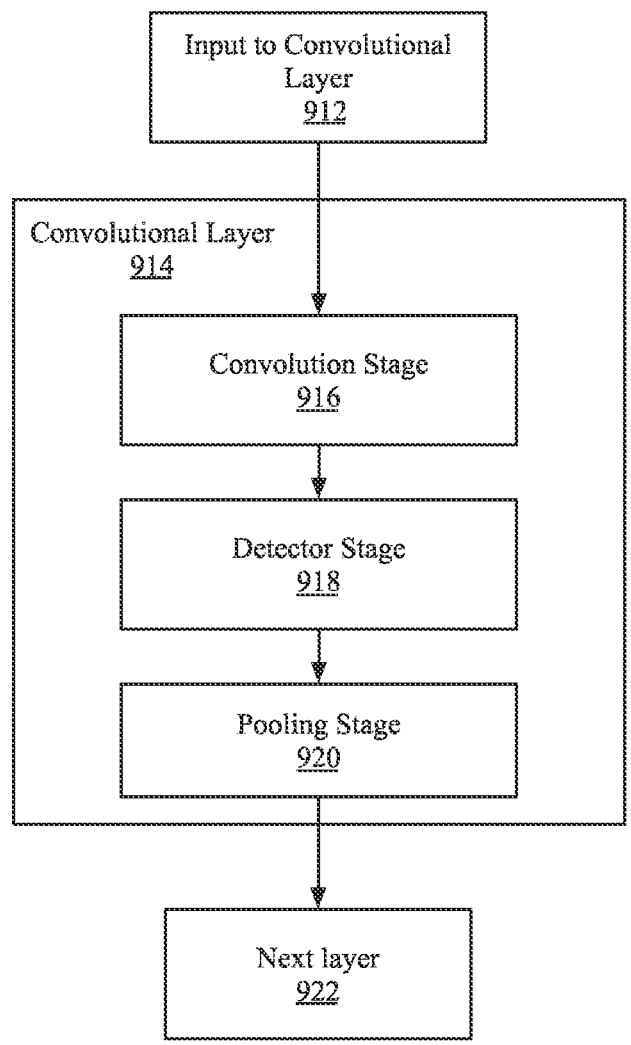

FIG. 9A-9B illustrate an exemplary convolutional neural network. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., convolutional layer 904, convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations make use of fully connected layers 908. For example, in some implementations the convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolutional layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 920 uses a pooling function that replaces the output of the convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

Figure 10:
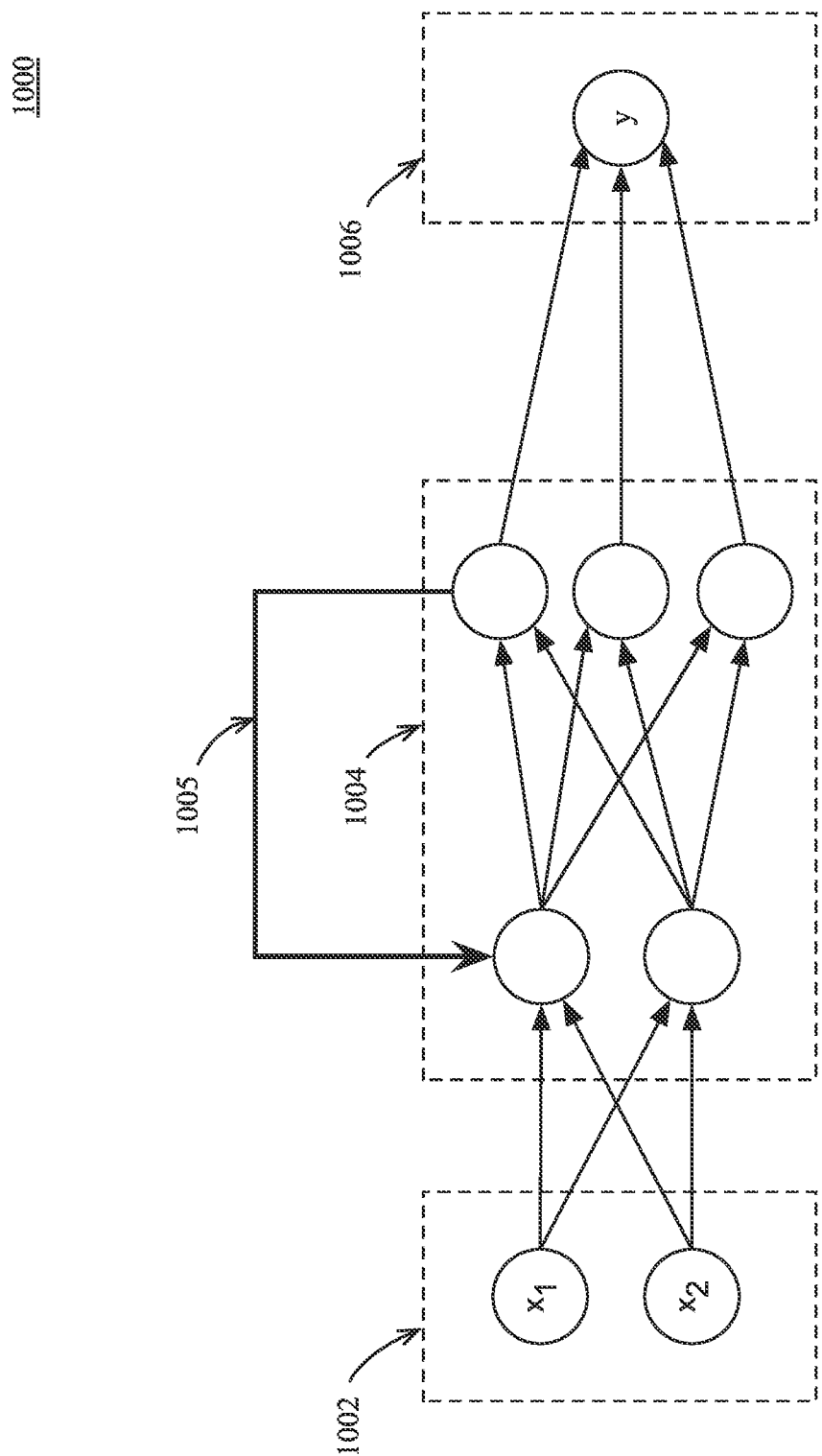
FIG. 10 illustrates an exemplary recurrent neural network.

FIG. 10 illustrates an exemplary recurrent neural network 1000. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1000 can be described has having an input layer 1002 that receives an input vector, hidden layers 1004 to implement a recurrent function, a feedback mechanism 1005 to enable a 'memory' of previous states, and an output layer 1006 to output a result. The RNN 1000 operates based on time-steps. The state of the RNN at a given time step is influenced based on the previous time step via the feedback mechanism 1005. For a given time step, the state of the hidden layers 1004 is defined by the previous state and the input at the current time step. An initial input ($x_1$) at a first time step can be processed by the hidden layer 1004. A second input ($x_2$) can be processed by the hidden layer 1004 using state information that is determined during the processing of the initial input ($x_1$). A given state can be computed as $s_t=f(Ux_t+Ws_{t-1})$, where U and W are parameter matrices. The function $f$ is generally a non-linearity, such as the hyperbolic tangent function (Tanh) or a variant of the rectifier function $f(x)=\max(0, x)$. However, the specific mathematical function used in the hidden layers 1004 can vary depending on the specific implementation details of the RNN 1000.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 11:
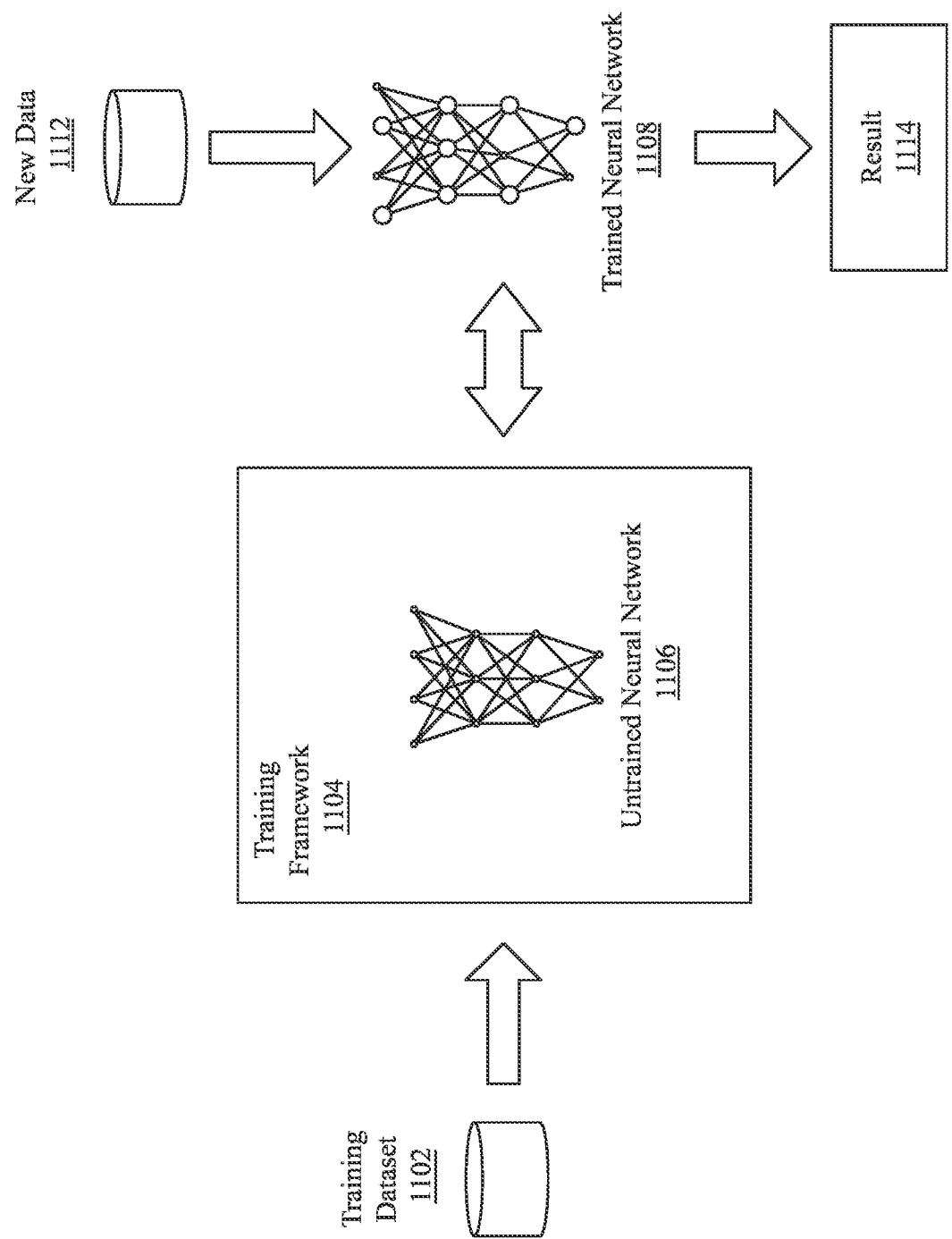
FIG. 11 illustrates training and deployment of a deep neural network.

FIG. 11 illustrates training and deployment of a deep neural network. Once a given network has been structured for a task the neural network is trained using a training dataset 1102. Various training frameworks 1104 have been developed to enable hardware acceleration of the training process. For example, the machine learning framework 604 of FIG. 6 may be configured as a training framework 604. The training framework 604 can hook into an untrained neural network 1106 and enable the untrained neural net to be trained using the parallel processing resources described herein to generate a trained neural network 1108.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1102 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1104 can adjust to adjust the weights that control the untrained neural network 1106. The training framework 1104 can provide tools to monitor how well the untrained neural network 1106 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1108. The trained neural network 1108 can then be deployed to implement any number of machine learning operations to generate an inference result 1114 based on input of new data 1112.

Unsupervised learning is a learning method in which the network attempts to train itself using unlabeled data. Thus, for unsupervised learning the training dataset 1102 will include input data without any associated output data. The untrained neural network 1106 can learn groupings within the unlabeled input and can determine how individual inputs are related to the overall dataset. Unsupervised training can be used to generate a self-organizing map, which is a type of trained neural network 1108 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1102 includes a mix of labeled and unlabeled data of the same distribution. Incremental learning is a variant of supervised learning in which input data is continuously used to further train the model. Incremental learning enables the trained neural network 1108 to adapt to the new data 1112 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 12:
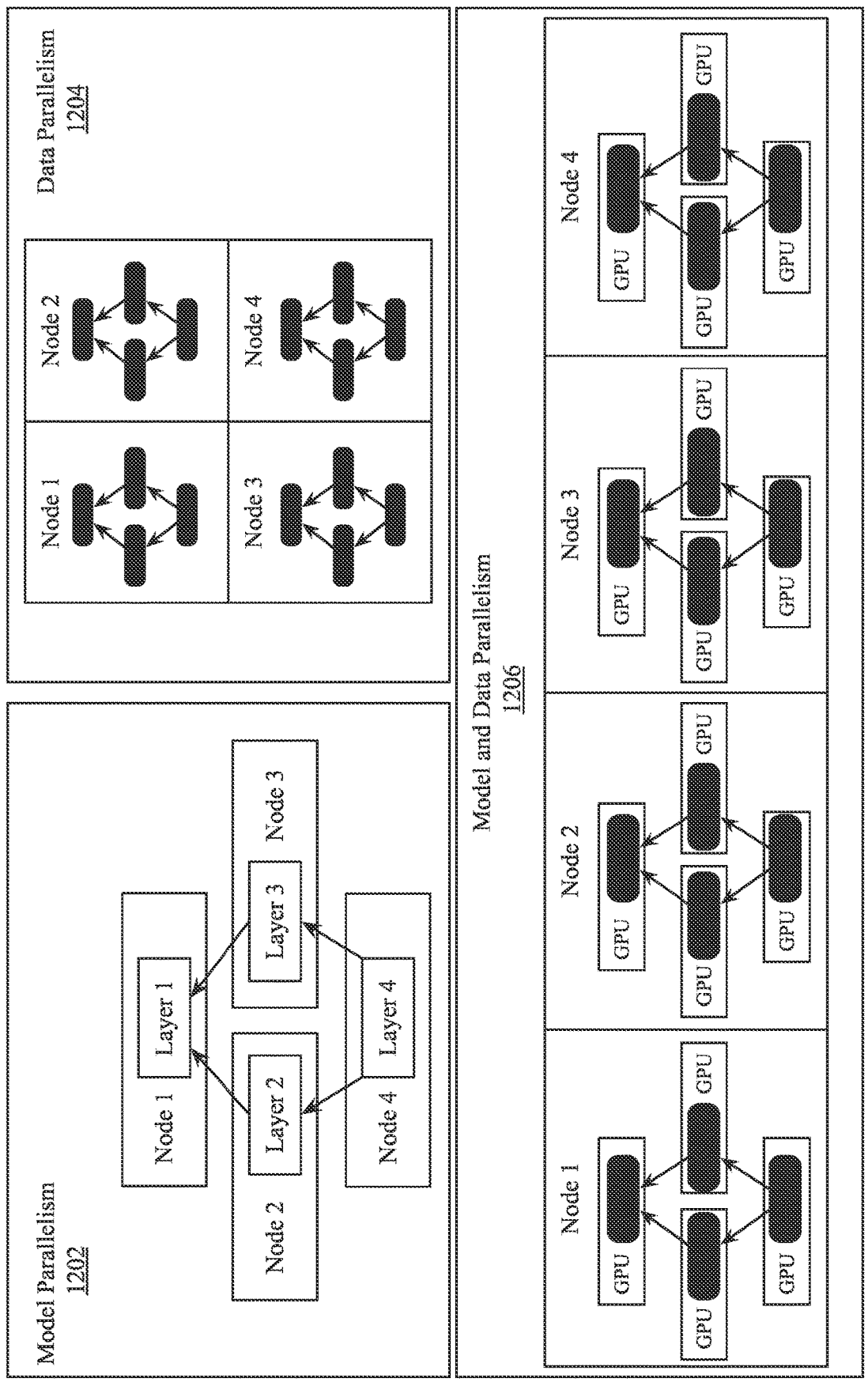
FIG. 12 is a block diagram illustrating distributed learning.

FIG. 12 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes, such as the highly-parallel general-purpose graphics processing unit 700 as in FIG. 7. As illustrated, distributed learning can be performed model parallelism 1202, data parallelism 1204, or combined model and data parallelism 1206.

In model parallelism 1202, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks. In another example of model parallelism, computation in one or more layers of a neural network model can be split across multiple compute nodes across feature map dimension to reduce size of per node model parameters.

In data parallelism 1204, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1206 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the general-purpose graphics processing unit 700 of FIG. 7 and the multi-GPU computing system 800 of FIG. 8. On the contrary, deployed machine learning platforms generally include lower power parallel processors suitable for use in products such as cameras, autonomous robots, and autonomous vehicles.

Figure 13:
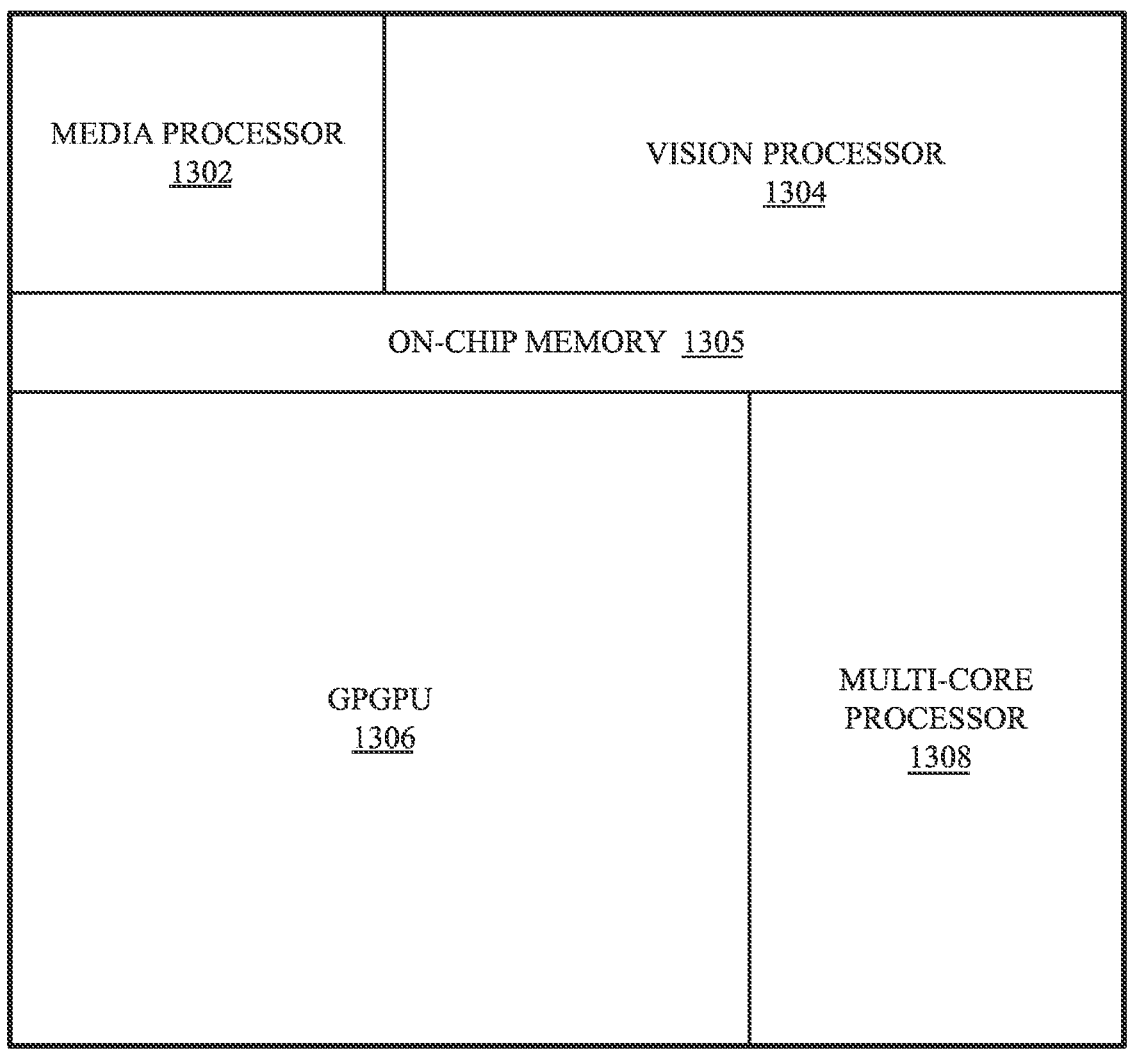
FIG. 13 illustrates an exemplary inferencing system on a chip (SOC) suitable for performing inferencing using a trained model.

FIG. 13 illustrates an exemplary inferencing system on a chip (SOC) 1300 suitable for performing inferencing using a trained model. The SOC 1300 can integrate processing components including a media processor 1302, a vision processor 1304, a GPGPU 1306 and a multi-core processor 1308. The SOC 1300 can additionally include on-chip memory 1305 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 1300 can be used as a portion of the main control system for an autonomous vehicle. Where the SOC 1300 is configured for use in autonomous vehicles the SOC is designed and configured for compliance with the relevant functional safety standards of the deployment jurisdiction.

During operation, the media processor 1302 and vision processor 1304 can work in concert to accelerate computer vision operations. The media processor 1302 can enable low latency decode of multiple high-resolution (e.g., 4K, 8K) video streams. The decoded video streams can be written to a buffer in the on-chip memory 1305. The vision processor 1304 can then parse the decoded video and perform preliminary processing operations on the frames of the decoded video in preparation of processing the frames using a trained image recognition model. For example, the vision processor 1304 can accelerate convolution operations for a CNN that is used to perform image recognition on the high-resolution video data, while back end model computations are performed by the GPGPU 1306.

The multi-core processor 1308 can include control logic to assist with sequencing and synchronization of data transfers and shared memory operations performed by the media processor 1302 and the vision processor 1304. The multi-core processor 1308 can also function as an application processor to execute software applications that can make use of the inferencing compute capability of the GPGPU 1306. For example, at least a portion of the navigation and driving logic can be implemented in software executing on the multi-core processor 1308. Such software can directly issue computational workloads to the GPGPU 1306 or the computational workloads can be issued to the multi-core processor 1308, which can offload at least a portion of those operations to the GPGPU 1306.

The GPGPU 1306 can include compute clusters such as a low power configuration of the compute clusters 706A-706H within general-purpose graphics processing unit 700. The compute clusters within the GPGPU 1306 can support instruction that are specifically optimized to perform inferencing computations on a trained neural network. For example, the GPGPU 1306 can support instructions to perform low precision computations such as 8-bit and 4-bit integer vector operations.

Abstraction Layers for Scalable Distributed Machine Learning

Currently, data scientists that develop applications that make use of distributed deep learning are required to explicitly implement the communication system between the compute nodes. Implementing the underlying communications system for distributed deep learning requires some knowledge of distributed or networked compute node communication techniques, including the libraries required to implement such techniques. For example, to implement distributed deep learning models such as data parallelism, model parallelism, or hybrid parallelism (mixed data and model parallelism), the application developer may be required to explicitly construct the communication infrastructure using low level communication libraries, such as the message passing interface (MPI) library. The application developer will then be required to determine the specific units of data to transfer and the specific nodes that will be transmitting and receiving such information. As deep learning application developers may not be domain specific experts in the construction of distributed compute infrastructure, many best practices and optimizations may not be included in the communication implementation developed for a given deep learning application.

Distributed machine learning can be implemented using a variety of parallelism patterns, such as data parallelism, model parallelism, or a hybrid of data and model parallelism, as illustrated in FIG. 12. As described with respect to FIG. 12, data parallelism uses the same model for each compute node, with each node processing different portions of the data. Model parallelism uses the same data for each compute node, with the model split among compute nodes.

To enable communication, multiple types of low-level communication patterns are used to transfer data between nodes. The low-level communication patterns used are illustrated in Table 5 below.

TABLE 5

| Low Level Communication Operation | |
|---|---|
| Communication Operation | Description |
| GATHER | Gathers data from multiple processes in a group into a specified array in a single process |
| SCATTER | Distribute data from a single array into multiple segments, where different segments are sent to different processes |
| ALLGATHER | Gather operation in which all processes receive the gather result |
| ALLTOALL | Each process in the group sends distinct data to each receiver |
| REDUCE | A global reduction operation in which the outcome from applying some desired function across |

TABLE 5-continued

| Low Level Communication Operation | |
|---|---|
| Communication Operation | Description |
| | all processes in a group is collected in one specified process |
| REDUCE_SCATTER | Element-wise reduction on vector of element, with the resulting vector split into disjoint segments, with different segments sent to each process in a group |
| ALLREDUCE | A reduce combined with a broadcast, where the outcome of the reduce operation is broadcast to all processes within a group. |

Figure 14C:
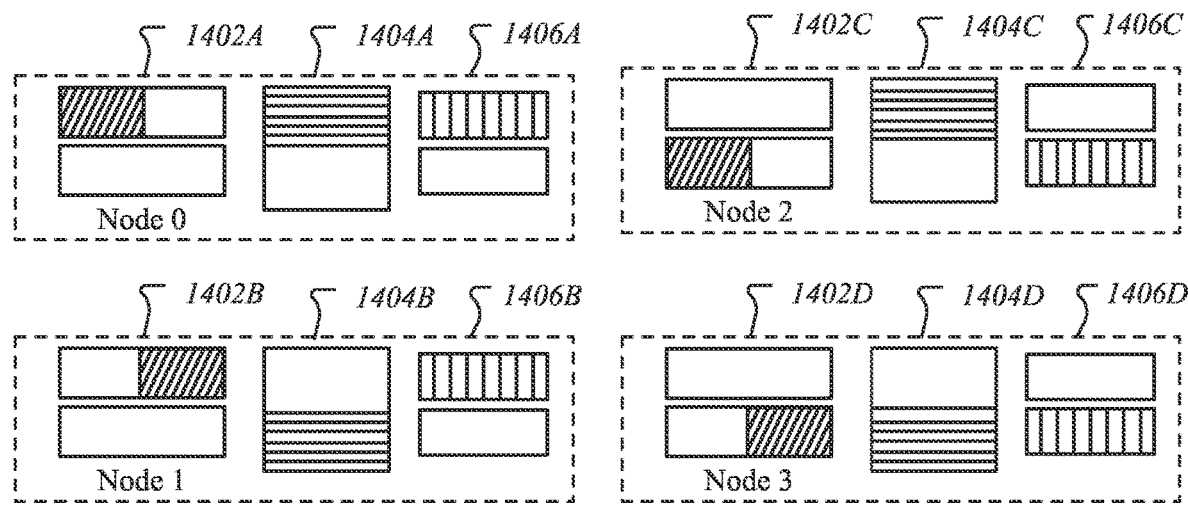
Figure 14D:
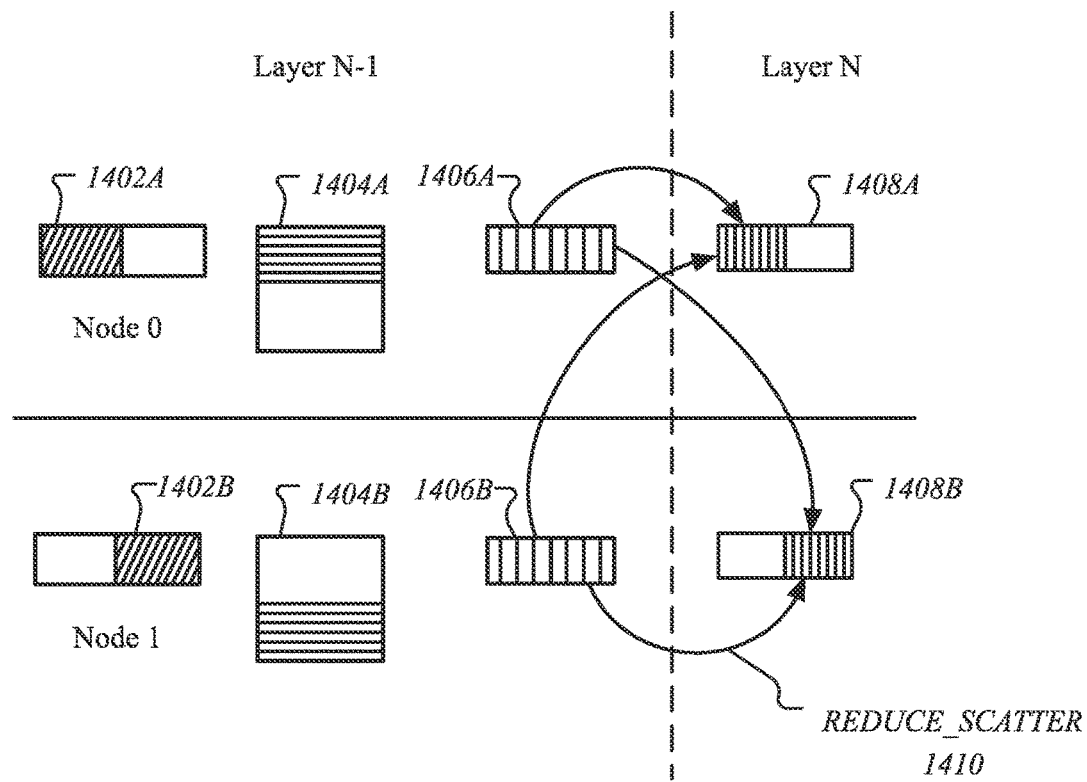
Figure 14E:
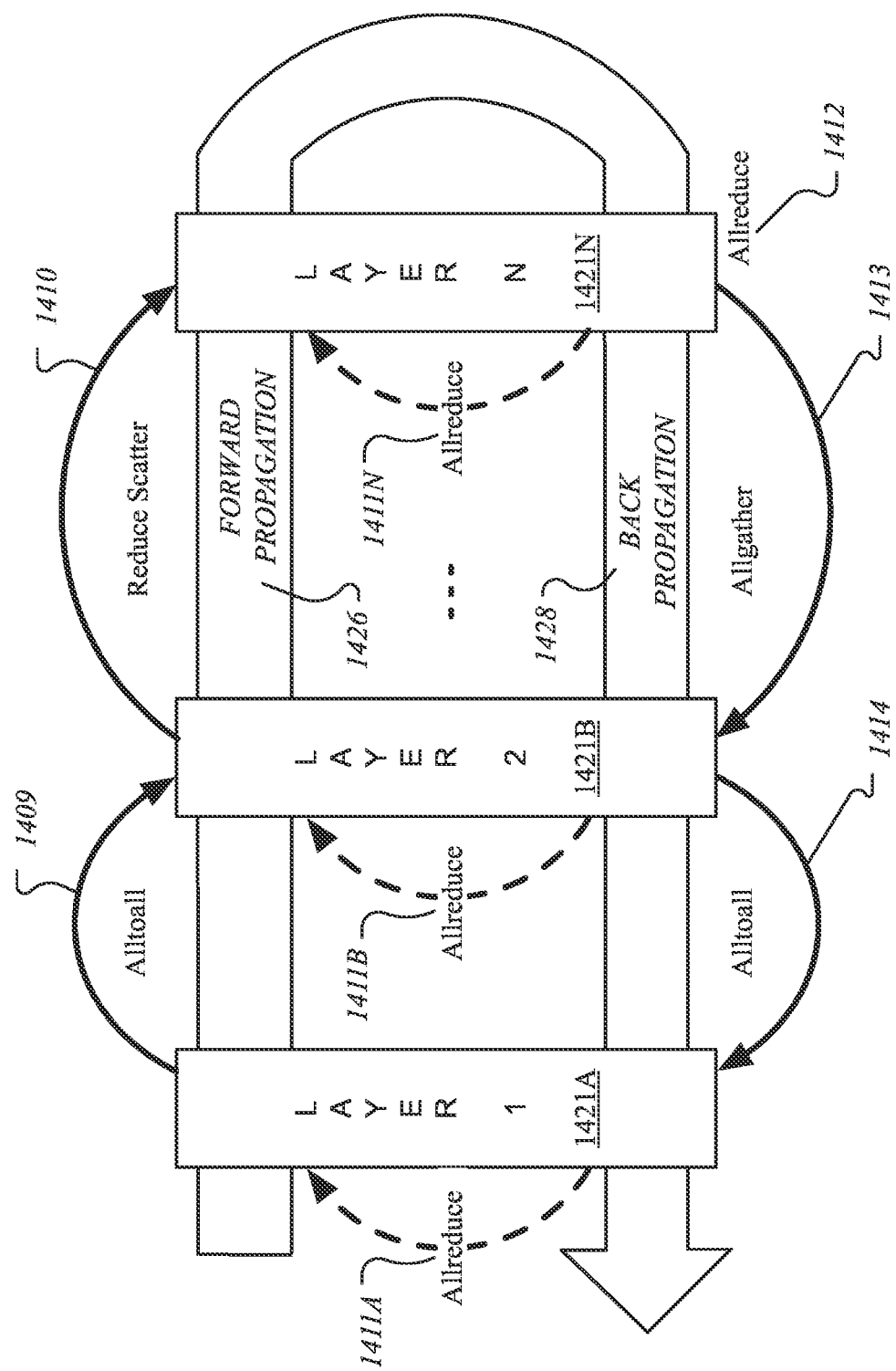

FIGS. 14A-14E illustrate communication patterns used during distributed machine learning compute operations performed across multiple compute nodes, according to embodiments described herein. FIG. 14A illustrates data transfer for machine learning computation using data parallelism. FIG. 14B illustrates data transfer for distributed machine learning computation using model parallelism. FIG. 14C illustrates partitioning of machine learning computation across multiple nodes using hybrid parallelism. FIG. 14D illustrates distributed machine learning computation using hybrid parallelism across multiple nodes and across multiple layers. FIG. 14E illustrates a set of exemplary messaging patterns operations that may be used for distributed machine learning. In each of FIG. 14A-14E, input data 1402 is processed by a machine learning model having a set of weights 1404 to generate a set of activations 1408 or partial activations 1406.

As shown in FIG. 14A, data parallelism can be implemented in which input data 1402 is split along a mini-batch dimension and the same model is replicated across the nodes. The mini-batch is split across several compute nodes, with each node responsible for computing gradients with respect to all model parameters using a subset of the samples in the mini-batch. Forward propagation is performed independently on each node. In one embodiment only one communication is performed during the backward pass to calculate an average for the gradients with respect to learnable parameters. An allreduce operation 1405 is used to update the weights of each layer for the next forward pass. In one embodiment, distributed weight update can be enabled in which a reduce_scatter is used calculate an average for gradients before stochastic gradient descent is performed and an allgather operation is used after stochastic gradient descent to synchronize weights across nodes.

As shown in FIG. 14B, model parallelism can be implemented in which the model or set of weights is split across multiple nodes. Generally, model parallelism performs different portions of a model's computation are performed simultaneous on different nodes for the same batch of examples. For model parallelism, the input data is also split (e.g., along the channel dimension), as shown in FIG. 14B. Using the illustrated approach, a reduce operation is performed to sum up the activations to obtain the actual output and then scatter the activations for use in computing activations for the next layer. A reduce_scatter 1407 operation can be performed to transfer the data in a single communication operation. In the backward pass an allgather operation is performed to combine strips of gradients computed on each node.

As shown in FIG. 14C, hybrid parallelism can be performed in which a partitioning is performed across activations and weights to minimize skewed matrices. For a layer of a neural network, the input data 1402, weight data 1404, and/or activation data 1406 is partitioned and distributed across multiple compute nodes (e.g., Node 0-Node 3). Node 0 receives a first block of input data 1402A and weight data 1404A. Compute operations are performed at Node 0 to generate a first partial activation 1406A. Likewise, Node 1 receives a second block of input data 1402B and weight data 1404B. Compute operations are performed at Node 1 to generate a second partial activation 1406B. Node 2 can perform compute operations on third input data 1402C and weight data 1404C to generate a third partial activation 1406C. Node 3 can perform compute operations on fourth input data 1402D and weight data 1404D to generate a fourth partial activation 1406D.

FIG. 14D illustrates the transfer of partial activation data 1406A-1406B for a given layer of a neural network (Layer N−1) to a successive layer of the neural network (Layer N). Via multiple nodes (Node 0, Node 1), a set of partial activations 1406A-1406B is generated by based on the application of a mathematical operation (e.g., convolution) to the input data 1402A-1402B and weight data 1404A-1404B. For example, in one embodiment, a reduce_scatter operation 1410 is used which performs a reduce operation on the partial activations 1406A-1406B of layer N−1 from the multiple nodes and scatters the result to the multiple nodes as activations for use in Layer N of the neural network.

FIG. 14E illustrates the exemplary communication operations used to transfer data for distributed training of a neural network for machine learning operations. The low-level messaging libraries are used to enable data transfers for weight and activation data during distributed training of a neural network. An exemplary neural network having N layers 1421A, 1421B, 1421N (e.g., Layer 1, Layer 2, through Layer N) can be trained in a distributed manner by performing successive forward compute operations on the successive layers to enable forward propagation 1426 of activation data through the neural network. During forward propagation 1426, an Alltoall 1409 communication operation is used to transfer activation data from a first layer 1421A to a successive layer 1421B, for example, where the first layer and the successive layer are hidden layers or non-output layers. The Alltoall 1409 operation transfers distinct data from the compute nodes that generate the activation or partial activation data to all available receivers, which use the activation data as input data for operations on successive layers. When transferring data final layers (e.g., layer N), the reduce scatter operation 1410 is performed, which is described with respect to FIG. 14B. During back propagation 1428, distributed stochastic gradient descent is performed to generate updated weight data. An initial Allreduce operation 1412 is performed for Layer N and a set of Allreduce operations 1411A, 1411B, 1411N are performed to update the weights of each layer for the next forward pass. The Allreduce operations are reduce operations for which the results are broadcast or transferred to the receive buffers of all processes in the communication group. The back propagation 1428 can also include Allgather 1413 and Alltoall 1414 communication operations. For the Allgather operation 1413 data is gathered from all tasks and the combined data is distributed to all tasks. For the Alltoall operation 1414 data from all processes is transferred to all processes.

The data transfers required to perform distributed compute operations for machine learning can be implemented using any low-level messaging library, such as MPI, gRPC, or zeroMQ. However, implementing the exemplary communication operations may be difficult without domain level expertise of multiprocessor communications libraries. Furthermore, scaling these operations to a very large number of nodes can be difficult. Without domain specific knowledge of distributed computing techniques, implementing a scalable communication system for machine learning that can handle communication between hundreds or thousands of nodes may significantly extend development time for machine learning applications.

Embodiments described herein provide various techniques to abstract the distributed communication system detail for a deep learning application. In one embodiment a machine learning scaling library (MLSL) is provided that enables deep learning application developers to develop distributed deep learning applications without requiring knowledge of the specific communication details required to enable multi-node deep learning. An application developer for a deep learning application can specify, using deep learning domain specific terminology, the type of distributed compute system that is used by an application and library techniques provided by embodiments described herein can implement the specific underlying communication methods required to enable the requested distributed compute system.

Figure 15A:
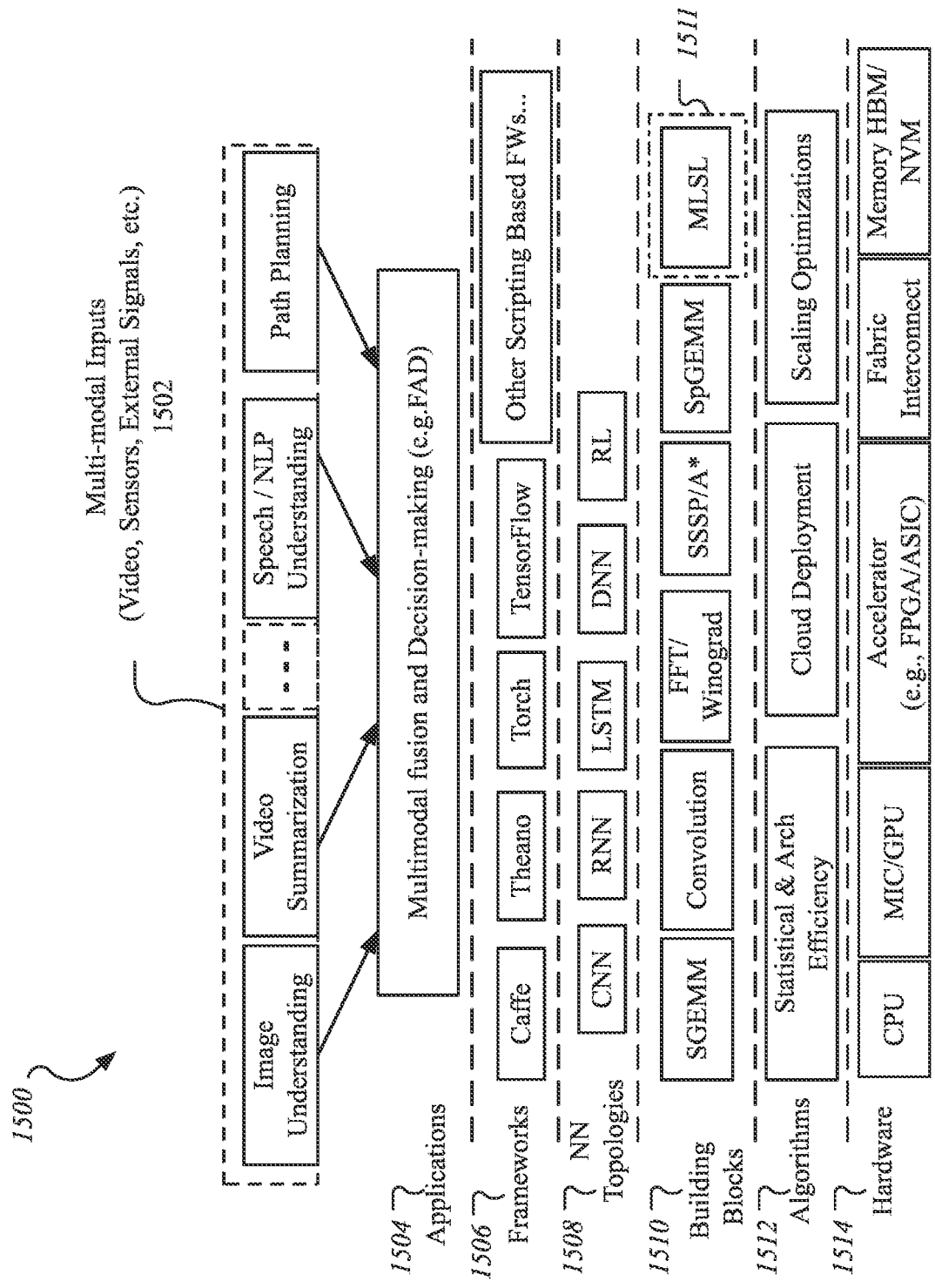
FIG. 15A-15C illustrate architectural details of the machine learning scaling library provided by embodiments described herein.
Figure 15B:
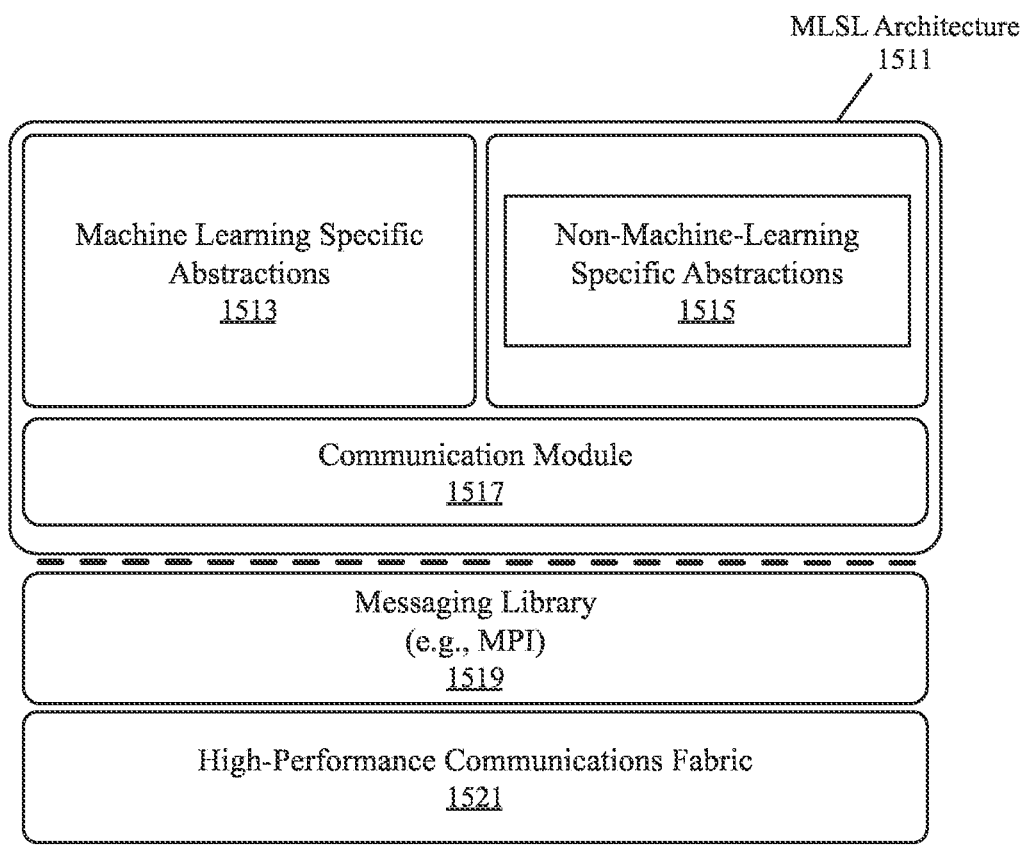
Figure 15C:
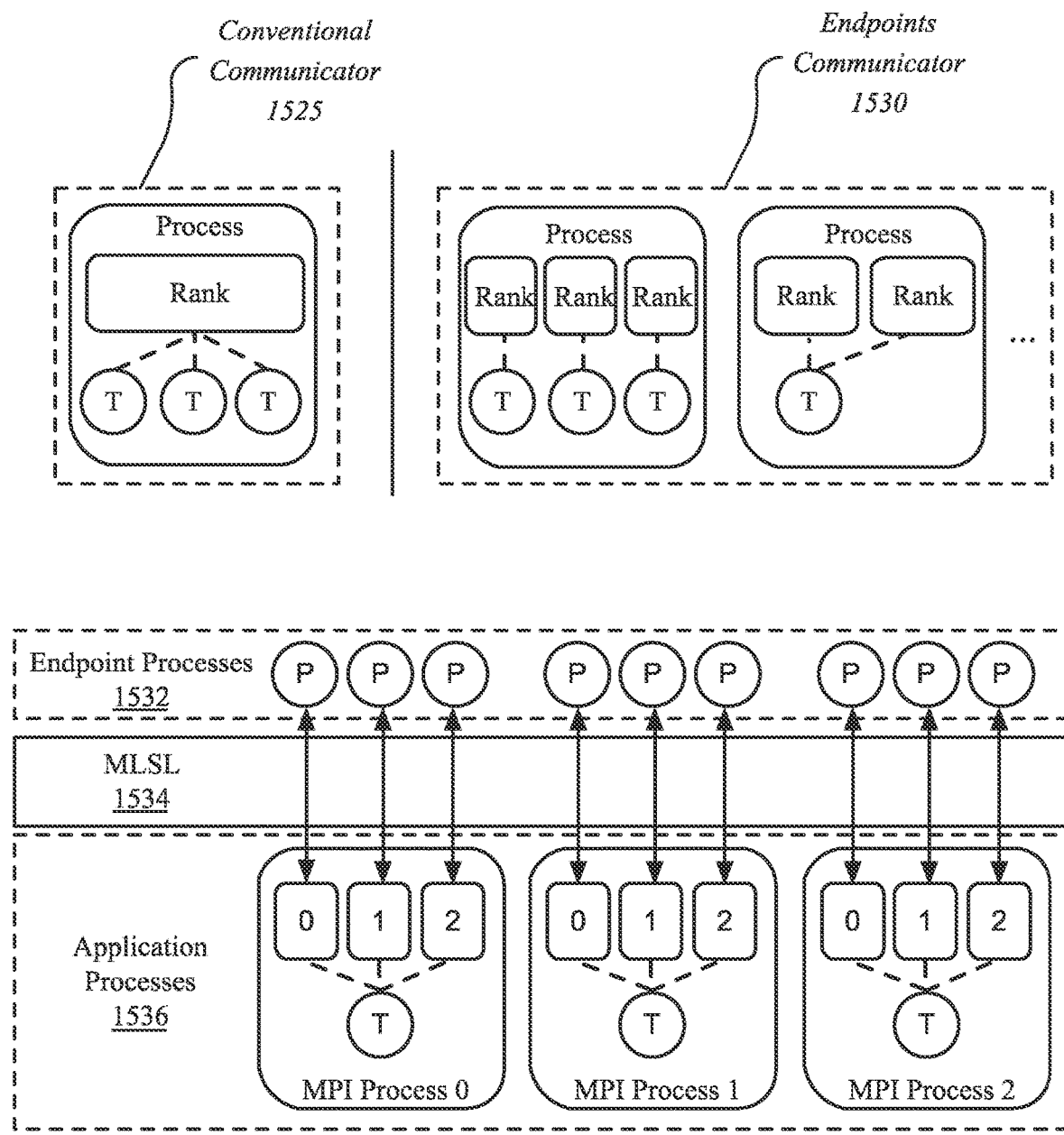

FIG. 15A-15C illustrate architectural details of the machine learning scaling library provided by embodiments described herein. FIG. 15A illustrates an exemplary machine learning architecture stack 1500. FIG. 15B illustrates details of the MLSL architecture 1511. FIG. 15C illustrates exemplary communications endpoints enabled by embodiments.

FIG. 15A illustrates an exemplary machine learning architecture stack 1500, which may be a variant of the machine learning software stack 600 of FIG. 6. The machine learning architecture stack 1500 includes multiple software and hardware layers that range from input data 1502 provided by an array of sensors to hardware 1514 elements that perform various compute, storage, or communication operations. Each layer of the exemplary machine learning architecture stack 1500 may be an opaque abstraction layer that hides implementation details from higher layers, while using functionality provided by lower layers to implement the functions required by the higher layers.

Input data 1502 is provided to a layer of applications 1504. In one embodiment the input data 1502 is multi-modal input including but not limited to video and/or image data, data from multiple sensors, and external signal data. The applications 1504 include multi-modal fusion and decision-making applications that can process the input to enable machine learning tasks such as image understanding, video summarization, speech and natural language processing, path planning, navigation, or any other machine learning implementation described herein. The applications 1504 communicate with one or more machine learning frameworks 1506, such as but not limited to Caffe, Theano, Torch, TensorFlow, or any other scripting based machine learning framework, to implement machine learning specific operations. The machine learning frameworks 1506 can enable machine learning operations to be performed using one of any number of neural network topologies 1508, including but not limited to a CNN, RNN, LSTM, Generic Deep Neural Networks, and Reinforcement Learning Networks. Machine learning frameworks 1506 implement the neural network topologies 1508 via one or more building blocks 1510. Exemplary building blocks 1510 include the single precision floating general matrix multiply (SGEMM) block, convolution building blocks, Fast Fourier transform/Winograd blocks, single-source shortest-path (SSSP) computation blocks, sparse matrix-matrix multiplication (SpGEMM) blocks, and the machine learning scaling library (MLSL) 1511 provided by embodiments described herein. The building blocks 1510 can each implement multiple algorithms 1512 to enable the compute operations requested by the frameworks 1506 to implement the neural network topologies 1508. The algorithms 1512 include optimizations to enhance statistical and architectural efficiency, enable cloud deployment, and enable scaling to a large number of nodes. In one embodiment the MLSL 1511 includes algorithms 1512 to enable scaling of machine learning operations to a large number of nodes. In one embodiment the building blocks 1510 can be implemented via software libraries that may be accelerated by one or more elements of the hardware 1514. In one embodiment at least a portion of the building blocks 1510 may be implemented within hardware 1514. For example, FPGA or ASIC based accelerators can include custom logic to enable portions of the MLSL 1511 or one or more GEMM libraries.

Various components of the hardware 1514 can be used to implement functionality of higher layers of the machine learning architecture stack 1500. Components of the hardware 1514 include, but are not limited to a CPU or another general-purpose processor tasked with performing computational and/or operating system related computations. The hardware 1514 also includes a many integrated core (MIC) or general-purpose GPU based parallel processing system. In some embodiments the hardware 1514 includes FPGA or ASIC based deep learning accelerators. A fabric interconnect component of the hardware 1514 is used to enable high-speed communication between the various components and high-bandwidth volatile or non-volatile memory. The volatile memory technologies can include any of the graphics memory technologies described herein, including HBM and GDDR memory. The non-volatile memory technologies can include flash memory, including 3D NAND flash, or other memory technologies such as 3D Xpoint memory.

FIG. 15B illustrates details of the MLSL architecture 1511, according to embodiments. The MLSL architecture 1511 includes an abstraction layer having machine-learning-specific abstractions 1513 as well as non-machine-learning specific abstractions 1515. The abstractions interface with a communication module 1517 that drives an underlying messaging library 1519. The messaging library 1519 uses optimized low-level communication routines to transmit data over a high-performance communications fabric 1521.

The MLSL architecture 1511 enables developers of machine learning software to develop scalable machine learning applications using machine learning specific abstractions 1513. In one embodiment the machine learning specific abstractions 1513 enable an application developer to use machine learning domain specific knowledge to drive scalable performance for compute operations for neural network layers. The machine learning abstractions 1513 enable applications to be developed in a manner that is transparent to the underlying architecture, enabling machine learning applications to automatically adapt to any number of the hardware 1514 elements, including multiple types of compute and fabric elements. In addition to the machine learning specific abstractions 1513, a set of non-machine-learning specific abstractions 1515 can also be provided by the MLSL architecture 1511. The non-machine-learning specific abstractions 1515 enable a developer of a machine learning application to define, at a higher level of abstraction, one or more non-machine-learning details of the application, such as one or more implementation specific details or operating system details that are unrelated to machine learning.

In one embodiment, the machine learning specific abstractions 1513 enable neural network layer appropriate support for multiple types of parallelism (e.g., data, machine, hybrid). The machine learning specific abstractions 1513 also enable Layer-to-Layer communication abstractions to allow developers to easily implement communication patterns for different layer types and parallelisms. The different layer types and parallelism are defined using machine learning specific terminology using the machine learning specific abstractions 1513 and communication for those layer types are enabled via the communication module 1517, the messaging library 1519, and the high-performance communications fabric 1521. The machine learning specific abstractions 1513 also enable intelligent message scheduling across the defined neural network layers, while abstracting the data layouts and transformations required to implement machine learning techniques at the application level.

In one embodiment, the communication module 1517 includes logic to drive the underlying messaging library 1519. The communication module 1517 includes various optimizations to enable the network to be driven efficiently while transmitting machine learning data between the various compute nodes used to perform distributed machine learning. The communication module 1517 includes logic to optimize network bandwidth and to enable the low latency communications. The machine learning specific abstractions 1513 and/or the non-machine-learning specific abstractions 1515 can specify or prove interfaces to enable the application developer to specify the processor resources tasked with managing distributed communication. In one embodiment specific processors can be specified. In one embodiment, the number of processor associated with communication are specified. In one embodiment, a mix between compute and communication resources can be specified. In one embodiment, the communication module 1517 includes logic to adaptively assign processor cores for use in driving and performing operations for the communication module 1517 and/or the messaging library 1519. In one embodiment the communication module 1517 can adaptively assign processing resources for communication without explicit direction from the machine learning specific abstractions 1513 or the non-machine-learning specific abstractions 1515. In one embodiment the communication module 1517 can adaptively adjust or assign processing resources to attempt to fully saturate available network resources to attempt to minimize the latency impact of communication within the distributed system. For example, should the communication module 1517 determine that the high-performance communication fabric 1521 is not fully saturated with data, additional processors or processor cores can be assigned to perform network tasks if overall throughput of the distributed compute system would be increased. In one embodiment the amount of compute resources assigned to drive the messaging library 1519 can vary based on the bandwidth of the high-performance communications fabric. For higher-bandwidth fabric, greater computational resources may be required to saturate the network. The high-performance communications fabric 1521 can be implemented via any number of high-speed network connection technologies, including but not limited to Ethernet, InfiniBand, Omni-Path Interconnect, or via a mesh of point-to-point interconnects, such as NvLink.

In one embodiment the communication module 1517 includes logic to ensure forward progress of distributed compute operations by enabling asynchronous communication between processing nodes. The asynchronous communication enabled by the communication module 1517 allows overlapping compute and communication operations that efficiently interleave to optimize both compute and communication efficiency and throughput. In one embodiment the communication module 1517 also supports prioritized communication channels to enable prioritized resolution of contending communication requests.

The messaging library 1519 uses optimized low-level communication routines to transmit data over a high-performance communications fabric 1521. The MLSL architecture 1511 is agnostic with respect to the underlying messaging library 1519 and high-performance communications fabric 1521. In one embodiment the messaging library is an MPI-based library. In such embodiment the communication patterns used by a machine learning application are implemented using MPI functions (e.g., MPI_Alltoall, MPI_Allreduce, MPI_Allgather, etc.). In some embodiments the gRPC or zeroMQ libraries and associated functions are used for messaging. In one embodiment the NCCL collective communications routines may also be used. NCCL provides communication routines such as all-gather, reduce, and broadcast to accelerate multi-GPU machine learning training across multiple GPGPUs.

FIG. 15C illustrates exemplary communications endpoints enabled by embodiments described herein. The concepts provided by these embodiments is illustrated with respect to the MPI library, although the techniques described are not limited to MPI implementations. In a conventional communicator 1525, a process is associated with a rank or another communication ID. The process can support communication for multiple threads, each thread associated with the rank or identifier of the process. Embodiments described herein make use of network endpoints to enable communication between the various compute nodes of a distributed compute system. Each endpoints communicator 1530 allows a flexible arrangement between process, a communication rank or ID, and the various threads that use the endpoint for communication. The endpoints communicator 1530 can be dynamically configured, such that a process can be associated with multiple ranks and each rank can be associated with a separate process. In such configuration, each thread can send data via the multiprocessor messaging system without regard to thread contention among ranks. Alternatively, a thread can be associated with multiple ranks, enabling a single thread to have multiple communication channels.

In one embodiment, one or more instances of the endpoints communicator 1530 is explicitly specified via the machine learning specific abstractions 1513. In one embodiment the number of instances of the endpoints communicator 1530 is directly related to the number of cores assigned to perform network communication. In one embodiment the machine learning specific abstractions 1513 enable a programmer to specify, using machine learning specific terminology, the type of network and the degree of parallelism required and the MLSL architecture 1511 can dynamically construct the communications infrastructure, including the number of cores assigned to networking operations and the associated number of communications endpoint 1530.

In various embodiments the communications system of FIG. 15C can be constructed using explicitly developer defined variables or dynamically constructed based on the machine learning infrastructure defined by the application developer. In one embodiment a machine learning application can define multiple application processes 1536 that perform compute operations for the machine learning application. The MLSL 1534 can expose interfaces to the application processes 1536 that enables a communications system that is scalable to a very large number of compute nodes. In such configuration, multiple communications ranks or identifiers are supported for each of the application processes 1536 (e.g., Process 0, Process 1, Process 2), which, in one embodiment, may each be MPI processes. A set of endpoint processes 1532 can be initiated by the MLSL 1534, with separate endpoint process defined to support each rank or identifier of the processes within the application processes 1536. In one embodiment, machine learning specific domain awareness can be combined with a global view of communication operations to determine how many endpoints to use. The number of endpoint processes 1532 can be scaled dynamically by the MLSL 1534 based on communication needs.

Figure 16A:
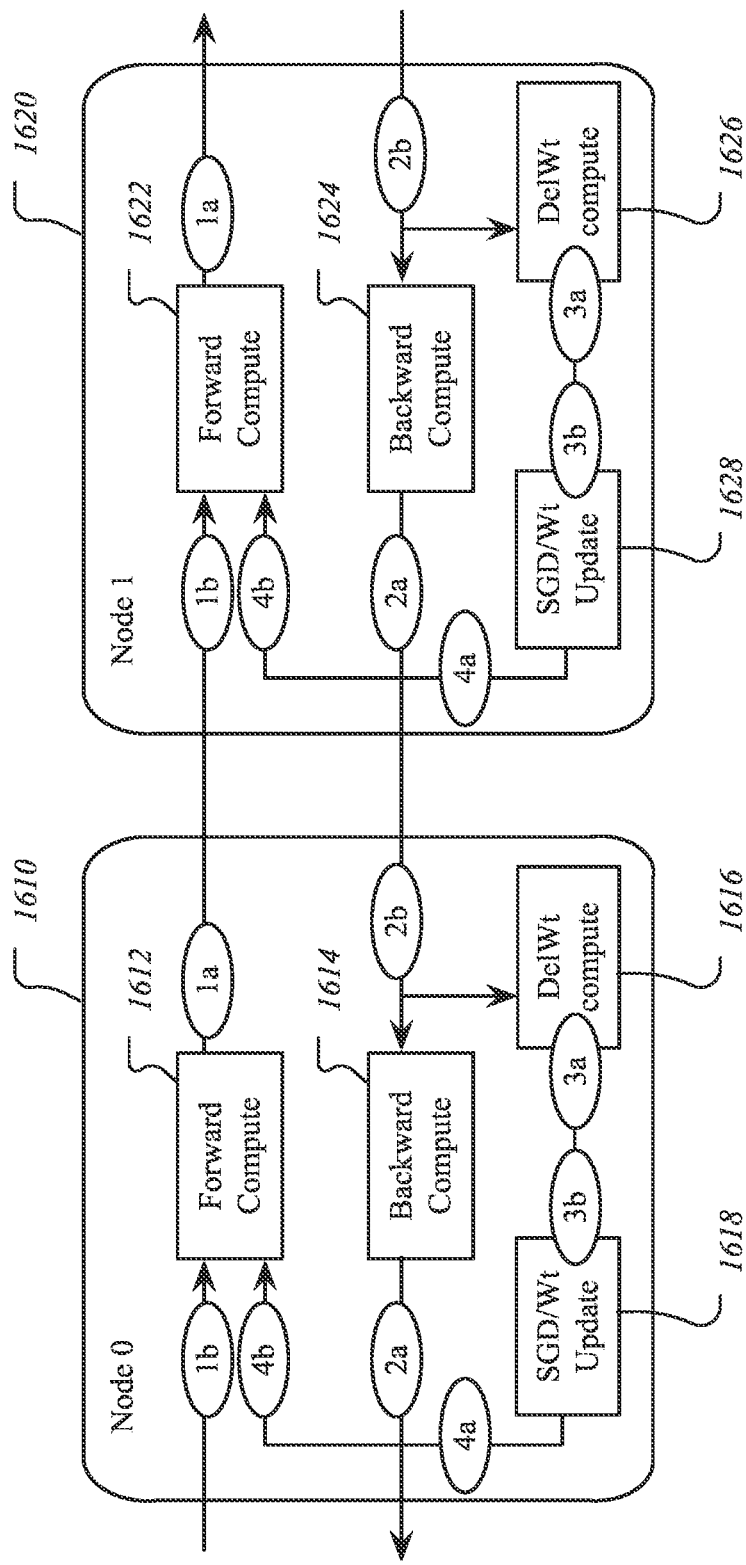
FIG. 16A-16B illustrates distributed machine learning training enabled by embodiments described herein.
Figure 16B:
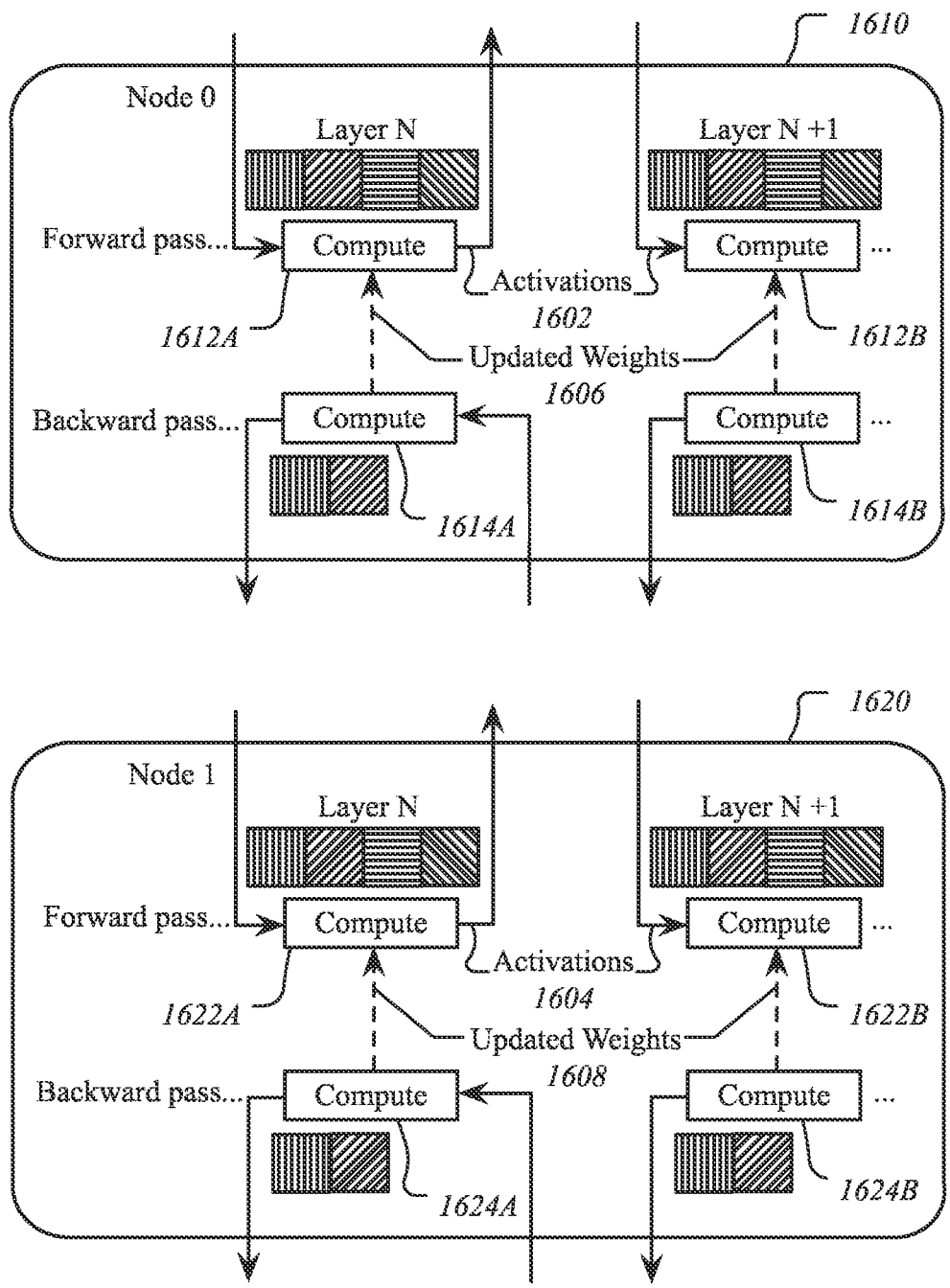

FIGS. 16A-16B illustrates distributed machine learning training enabled by embodiments described herein. FIG. 16A illustrates a training process for a neural network that is performed using multiple nodes. An MLSL API can be used to define a distributed training system including multiple nodes. In one embodiment the multiple nodes can include a first node 1610 (Node 0) and a second node 1620 (Node 1). Each node 1610, 1620 is configured to perform forward compute operations 1612, 1622 and backward compute operations 1614, 1624. For the backward computes 1614, 1624, weight deltas 1616, 1626 are computed and stochastic gradient descent 1618, 1628 is performed to generate weight value updates. The communication operations enabled by the MLSL API are illustrated as letter/number blocks that perform operations shown in Table 6.

TABLE 6

MLSL Communication Operations

| | Communication Action | | Communication Phase |
|---|---|---|---|
| 1. | Activation | a. | Start Communication |
| 2. | Activation Gradients | b. | Wait to Finish Communication |
| 3. | Weight Gradients | | |
| 4. | Updated Weights | | |

As illustrated in FIG. 16A, the MLSL API enables forward propagation using distributed forward computes 1612, 1622 that are bracketed by a first communication block that waits to finish communication for incoming data before beginning the forward compute operations and a second communication block that starts communication for computed data. For example, a developer can use a first MLSL API command (Node 0 [1b]) to configure the forward compute operation 1612 for a first layer at the first node 1610 to wait to finish receiving communication of activation data that will be used as input data for the forward compute 1612. The forward compute 1612 automatically begins upon completion of the communication of the activation data. Upon completion of the forward compute 1612, a second MLSL API command (Node 0 [1a]) can be used to start communication of activation data. The communicated activation data output from the first node 1610 is activation data generated by the first layer and is used as input data for a second layer having a forward compute 1622 performed at the second node 1620. The forward compute 1622 at the second node 1620 waits to finish communication of activation data before beginning compute operations (Node 1[1b]) and, upon completion, starts communication of activation data (Node 1[1b]) generated by the forward compute 1622.

In one embodiment, the MLSL API enables backward propagation using distributed backward computes 1624, 1612 that are bracketed by a third MLSL API enabled communication block (Node 1[2b]) that waits to finish communication for incoming activation gradients before beginning the backward compute 1624 and a fourth MLSL API enabled communication block (Node1[2a]) that starts communication for computed activation gradients. In a similar manner, the MLSL API enables transmission and receipt of weight gradients for weight delta computes 1626, 1616 and updated weights determined via distributed stochastic gradient updates 1628, 1618.

As illustrated in FIG. 16B, each node 1610, 1620 can also be used to perform compute operations for multiple layers of a neural network. In one embodiment the forward compute operations 1612, 1622 shown in FIG. 16A are performed as multiple compute operations 1612A-1612B, 1622A-1622B across multiple layers (Layer N, Layer N+1). Likewise the backward compute operations 1624, 1614 shown in FIG. 16A can be performed as multiple compute operations 1624A-1624B, 1614A-1614B. For each node 1610, 1620, the MLSL API can enable activations 1602, 1604 to be transferred between the multiple neural network layers on each node, while updated weights 1606, 1608 are distributed after backward compute operations 1624A-1624B, 1614A-1614B.

In one embodiment the MLSL API enables the use different types of parallelization for different layers of the same neural network. The choice of parallelism can be made automatically by the MLSL based on layer properties, such as the number of learnable parameters and the number of activations. Based on the parallelism determined for layers, the type of communication required can also be determined. For example, when the previous layer uses data parallelism and the next layers uses model parallelism, an all-to-all communication pattern is invoked to redistribute the data. Generally, the variance of communication patterns and scenarios is significant. By abstracting the communication details, the MLSL API can significantly simplify the life of machine learning framework developers. Various machine learning structures can be implemented via the MLSL API.

Hardware Implemented Point to Point Primitives for Machine Learning

Load and store operations are sufficient to enable an implementation of a higher-order distributed shared memory operations in software. However, load and store primitives alone may not be sufficient to enable a proper hardware solution for point-to-point communications. Embodiment described herein can extend the simple point-to-point primitives known in the art to enable richer semantics such as, but not limited to support for remote atomics, remote procedure calls (RPCs), load with gather list, store with scatter list, and store with notify, including synchronization with communication, to allow more efficient communication and synchronization between nodes and between GPGPU, MIC, or parallel processor cards within a node, particularly when a point-to-point communication protocol, such as a version of the NVLink interconnect/protocol, is in use.

Figure 16C:
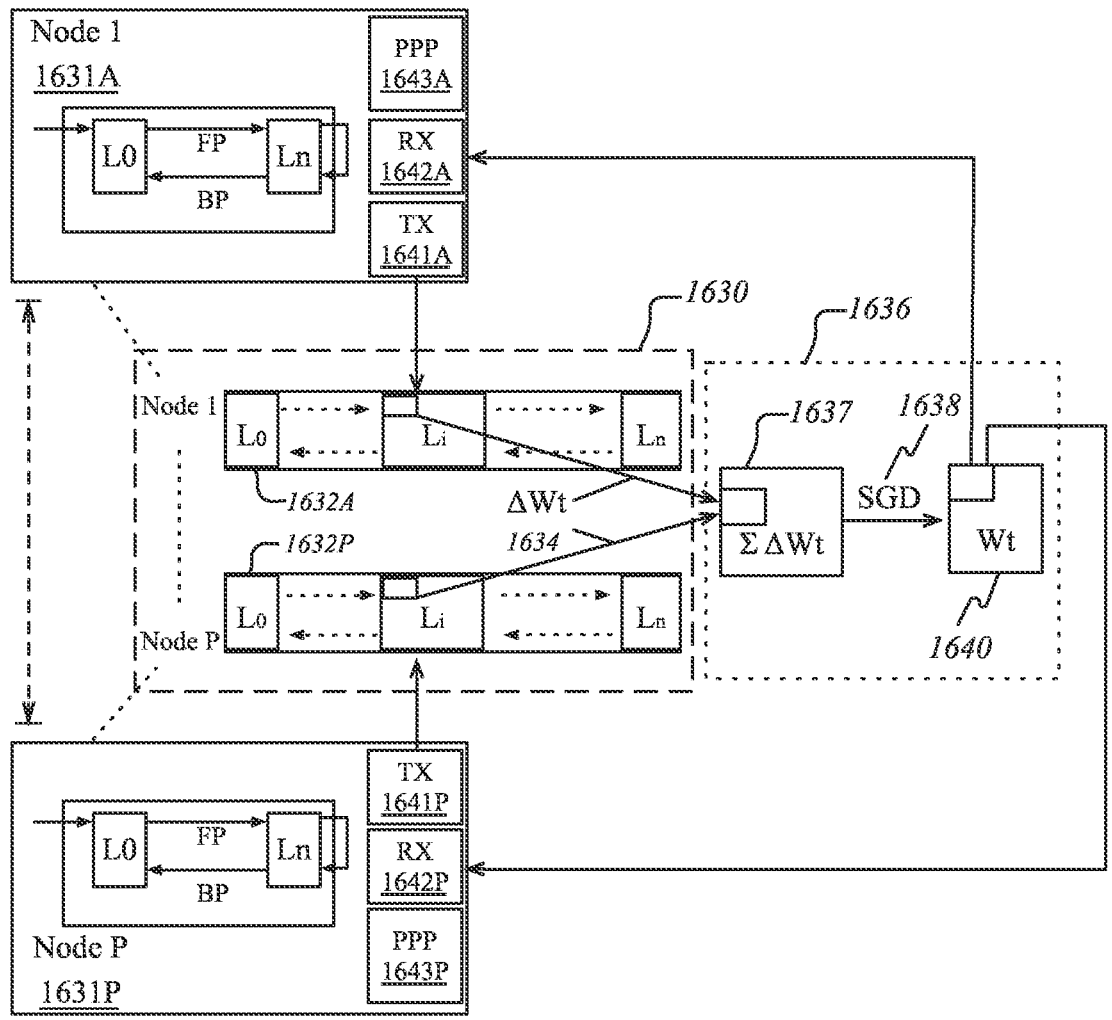
FIG. 16C illustrates inter-node communication using point-to-point primitives, according to an embodiment.

FIG. 16C illustrates inter-node communication using point-to-point primitives, according to an embodiment. In one embodiment, a compute cluster 1630 can perform a distributed neural network training process across multiple nodes. For P number of nodes, each node 1631A-1631P (e.g., Node 1 through Node P) can perform forward propagation and back propagation as described herein. In one embodiment, each node processes various set of layers 1632A-1632P, one set per-node, with each set having layers $L_0$-$L_n$. During forward propagation (FP) and back propagation (BP) operations for the neural network, data associated with the layers 1632A-1632P may be exchanged between nodes. The precise model of data exchange can vary based on the parallelism model in use (e.g., data, model, hybrid, etc.). For example and in one embodiment, each node 1631A-1631P can have a copy of the neural network model and different input data can be provided to each node. Weight deltas 1634 can be generated by each node 1631A-1631P. In one implementation, an allreduce operation can be performed in which a summation unit 1636 receives the set of weight deltas in a receive buffer and generates a sum of the weight delta data 1637. The summation unit 1636 can be any one of the nodes 1631A-1631P or a separate control node. A stochastic gradient descent logic unit (SGD 1638) can generate a new set of weights 1640, which are then transmitted to each node.

In one embodiment, to facilitate the exchange of information between nodes 1631A-1631P, each node can include hardware implemented point-to-point primitive units (PPP 1634A-1634P) to enable the nodes to exchange data in a synchronized manner. The point-to-point techniques described herein be implemented within the communication module 1517 as in FIG. 15B, which may be present within each node. The point-to-point primitive logic within each node can be associated with a set of transmit buffers (TX 1641A-1641P) and receive buffers (RX 1642A-1642P). To exchange data between Node 1 1631A and Node P 1631P, the point-to-point primitive unit 1643P of Node P can issue a request to Node 1 to send a specific block of data to Node P. Node 1 1631A will then send the block of data to Node P 1631P (e.g., via transmit buffer 1641A) as soon as dependencies for the block of data are satisfied, such as, for example, when compute operations associated with the data are complete. Node P 1631P can continue to perform other operations until notified by Node 1 1631A. As soon as the compute operation for the requested data is complete, Node 1 1631A can perform a remote write to the receive buffer 1642P on Node P to write the requested data. In one embodiment, Node 1 1631A can notify Node P 1631P that the write has been completed. In one embodiment, Node P 1631P can monitor the address of the receive buffer 1642P that was provided to Node 1 1631PA for memory updates and copy out the written memory once Node P 1631P notices that a memory write has occurred to the receive buffer 1642P.

Various underlying methods can be used to enable the point-to-point communication. In one embodiment, a remote procedure call can be used to a node to execute logic operations remotely on a different Node. The remote logic can monitor an address space associated with data required by a receive node and initiate a transfer from a transmit node once the compute operations are complete. In addition to having store-with-notify and remote procedure call support, various additional primitives can be implemented, as described above, where such primitives include but are not limited to remote atomics, load with gather list, store with scatter list, and other types of synchronized communication.

For example, in one embodiment a remote atomic store can be performed from Node 1 1631A to Node P 1631P, such that data in memory of Node 1 is stored to memory in Node P as a single, indivisible operation. The atomic store can be performed using hardware primitives supported by interface logic of Node 1 and Node P. Node 1 can send a message to Node P to implement an atomic store, which can be received by interface logic with Node P. Interface logic within Node P can then lock a memory address within memory of Node P, perform the store operation, and release the lock on the memory address, enabling memory of Node P to be atomically updated with data supplied from Node 1. In one embodiment, such operation can be performed entirely within the fabric interface logic of the nodes. In various embodiments, a primitive operation to perform the load with gather list, store with gather list, or other types of synchronized communication operations within the interface logic of the nodes.

In compute nodes that are arranged in a mesh, torus, or hyper-cube, a router at each node allows messages to be directed along the most efficient path to the destination for messages between nodes that are not directly connected. Embodiments described herein provide fabric interconnect logic that can be configured to route memory writes or messages between indirectly connected nodes. Instead of using a node identifier, in one embodiment fabric interconnect logic can route data based the target memory address associated with the message, write, or packet to be relayed. Such techniques can enable an efficient distributed memory system in hardware, particularly for point-to-point fabric interconnects.

Figure 17A:
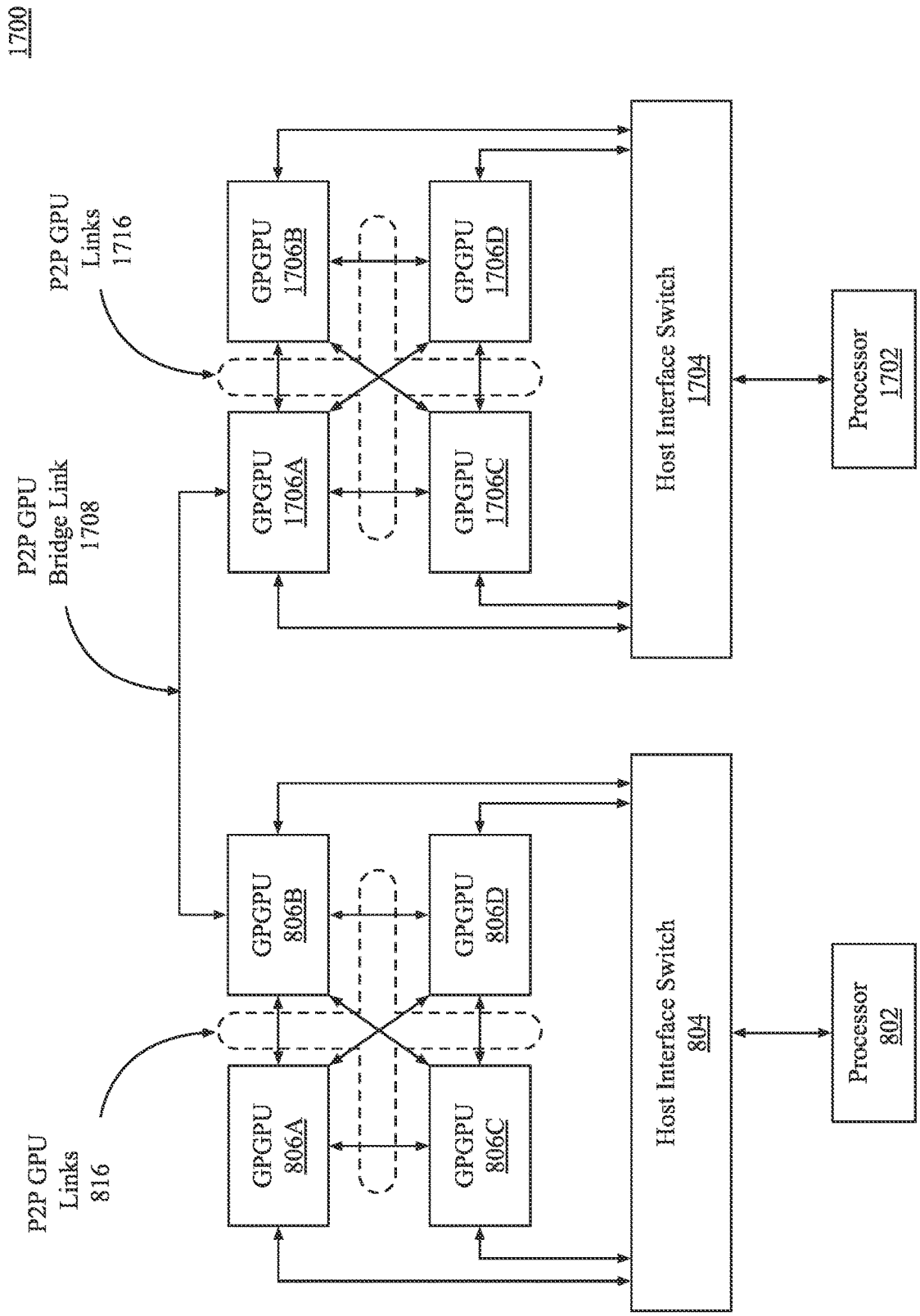
FIG. 17A illustrates a multi-node computing system, according to an embodiment.

FIG. 17A illustrates a multi-node computing system 1700, according to an embodiment. Each node of the multi-node compute system 1700 is similar to the multi-GPU compute system 800 of FIG. 8. GPGPU 806A-806D each interconnect via a set of P2P GPU links 816. GPGPU 1706A-1706D each interconnect via P2P GPU links 1716. GPGPU 170A-1706D may each communicate with processor 1702 via a host interface switch 1704. GPGPU 806A-806D and GPGPU 1706A-1706D are not directly interconnected. However, GPGPU 806B may communicate with GPGPU 1706A via a P2P GPU Bridge Link 1708. In some existing implementations, to transfer data between indirectly connected GPGPUs, for example between GPGPU 806A to GPGPU 1706D, multiple manual transfers may be required. Embodiments described herein enable automatic routing of communications between GPGPUs that are connected via a point-to-point link. In one embodiment the automatic routing is performed by mapping nodes to a distributed virtual memory system.

Figure 17B:
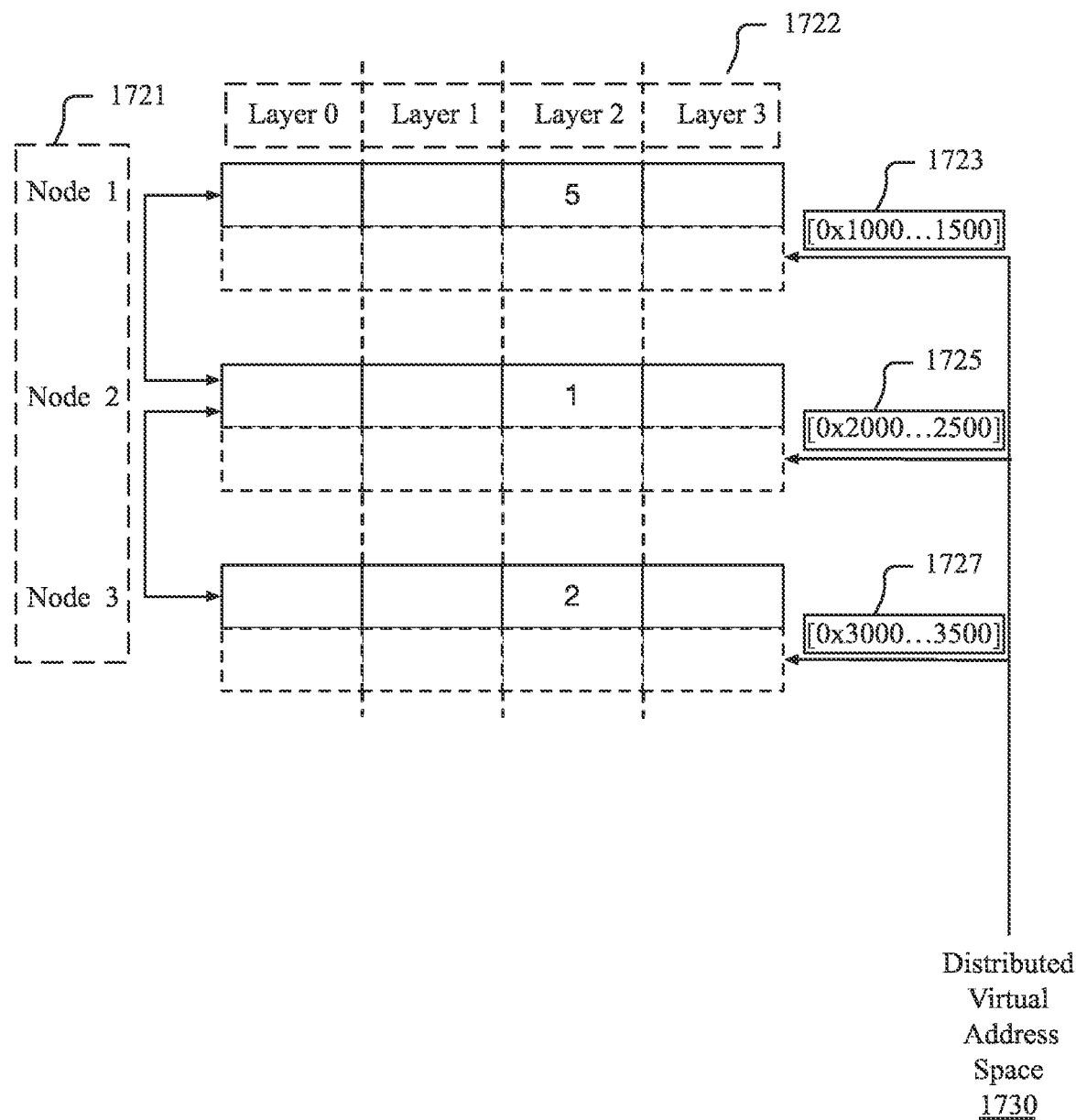
FIG. 17B illustrates a point-to-point network having distributed virtual addresses, according to an embodiment.

FIG. 17B illustrates a point-to-point network having distributed virtual addresses, according to an embodiment. In one embodiment a set of nodes 1721 (Node 1-3) can participate in distributed training for a multi-layer neural network 1722 (Layer 0-3). A negotiation can be performed such that a memory address within each node is associated with a virtual address within a distributed virtual address space 1730. In one embodiment, a specific physical address range in each node is mapped to the virtual addresses associated with the node, such that the same physical addresses in each node is mapped to the distributed virtual address space 1730. The distributed virtual address mapping is exchanged between nodes, such that each node is aware of the address range for each other node. For example, Node 1 can be assigned a memory address in a first memory address range 1723 ([0x1000 to 0x1500]). Node 2 can be assigned a memory address in a second memory address range 1725 ([0x2000 to 0x2500]). Node 3 can be assigned a memory address in a third memory address range 1727 ([0x2000 to 0x3500]). Node 1 can request data from Node 3 by issuing a request for data to Node 3 and providing Node 3 with an address within the first address range 1723. Node 1 is aware that Node 3 has an address range of [0x3000 to 0x3500] and has a receive buffer in memory at an address defined by the formula: node based address+receive buffer offset. Node 1 can request a synchronized write to the receive buffer at Node 3, where the write is a message requesting a read of data at a given read address within Node 3's address space (e.g., the third address range 1727). The fabric interface on Node 1 can determine, based on the write address, that the message is destined for Node 3. The fabric interface can then determine that, to communicate with Node 3, the message may be routed via Node 2. Node 1 can then request a relay via Node 2. The fabric interface on Node 2, based on the destination address, can determine that the message is intended for Node 3 and relay the message to the receive buffer in Node 3. Such techniques can significantly improve the efficiency of communication operations such as the allreduce or allgather operations that involve communication exchanges between all nodes.

Fine-Grain Compute Communication

Embodiments descried herein provide a unified API for expressing compute and communication operations, along with a corresponding implementation that enables compute and communication operations to overlap a fine-grain manner. Fine-grain overlapping compute provides benefits to machine learning compute frameworks and helps to achieve higher compute and communication efficiency in multi-card and/or multi-node implementations. For example and in one embodiment, data parallelism is used in the weight update operation during deep learning training back propagation. The back propagation, as described above, for example in FIG. 16A, includes weight delta computations, inter-node/inter-card weight delta communication, and updated weight computation using stochastic gradient descent. Implementations that use distinct compute and communication APIs and implementations may not be able to realize the maximum amount of parallelism that may be exploited within and across compute nodes or parallel processor cards, as those operations are executed serially in a fixed sequence and at a coarse-grain level. Embodiments described herein enable improved compute and communication parallelism by enabling the scheduling and performance of computational and communication operations at fine-grained detail. By enabling fine-grain compute and communication execution, more efficient compute and communication overlap can be realized, enabling increased parallelism and improved utilization of both compute and communication resources.

Figure 18:
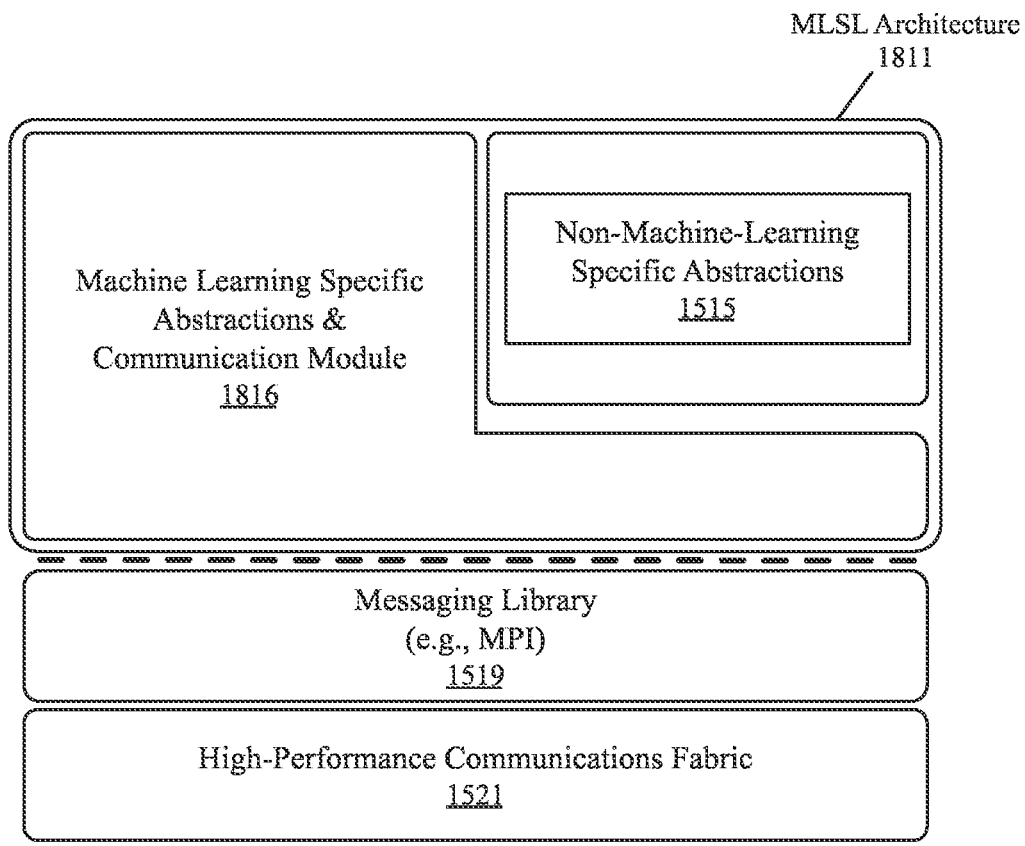
FIG. 18 illustrates an alternate MLSL Architecture, according to an embodiment.

FIG. 18 illustrates an alternate MLSL Architecture 1811, according to an embodiment. The alternate MLSL architecture 1811 is similar to the MLSL architecture 1511 of FIG. 15B, excepting that the machine learning specific abstractions and communication module 1816 are merged into a single module. The merging of the abstract machine learning compute functionality and the communication functionality enables a finer-granularity of compute and communication overlap. Consumer threads and/or cores that are blocking on pending operations can be put to sleep and awaken once the blocking operations are complete. Compute operations can be performed on a granularity of individual data dependencies, such that as soon as the dependencies for a unit of compute are satisfied, the unit of compute can be performed and immediately transmitted to other nodes. A merged API can be provided that combines compute and communication operations such that compute operations can be associated with a communication or synchronization operation or primitive and, as soon as the unit of compute is complete, the computed data can be transmitted.

Figure 19A:
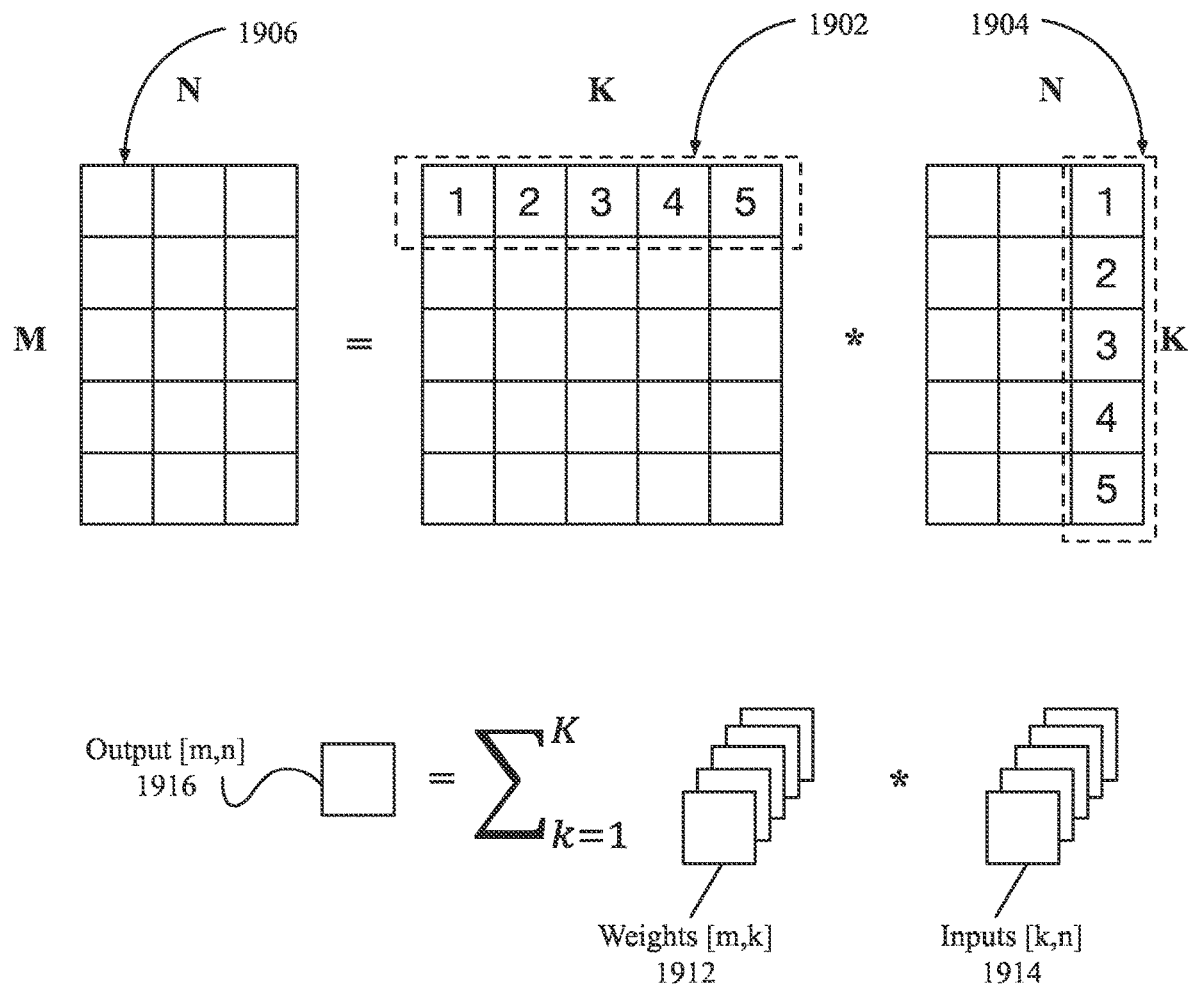
FIG. 19A illustrates a tensor compute operation suitable for fine-grain compute and communication overlap.

FIG. 19A illustrates a tensor compute operation suitable for fine-grain compute and communication overlap. The merged compute and communication API described herein can enable a larger compute operation to be subdivided into smaller chunks and, instead of waiting for the entire communication operation to complete before the results are communicated to other nodes, the results can be communicated at finer-granularity as soon as an individual portion of the compute operation is complete. For example, FIG. 19A illustrates a fine-grained blocked xGEMM operation that is formulated as multiple small block-GEMM operations with parallelism across the M, N, and K dimensions. An inner-mode GEMM kernel is that is optimized for peak architectural performance can be applied in parallel to sub-units of the compute operation. For example and in one embodiment, a portion of a compute operation can be performed using a first data block 1902 and a second data block 1904 to generate a portion of an N×M matrix 1906. The operation can be performed on the first data block 1902 and second data block 1904 and the results can be distributed before the entire matrix operation is complete. In such embodiment, an output [m, n]1916 can be generated based on a collection (e.g., summation) of multiple fine-grained compute operations between weights 1912 and inputs 1914. Such technique allows compute and communication operations to overlap, not only between layers during neural network distributed training, but within a layer as well. As sub-compute operations are completed, those operations can be transmitted to the relevant nodes, for example, using the point-to-point primitives described herein, enabling greater overlap between compute and communication operations and increasing overall system efficiency. This technique differs from existing compute and communication solutions which perform an entire set of compute operations for a layer before transmitting the results to other nodes.

Fine-grain execution of computation and communication requires flexible synchronization mechanisms for enabling a scheduler to orchestrate efficient usage of compute and communication resources. In one embodiment, fine grain execution and communication is implemented via extended memory semantics at the granularity of arbitrary tensors. Instead of relying on polling, consumer threads and/or cores that are blocking on pending operations can be put to sleep and awaken once the blocking operations are complete. Traditional full/empty bits that are defined at memory/cache line granularity are too fine-grain to be optimal for this purpose. Other solutions, such as monitor/mwait, can track only contiguous addresses and any memory write within the range of addresses wakes up the consumer. As an improvement to existing solutions, one embodiment provides a method and apparatus for associating tensor operations with synchronization semantics that allow consumer threads to be woken up only when all operations defined on the tensor are completed.

Figure 19B:
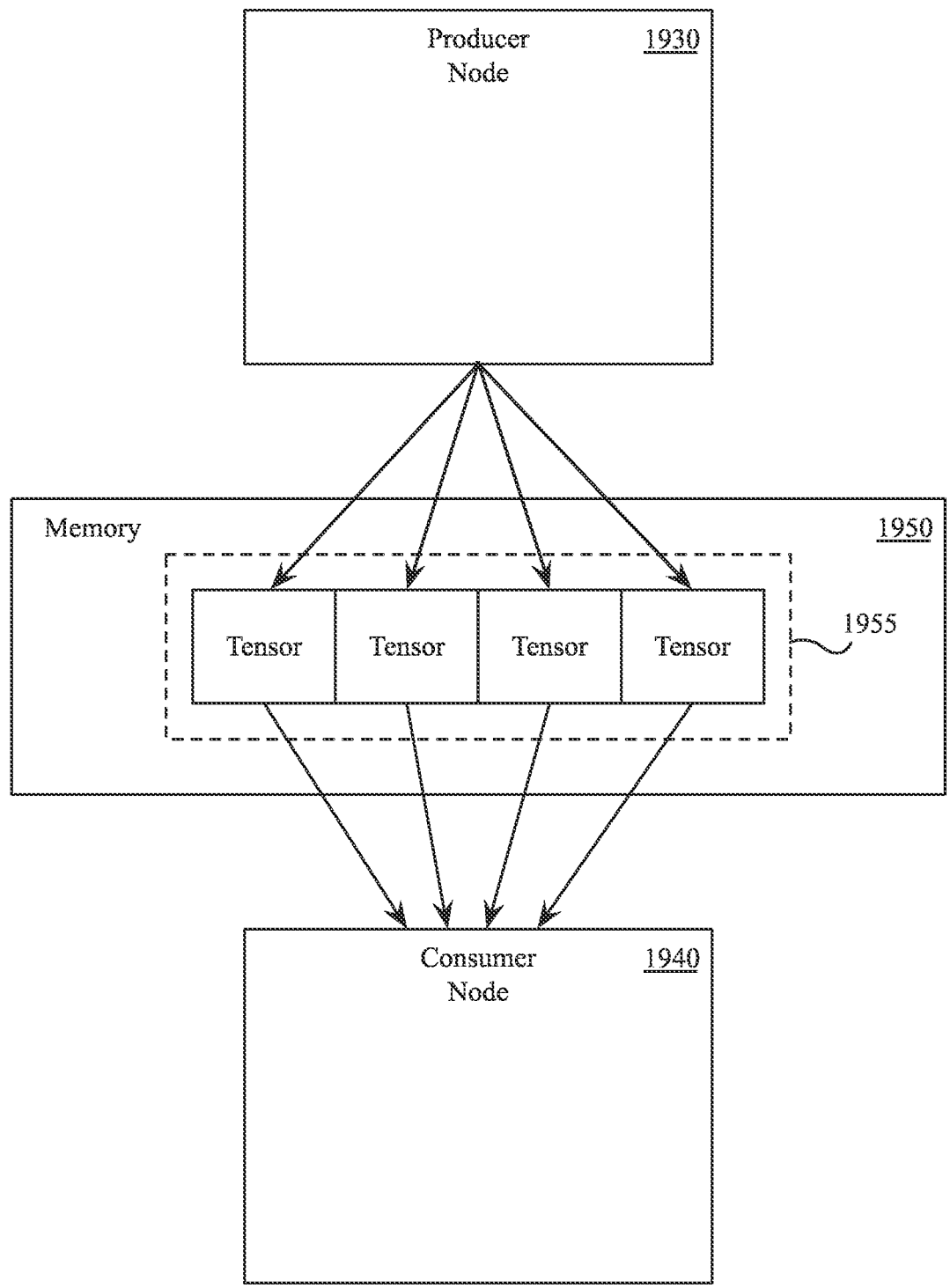
FIG. 19B illustrates synchronized memory access between a multi-node system, according to an embodiment.

FIG. 19B illustrates synchronized memory access within a multi-node system 1920, according to an embodiment. As illustrated, a producer node 1930 and a consumer node 1940 each have access to a shared memory 1950, which may be a distributed and shared virtual address space that is mapped across multiple nodes. The producer node 1930 produces data that will be consumed by the consumer node 1940. When the consumer node 1940 has a dependency upon tensor data 1955 to be computed by the producer node 1930, the consumer node 1940 may block and sleep until all of the required tensor data 1955 is written to memory 1950. With existing semantics, the consumer node 1940 may be interrupted when any write is performed to the addresses. However, the use of such semantics may not be appropriate when the consumer node 1940 has a dependency on all data to be written. If the consumer node 1940 depends on all tensor data 1955, as opposed to any given unit of tensor data, waking on any memory access within the tensor data 1955 will result in numerous spurious wakeups. Additionally, in one embodiment the tensors are stored as multi-dimensional arrays in memory that do not have contiguous addresses. Existing semantics may not be able to monitor data that does not reside within a set of contiguous memory addresses. Accordingly, existing semantics, such as the monitor and wait semantic, cannot be easily used to monitor the tensors.

Embodiments described herein prove a technique to enable the consumer node 1940 to monitor a set of non-contiguous addresses associated with tensors stored as multi-dimensional arrays in memory. In such embodiments, the consumer node 1940 can indicate that the tensor data 1955 is to be monitored, and all memory addresses associated with the tensor data 1955 can be monitored for updates. In one embodiment, the consumer node 1940 can request monitoring to be applied for specific types of updates, such as a remote write to tensor data 1955 memory addresses from the producer node 1930. Additionally, a semantic is provided that allows the consumer node 1940 can request to be notified when all monitored addresses have been written. Further, this mechanism can be used to adjust the granularity and maintenance of hardware cache coherency at synchronization boundaries, as shown in FIG. 19C.

Figure 19C:
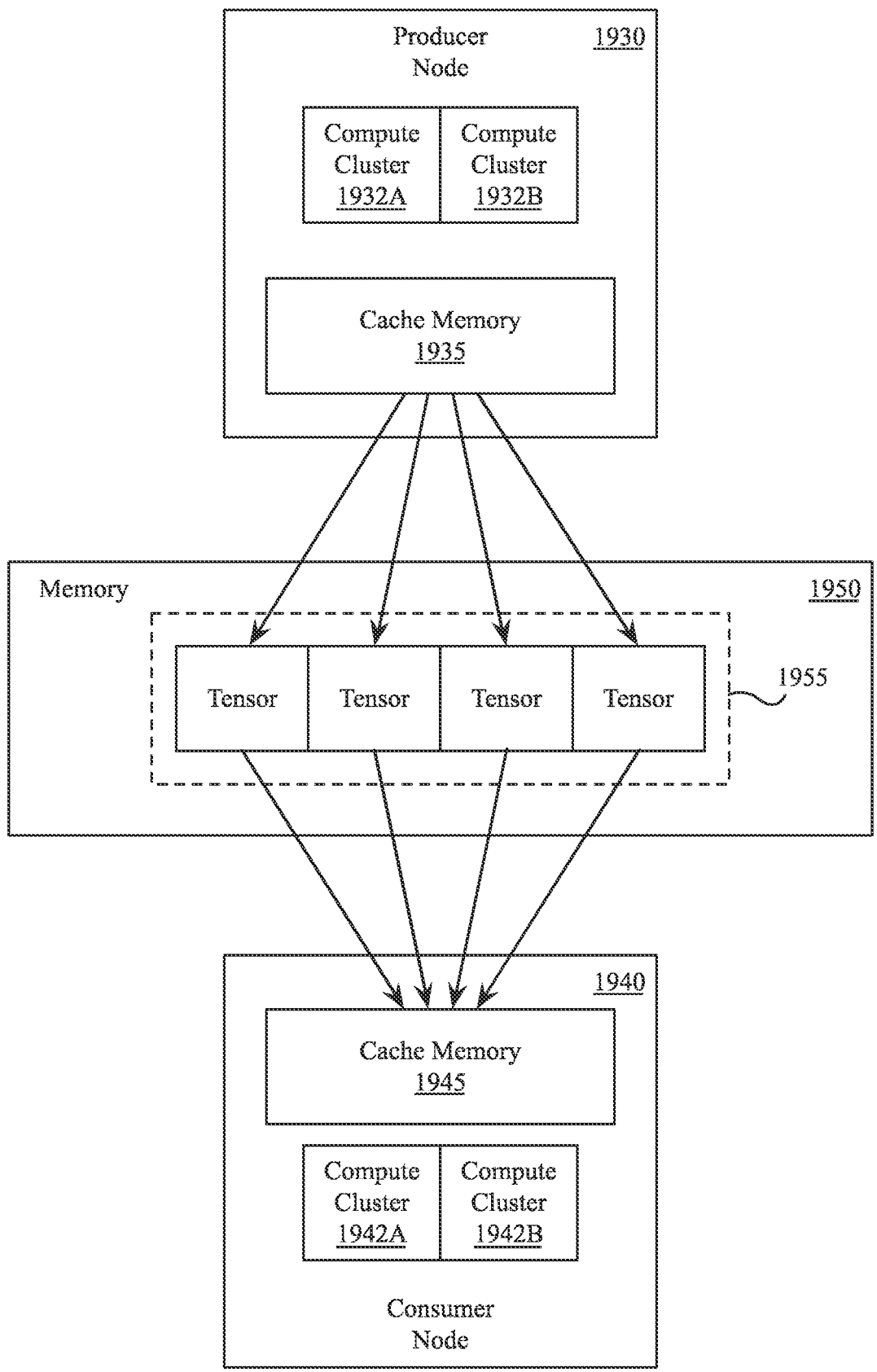
FIG. 19C illustrates memory communication semantics extended to enable coarse grained cache coherency for cache memory data.

FIG. 19C illustrates that the memory communication semantics of FIG. 19B can be extended to enable coarse grained cache coherency for cache memory data. As the tensor data likely spans multiple cache lines on both the producer node and the consumer node, the techniques described herein can enable cache coherency to be performed at the coarse granularity more suitable for tensor data, rather than the cache-line coherency used in conventional systems. For example, in one embodiment the producer node 1930 includes a cache memory 1935 that can cache tensor data 1955 generated by the compute clusters 1932A-1932B within the producer node 1930 before the tensor data 1955 is stored to the shared memory 1950. Additionally, low latency access for tensor data 1955 for the compute clusters 1942A-1942B of the consumer node 1940 can be enabled by cache memory 1945 in the consumer node 1940. Instead of maintaining cache coherency at the cache-line granularity, coherency updates between the cache memory 1935 of the producer node 1930 and the cache memory 1945 of the consumer node 1940 can be performed at the monitored granularity of the tensor data 1955. These batched coherency updates can result in more efficient use of memory bus bandwidth in the use case of coarse memory updates within a multi-node, cache coherent system, such as a multi-GPU system coupled via a cache coherent interconnect.

Figure 20A:
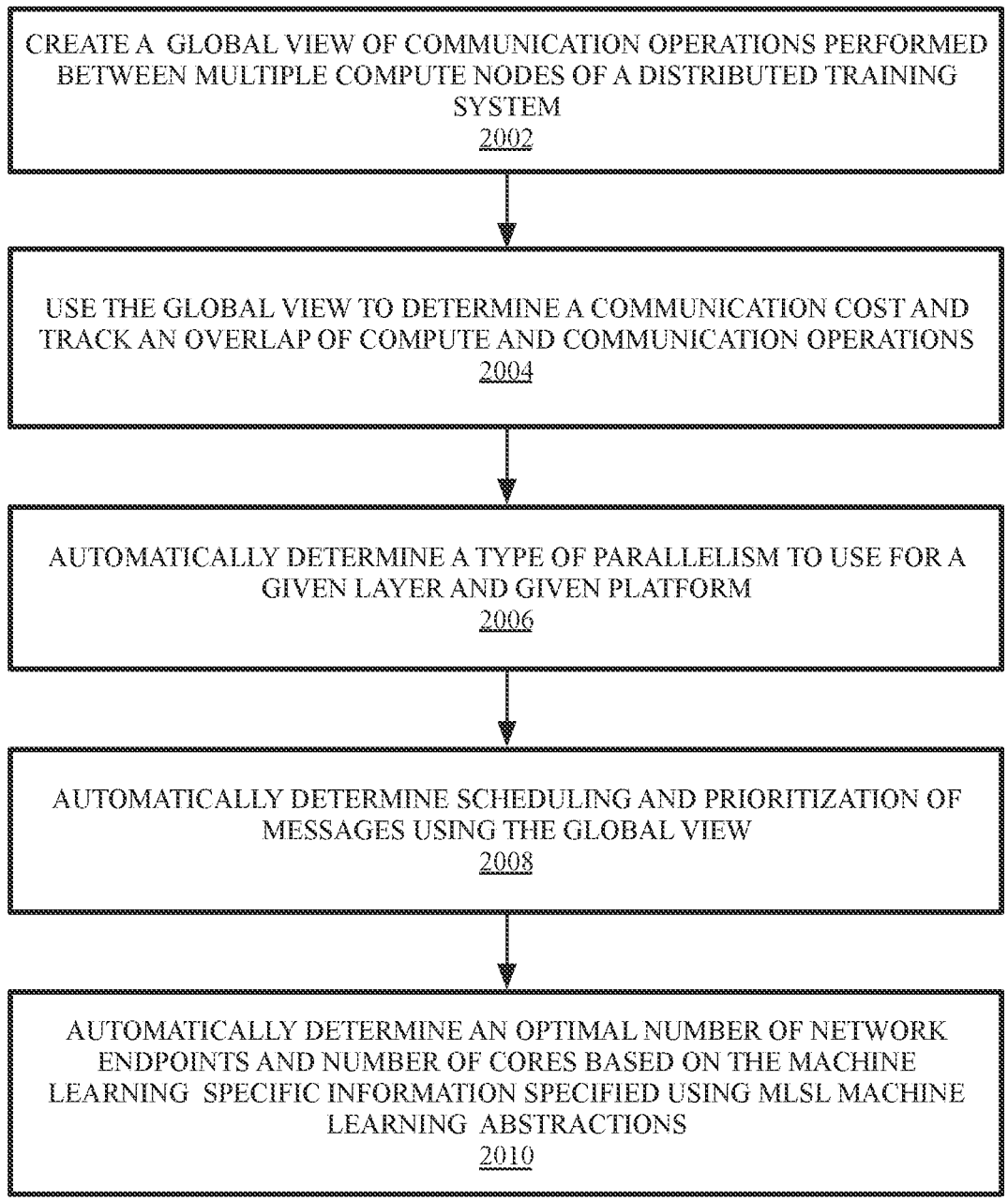
FIG. 20A-20B illustrate flow diagrams that describe operations to enable distributed machine learning via the MLSL API.
Figure 20B:
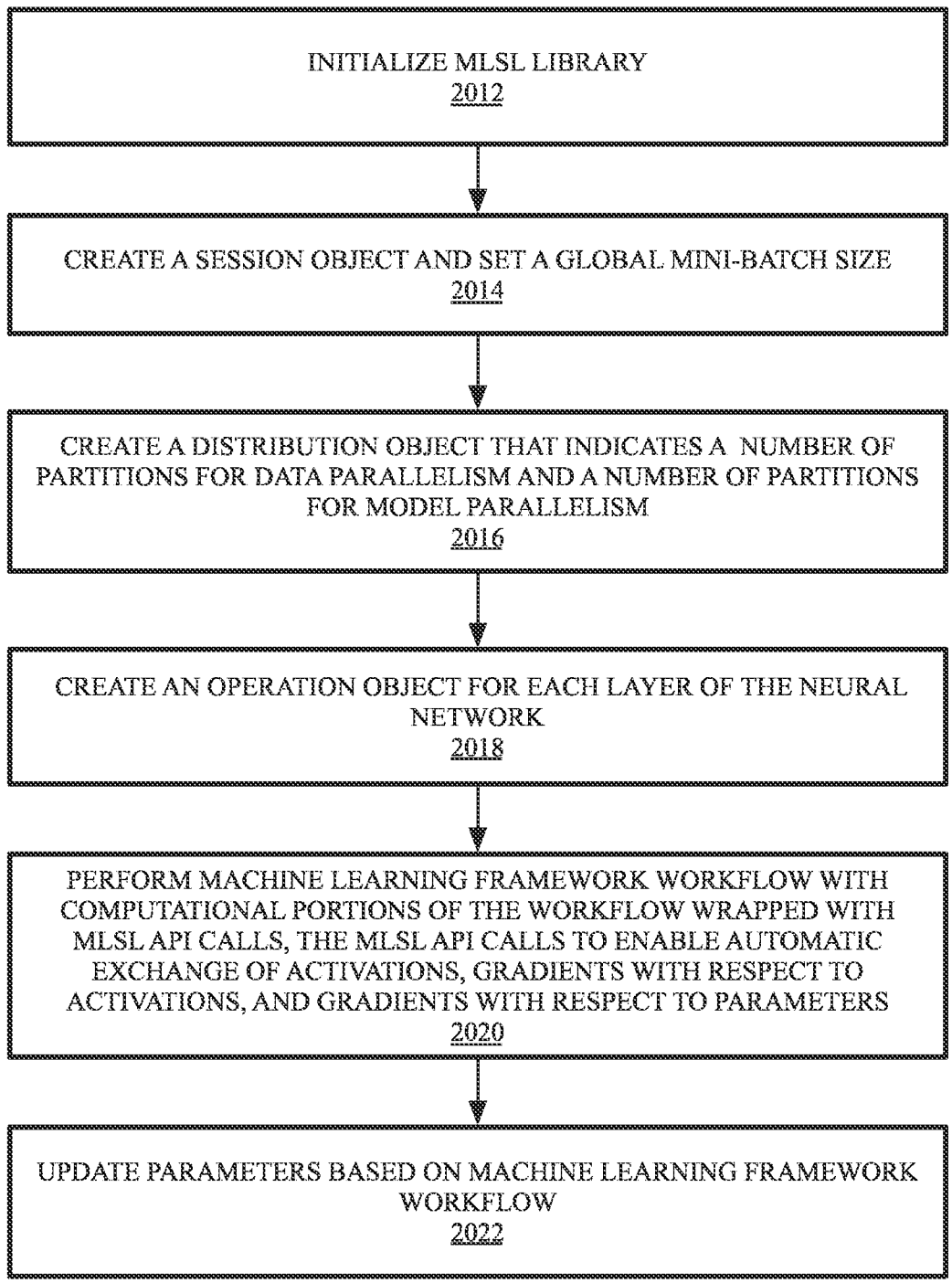

FIGS. 20A-20B illustrate flow diagrams that describe operations to enable distributed machine learning via the MLSL API. General operations are illustrated in FIG. 20A. MLSL setup is illustrated in FIG. 20B.

As shown in FIG. 20A, general MLSL operations include operations to create a global view of the communication operations to be performed between multipole compute nodes of a distributed compute system, as shown at block 2002. The global view is structured using machine learning specific language that will be within the domain knowledge of an application developer for a machine learning application. In one embodiment the global view is internal to the MLSL machine learning abstraction layer and is specified using API commands provided by the MLSL machine learning abstraction layer. The internal global view enables the MLSL to perform an operation referred to as Introspection. Introspection enables the use of the global view to gain insight into the communications performed for the machine learning implementation.

In one embodiment, introspection is used to determine the communication cost of communication operations in the graph and to track the overlap of the compute and communication operations, as shown at block 2004. In one embodiment the communication loss is quantified in terms of a compute latency introduced by data communication between the compute nodes. In addition, introspection keeps track of compute cost across two successive communication operations. This information can then be used for scheduling communication operations effectively. For example, if there is a large compute cost, multiple communication operations can be scheduled during this time. For smaller compute costs, scheduling can choose to send shorter communication operations or split a large communication operation into smaller pieces that can hide behind useful compute operation.

Tracking the overlap can be used to determine the degree to which communication time is overlapped with useful computation. In one embodiment, compute and communication time can be obtained by running the actual machine learning topology for few epochs or using a pre-populated database with delays for different message sizes and layer types for that platform. In one embodiment overlap is quantified in terms of a number of cycles of overlapping compute and communication time or amount of time in which overlapping compute and communication operations are performed. In some embodiments, a combination of such operations can be performed. In one embodiment the introspection capability may be exposed to the application developer to enable the identification of performance bottlenecks and/or for performing debugging operations.

In one embodiment the application developer can explicitly specify the type of parallelism to use for each layer of the neural network. In one embodiment, the global view and introspection can be used to automatically determine a type parallelism to use for a given layer and given platform, as shown at block 2006. The best type of parallelism to use can be determined by attempting different combinations at runtime or using heuristics. For example, one heuristic can indicate to use data parallelism when the size of the activations is greater than the size of the weights or model parallelism when the size of the weights are greater than the size of the activations. The size of the weights or activations is determined in part based on a comparison of the x and y dimensions of the activation and weight data. In one embodiment, multiple types of parallelism can be evaluated at runtime for each layer of a neural network during distributed training. The parallelism to use for the neural network layer can then be determined based on communication efficiency indicated by the runtime evaluations.

In one embodiment the general MLSL logic additionally performs operations to automatically determine scheduling and prioritization of messages using the global view, as shown at block 2008. For example, the introspection capability enables the MLSL logic to perform operations that attempt various combinations and select the optimal combination of scheduling and prioritization. Scheduling mechanisms include the use of prioritized channels, delaying low priority messages, and/or splitting large messages. Such techniques can be implemented at least in part via software logic included within the MLSL library object. The MLSL logic can be performed at least in part in hardware, for example, within a network interface controller or a host fabric interface. While some embodiments enable automatic determination of scheduling and priority for communications, in one embodiment an application developer can explicitly schedule and prioritize messaging by arranging communication start and wait operations for optimal performance, as optimal scheduling and prioritization may vary across platforms and neural network topologies.

In one embodiment the general MLSL logic additionally performs operations to automatically determine the optimal number of network endpoints and number of cores based on the machine learning specific information specified using the MLSL API, as shown at block 2010. In one embodiment the MLSL API can enable the specification of the distributed machine learning system using machine learning topology, including the neural network topology and the number of layers of the associated machine learning network. In one embodiment the number of endpoints and network communication cores can be inferred using MLSL global view and platform data. For example, communication performance can improve when the network is driven using more cores. However, the assignment of network cores is performed considering the tradeoff between the number of cores used for compute and the number of cores used for communication. Thus, in one embodiment MLSL introspection allows compute and communication time to be balanced to optimize overall system performance. For example, the number of cores used for communication can be dynamically varied and an optimal number of cores can be selected based on the impact on total compute time. Alternatively, automatic determination can be bypassed and the application developer can explicitly specify the number of cores and the associated number of network endpoints to use for communication.

As shown in FIG. 20B, operations for MLSL setup include a first operation to initialize the MLSL library to enable use of the MLSL API, as shown at block 2012. The MLSL logic can then be used to create a session object and set a global mini-batch size, as shown at block 2014. The global mini-batch size can be determined based on the sum of local batch sizes. The MLSL logic can then be used to create a distribution object that indicates a number of partitions for data parallelism and a number of partitions for model parallelism, as shown at block 2106.

The MLSL logic can then be used to create an operation object for each layer of the neural network, as shown at block 2018. Creating an operation object for each layer, in one embodiment, include to create an auxiliary OperationRegInfo object that holds information about learnable parameters and activations shapes. The parameters define a specific relationship between input and output activations and parameters of operation. The MLSL API enables the developer to add input/output activation shapes and shapes of parameters to the OperationRegInfo object. Using the MLSL API, the developer can then create an operation object, delete the delete OperationRegInfo object, and set dependencies between operations. Using information about the batch size and shapes, a developer can then use the MLSL API to allocate buffers for gradient with respect to parameters, input activation, and gradients with respect to the input activation. As linked operations share common activations, the link operations may be allocated on one side of a transaction and reused on the other size of the transaction. they should be allocated only on one side and reused on the other side). In one embodiment the MLSL library provides a dedicated allocator what enables specialized optimizations. In one embodiment, the session object created at block 2014 includes a commit method that may be used to finalize the creation of the Operation object.

The MLSL logic can then be used to perform machine learning framework workflow with computational portions of the workflow wrapped with MLSL API calls, as shown at block 2020. In one embodiment the MLSL API calls enable automatic exchange of activations, gradients with respect to activations, and gradients with respect to parameters. The MLSL logic can then be used to update parameters based on the machine learning framework workflow performed at block 2022.

Figure 21A:
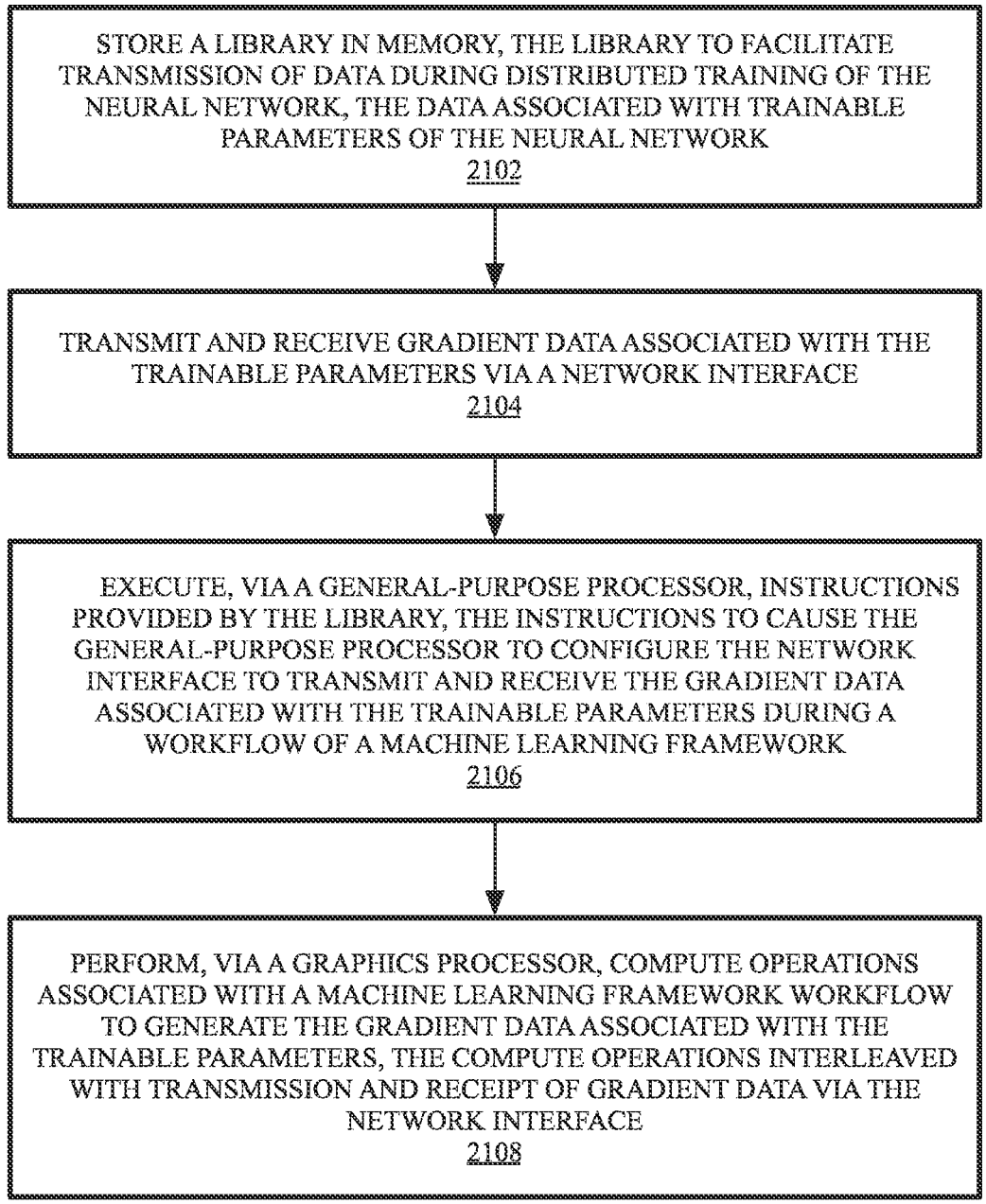
FIG. 21A-21B illustrate methods of performing distributed training of a neural network, according to an embodiment.
Figure 21B:
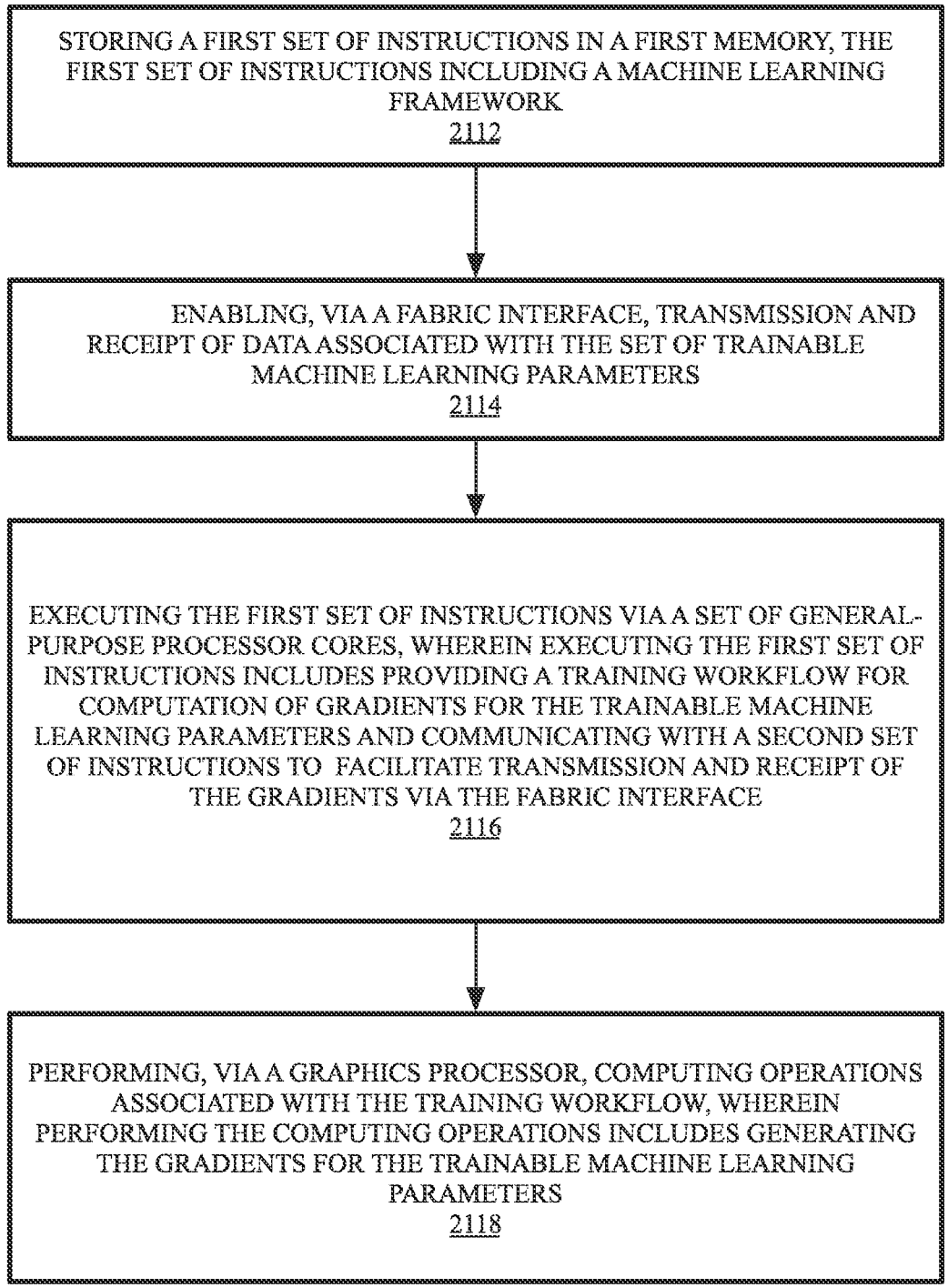

FIG. 21A-21B illustrate methods of performing distributed training of a neural network, according to an embodiment. Distributed training of the neural network can be performed using graphics processing logic as described herein, where the graphics processing logic is included within multiple interconnected worker nodes. In various embodiments, the multiple interconnected worker nodes can be within a single computing device or chassis or can be distributed across multiple computing devices or chassis. For example, the multiple interconnected worker nodes can be configured in a manner similar to the multi-node computing system 1700 as in FIG. 17A.

In one embodiment, as shown at FIG. 21A, a method includes to store a library in memory, where the library is configured to facilitate transmission of data during distributed training of the neural network, as shown at block 2102. The data can be associated with trainable parameters of the neural network. During training, multiple nodes can transmit and receive gradient data associated with the trainable parameters via a network interface, as shown at block 2104. The nodes can execute, via a general-purpose processor, instructions provided by the library, as shown at block 2106. The instructions can cause the general-purpose processor to configure the network interface to transmit and receive the gradient data associated with the trainable parameters during a workflow of a machine learning framework. Additionally, a worker node can perform, via a graphics processor, compute operations associated with a machine learning framework workflow to generate the gradient data associated with the trainable parameters, as shown at block 2108. The compute operations can be interleaved with transmission and receipt of gradient data via the network interface. The interleaved compute operations can overlap, such that a first portion of data can be transmitted while compute operations are performed for a second portion of data.

FIG. 21B illustrates a distributed training method for a neural network that can be performed using graphics processing logic as described herein. In various embodiments, the multiple interconnected worker nodes can be within a single computing device or chassis or can be distributed across multiple computing devices or chassis. The method can be implemented by one or more processing devices within a general-purpose processor, a graphics processor, or a processor within a fabric interface. The first or second instructions described below can be instructions provided by a library within the machine learning scaling architecture

1511, 1811 as in FIG. 15B, FIG. 18, or an equivalent library described herein, such as the NCCL library.

In one embodiment, as shown at block 2112, the method includes storing a first set of instructions in a first memory, the first set of instructions including a machine learning framework. The first memory can be a system memory accessible by all or most components within a data processing system. For example, the first memory can be a system memory 104 as in FIG. 1. As shown at block 2114, the method additionally includes enabling, via a fabric interface, transmission and receipt of data associated with the set of trainable machine learning parameters. Transmission and receipt of data can be performed or facilitated by a messaging library in communication with a high-performance communication fabric, such as the messaging library 1519 and high-performance communication fabric 1521 of FIG. 15B.

In one embodiment, as shown at block 2116, the method additionally includes executing the first set of instructions via a set of general-purpose processor cores. Executing the first set of instructions includes providing a training workflow for computation of gradients for the trainable machine learning parameters and communicating with a second set of instructions. The second set of instructions can facilitate transmission and receipt of the gradients via the fabric interface. As shown at block 2118, the method additionally includes performing, via a graphics processor, computing operations associated with the training workflow. Performing the computing operations can include generating the gradients for the trainable machine learning parameters. In one embodiment, the gradients can be stored in a memory shared between the graphics processor and the fabric interface, allowing the gradient data to be transmitted without requiring the data to be stored in system memory before transmission.

Figure 22:
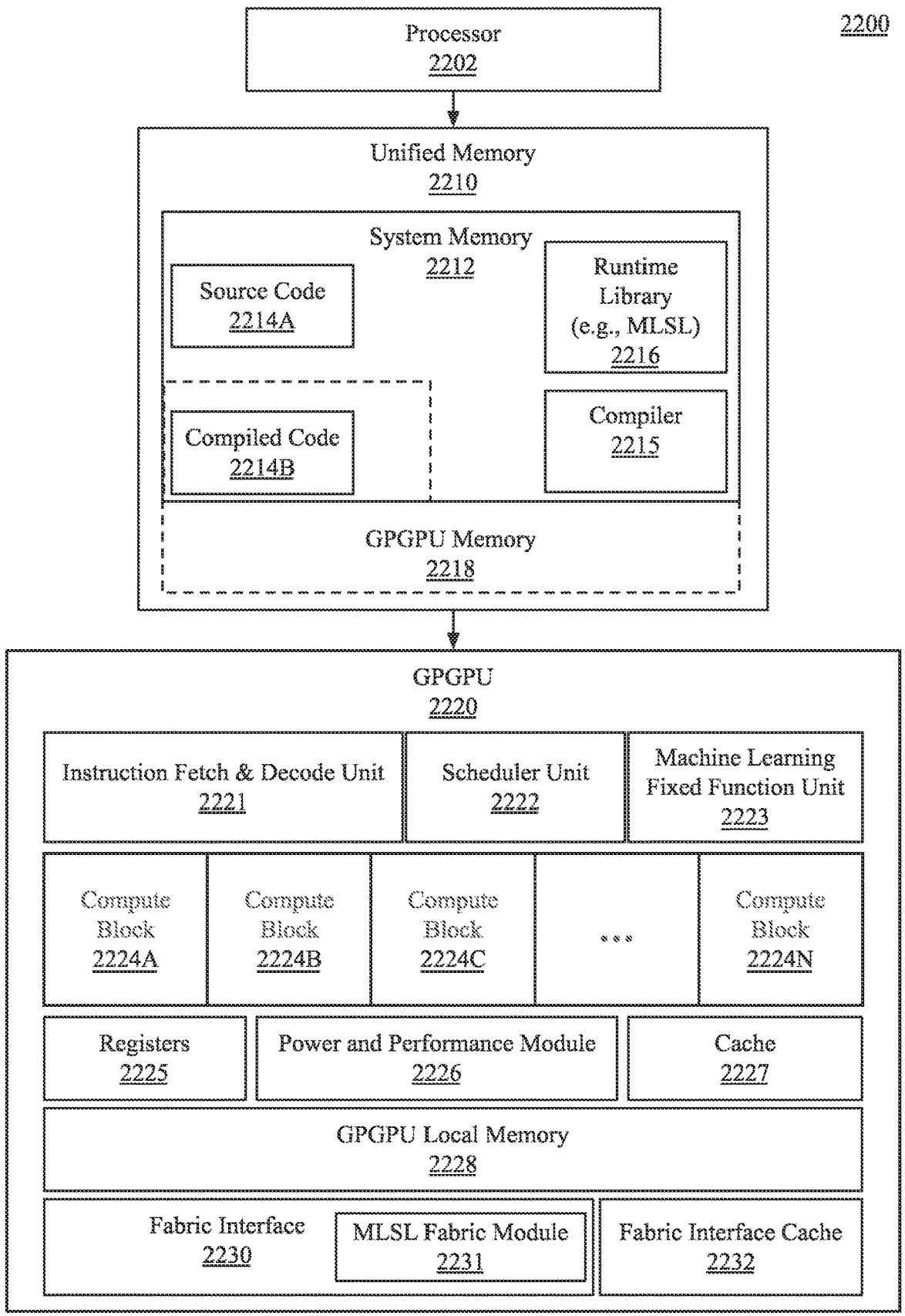
FIG. 22 is a block diagram of a data processing system, according to embodiments described herein.

FIG. 22 is a block diagram of a data processing system 2200, according to embodiments described herein. The data processing system 2200 is a heterogeneous processing system having a processor 2202, unified memory 2210, and a GPGPU 2220 including machine learning acceleration logic. The processor 2202 and the GPGPU 2220 can be any of the processors and GPGPU/parallel processors as described herein. The processor 2202 can execute instructions for a compiler 2215 stored in system memory 2212. The compiler 2215 executes on the processor 2202 to compile source code 2214A into compiled code 2214B. The compiled code 2214B can include code that may be executed by the processor 2202 and/or code that may be executed by the GPGPU 2220. During compilation, the compiler 2215 can perform operations to insert metadata, including hints as to the level of data parallelism present in the compiled code 2214B and/or hints regarding the data locality associated with threads to be dispatched based on the compiled code 2214B. The compiler 2215 can include the information necessary to perform such operations or the operations can be performed with the assistance of a runtime library 2216, such as the machine learning scaling library (MLSL) described herein. The runtime library 2216 can also facilitate the compiler 2215 in the compilation of the source code 2214A and includes instructions that are linked at runtime with the compiled code 2214B to facilitate execution of the compiled instructions on the GPGPU 2220.

The unified memory 2210 represents a unified address space that may be accessed by the processor 2202 and the GPGPU 2220. The unified memory includes system memory 2212 as well as GPGPU memory 2218. The GPGPU memory 2218 includes GPGPU local memory 2228 within the GPGPU 2220 and can also include some or all of system memory 2212. For example, compiled code 2214B stored in system memory 2212 can also be mapped into GPGPU memory 2218 for access by the GPGPU 2220.

The GPGPU 2220 includes multiple compute blocks 2224A-2224N, which each include one or more of the processing clusters 214A-214N or one or more instance of the processing array 212 as in FIG. 2A. The GPGPU 2220 also includes a set of registers 2225, cache memory 2227, and a power and performance module 2226 that can be used as shared resources for the compute blocks 2224A-2224N. The power and performance module 2225 can be configured to adjust power delivery and clock frequencies for the compute blocks 2224A-2224N to power gate idle components within the compute blocks 2224A-2224N under heavy workloads. The GPGPU 2220 includes GPGPU local memory 2228, which is physical memory that shares a graphics card or multi-chip module with the GPGPU 2220.

In one embodiment the GPGPU 2220 includes graphics and compute acceleration logic including an instruction fetch and decode unit 2221, a scheduler unit 2222, and a machine learning fixed function unit 2223. The fetch and decode unit 2221 includes logic to fetch and decode instructions to be computed by the GPGPU 2220. In one embodiment the executed instructions can sequence and/or serialize, via the scheduler unit 2222, a set of operations and/or micro-operations to be performed via compute block 2224A-2224N and/or the machine learning fixed function unit 2223.

In one embodiment the machine learning fixed function unit 2223 is an application specific integrated circuit explicitly and exclusively configured to perform a large number of parallel matrix multiplication operations. In one embodiment the machine learning fixed function unit 2223 is configured to perform matrix multiplications for convolution filters having non power-of-two filter sizes. In one embodiment the machine learning fixed function unit 2223 is a field programmable gate array (FPGA) that provides fixed function logic that can updated between workloads.

In some embodiments, the GPGPU 2220 includes an integrated fabric interface 2230 and fabric interface cache 2232. In one embodiment, the integrated fabric interface 2230 additionally includes an MLSL fabric module 2231 that enables the fabric interface to provide hardware acceleration for certain MLSL operations. The fabric interface 2230 can enable communication with a high-performance communications fabric, such as the high-performance communications fabric 1521 of FIG. 15B. The fabric interface 2230 has an address space that is mapped to at least a portion of the GPGPU local memory 2228 and in one embodiment can participate in the unified memory 2210 shared by the processor 2202 and the GPGPU 2220. The fabric interface cache 2232 is used to cache data received from or to be transmitted to the communication fabric that enables data communication between compute nodes. In one embodiment when computation results are computed by the GPGPU 2220 and stored within the GPGPU local memory 2228, the fabric interface 2230 can transmit the data to other compute nodes from the GPGPU local memory 2228. In such embodiment, data is not required to be transmitted to the system memory 2212 unless the data is required for use by an application executing on the processor 2202.

The MLSL fabric module 2231 is configured to facilitate low latency transmission of data between nodes. In various embodiments, the MLSL fabric module 2231 can be a firmware module configured to execute firmware provided by the MLSL, or an equivalent machine learning scaling library. In one embodiment, the MLSL fabric module 2231 is a processor or microcontroller configured to execute instructions to enable point-to-point communication primitives as described herein. In one embodiment, the MLSL fabric module 2231 can receive a set of addresses within the GPGPU local memory 2228 that are associated with data objects managed by the MLSL runtime (e.g., runtime library 2216). For example, an address range for an output buffer to store activation data to be generated by the GPGPU 2220 can be provided to the MLSL fabric module 2231. The MLSL fabric module 2231 can then be configured to monitor the address range for updates. When the address range receives a write of the activation data output by the GPGPU 2220, the MLSL fabric module 2231 can schedule a transfer directly to the fabric interface 2230 to transfer the output activation data. The MLSL fabric module 2231 can also be used to implement the fine-grained communication and point-to-point hardware communication techniques described herein.

The protocol supported by the fabric interface 2230 can vary. In one embodiment, the fabric interface 2230 is high-speed Ethernet interface. In one embodiment, the fabric interface 2230 is an Omni-Path interconnect interface. In one embodiment, the fabric interface 2230 is an InfiniBand interface. In one embodiment, the fabric interface 2230 is a version of the NVLink interface, or another NVHS based interconnect. Other fabric interface technologies may also be supported.

It is to be appreciated that a lesser or more equipped system than the example described above may be preferred for certain implementations. Therefore, the configuration of the data processing system 2200 may vary across implementations depending upon numerous factors, such as price constraints, performance requirements, technological improvements, or other circumstances. The embodiments described herein may find extensive use within high-performance computing and machine learning training environments. Accordingly, the present description anticipates the data processing system 2200, and other data processing and computing systems described herein to be implemented as a high-performance server or server array within a distributed computing system. Such distributed computing system can be implemented within a datacenter or server farm. However, embodiments are not limited to such implementation, and the techniques described herein may also find use in a large-scale distributed compute system of lower performance devices, such as but not limited to mobile or handheld devices, tablet computing devices, or connected consumer electronic devices.

Additional Exemplary Graphics Processing System

Details of the embodiments described above can be incorporated within graphics processing systems and devices described below. The graphics processing system and devices of FIG. 23 through FIG. 36 illustrate alternative systems and graphics processing hardware that can implement any and all of the techniques described above.

Additional Exemplary Graphics Processing System Overview

Figure 23:
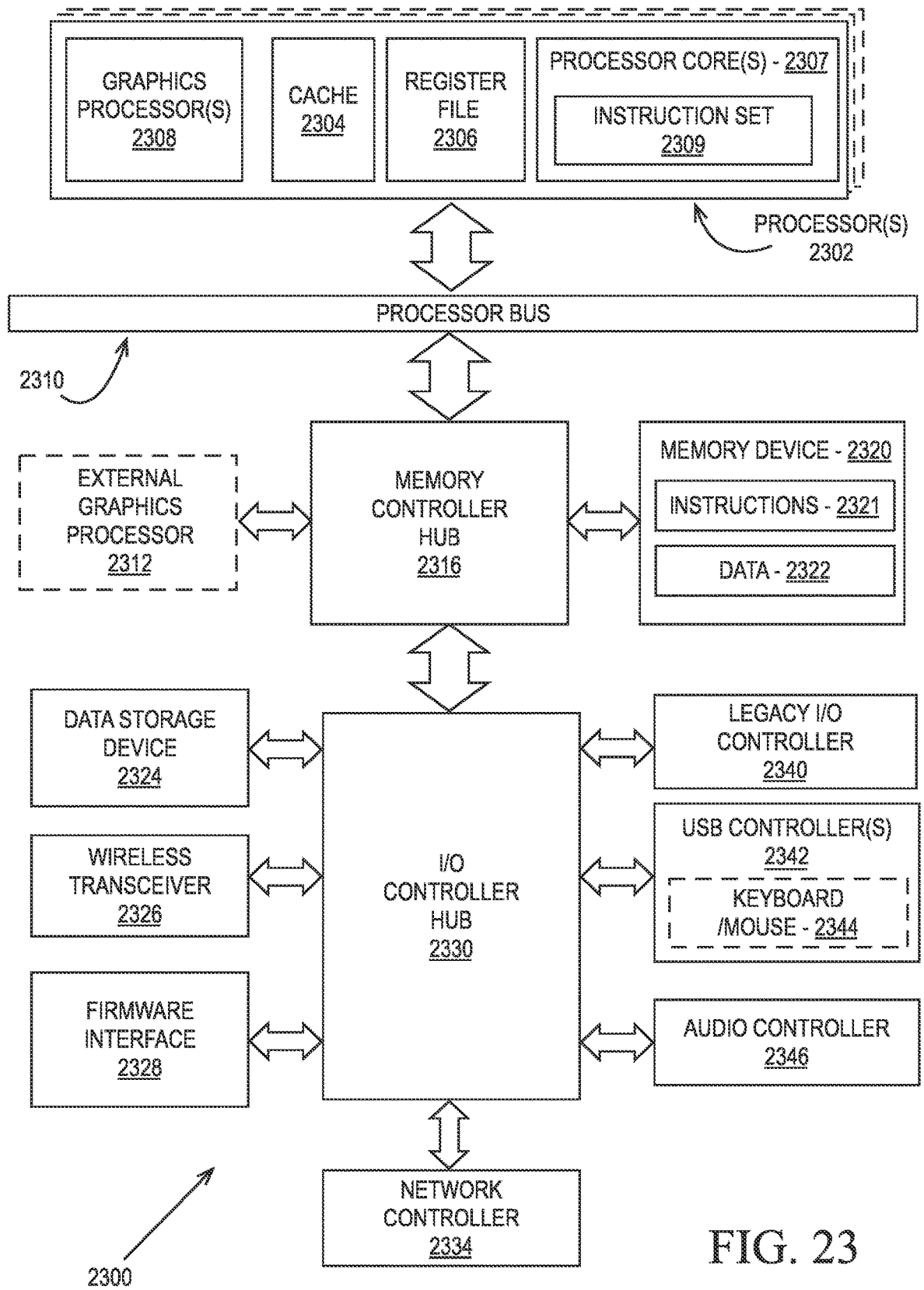
FIG. 23 is a block diagram of a processing system, according to an embodiment.

FIG. 23 is a block diagram of a processing system 2300, according to an embodiment. In various embodiments the system 2300 includes one or more processors 2302 and one or more graphics processors 2308, and may be a single processor desktop system, a multiprocessor workstation system, or a server system having a large number of processors 2302 or processor cores 2307. In one embodiment, the system 2300 is a processing platform incorporated within a system-on-a-chip (SoC) integrated circuit for use in mobile, handheld, or embedded devices.

An embodiment of system 2300 can include, or be incorporated within a server-based gaming platform, a game console, including a game and media console, a mobile gaming console, a handheld game console, or an online game console. In some embodiments system 2300 is a mobile phone, smart phone, tablet computing device or mobile Internet device. Data processing system 2300 can also include, couple with, or be integrated within a wearable device, such as a smart watch wearable device, smart eyewear device, augmented reality device, or virtual reality device. In some embodiments, data processing system 2300 is a television or set top box device having one or more processors 2302 and a graphical interface generated by one or more graphics processors 2308.

In some embodiments, the one or more processors 2302 each include one or more processor cores 2307 to process instructions which, when executed, perform operations for system and user software. In some embodiments, each of the one or more processor cores 2307 is configured to process a specific instruction set 2309. In some embodiments, instruction set 2309 may facilitate Complex Instruction Set Computing (CISC), Reduced Instruction Set Computing (RISC), or computing via a Very Long Instruction Word (VLIW). Multiple processor cores 2307 may each process a different instruction set 2309, which may include instructions to facilitate the emulation of other instruction sets. Processor core 2307 may also include other processing devices, such a Digital Signal Processor (DSP).

In some embodiments, the processor 2302 includes cache memory 2304. Depending on the architecture, the processor 2302 can have a single internal cache or multiple levels of internal cache. In some embodiments, the cache memory is shared among various components of the processor 2302. In some embodiments, the processor 2302 also uses an external cache (e.g., a Level-3 (L3) cache or Last Level Cache (LLC)) (not shown), which may be shared among processor cores 2307 using known cache coherency techniques. A register file 2306 is additionally included in processor 2302 which may include different types of registers for storing different types of data (e.g., integer registers, floating point registers, status registers, and an instruction pointer register). Some registers may be general-purpose registers, while other registers may be specific to the design of the processor 2302.

In some embodiments, processor 2302 is coupled with a processor bus 2310 to transmit communication signals such as address, data, or control signals between processor 2302 and other components in system 2300. In one embodiment the system 2300 uses an exemplary 'hub' system architecture, including a memory controller hub 2316 and an Input Output (I/O) controller hub 2330. A memory controller hub 2316 facilitates communication between a memory device and other components of system 2300, while an I/O Controller Hub (ICH) 2330 provides connections to I/O devices via a local I/O bus. In one embodiment, the logic of the memory controller hub 2316 is integrated within the processor.

Memory device 2320 can be a dynamic random-access memory (DRAM) device, a static random-access memory (SRAM) device, flash memory device, phase-change memory device, or some other memory device having suitable performance to serve as process memory. In one embodiment the memory device 2320 can operate as system memory for the system 2300, to store data 2322 and instructions 2321 for use when the one or more processors 2302 executes an application or process. Memory controller hub 2316 also couples with an optional external graphics processor 2312, which may communicate with the one or more graphics processors 2308 in processors 2302 to perform graphics and media operations.

In some embodiments, ICH 2330 enables peripherals to connect to memory device 2320 and processor 2302 via a high-speed I/O bus. The I/O peripherals include, but are not limited to, an audio controller 2346, a firmware interface 2328, a wireless transceiver 2326 (e.g., Wi-Fi, Bluetooth), a data storage device 2324 (e.g., hard disk drive, flash memory, etc.), and a legacy I/O controller 2340 for coupling legacy (e.g., Personal System 2 (PS/2)) devices to the system. One or more Universal Serial Bus (USB) controllers 2342 connect input devices, such as keyboard and mouse 2344 combinations. A network controller 2334 may also couple with ICH 2330. In some embodiments, a high-performance network controller (not shown) couples with processor bus 2310. It will be appreciated that the system 2300 shown is exemplary and not limiting, as other types of data processing systems that are differently configured may also be used. For example, the I/O controller hub 2330 may be integrated within the one or more processor 2302, or the memory controller hub 2316 and I/O controller hub 2330 may be integrated into a discreet external graphics processor, such as the external graphics processor 2312.

Figure 24:
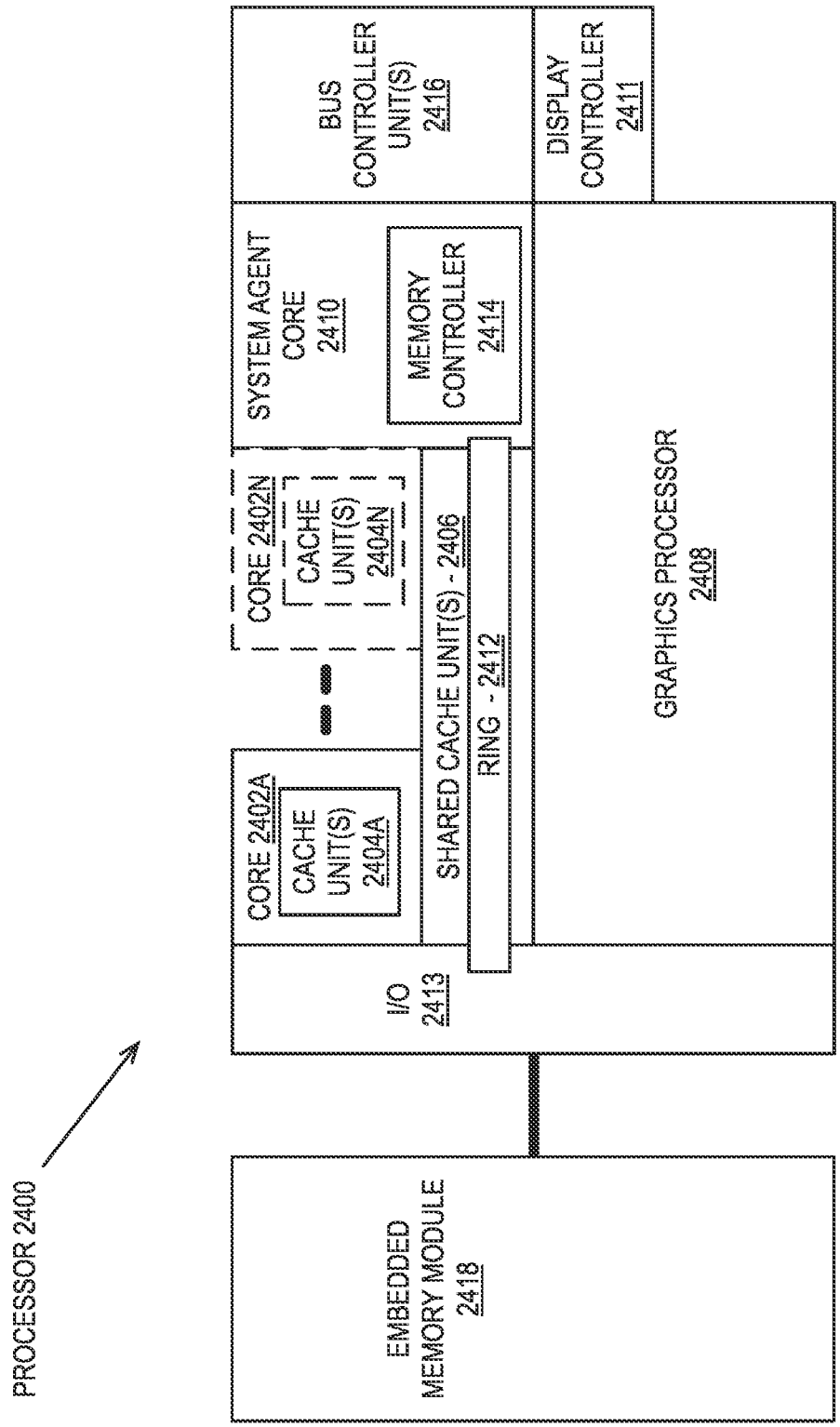
FIG. 24 is a block diagram of a processor according to an embodiment.

FIG. 24 is a block diagram of an embodiment of a processor 2400 having one or more processor cores 2402A-2402N, an integrated memory controller 2414, and an integrated graphics processor 2408. Those elements of FIG. 24 having the same reference numbers (or names) as the elements of any other figure herein can operate or function in any manner similar to that described elsewhere herein, but are not limited to such. Processor 2400 can include additional cores up to and including additional core 2402N represented by the dashed lined boxes. Each of processor cores 2402A-2402N includes one or more internal cache units 2404A-2404N. In some embodiments each processor core also has access to one or more shared cached units 2406.

The internal cache units 2404A-2404N and shared cache units 2406 represent a cache memory hierarchy within the processor 2400. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 2406 and 2404A-2404N.

In some embodiments, processor 2400 may also include a set of one or more bus controller units 2416 and a system agent core 2410. The one or more bus controller units 2416 manage a set of peripheral buses, such as one or more Peripheral Component Interconnect buses (e.g., PCI, PCI Express). System agent core 2410 provides management functionality for the various processor components. In some embodiments, system agent core 2410 includes one or more integrated memory controllers 2414 to manage access to various external memory devices (not shown).

In some embodiments, one or more of the processor cores 2402A-2402N include support for simultaneous multi-threading. In such embodiment, the system agent core 2410 includes components for coordinating and operating cores 2402A-2402N during multi-threaded processing. System agent core 2410 may additionally include a power control unit (PCU), which includes logic and components to regulate the power state of processor cores 2402A-2402N and graphics processor 2408.

In some embodiments, processor 2400 additionally includes graphics processor 2408 to execute graphics processing operations. In some embodiments, the graphics processor 2408 couples with the set of shared cache units 2406, and the system agent core 2410, including the one or more integrated memory controllers 2414. In some embodiments, a display controller 2411 is coupled with the graphics processor 2408 to drive graphics processor output to one or more coupled displays. In some embodiments, display controller 2411 may be a separate module coupled with the graphics processor via at least one interconnect, or may be integrated within the graphics processor 2408 or system agent core 2410.

In some embodiments, a ring-based based interconnect 2412 is used to couple the internal components of the processor 2400. However, an alternative interconnect unit may be used, such as a point-to-point interconnect, a switched interconnect, or other techniques, including techniques well known in the art. In some embodiments, graphics processor 2408 couples with the ring-based interconnect 2412 via an I/O link 2413.

The exemplary I/O link 2413 represents at least one of multiple varieties of I/O interconnects, including an on package I/O interconnect which facilitates communication between various processor components and a high-performance embedded memory module 2418, such as an eDRAM module. In some embodiments, each of the processor cores 2402A-2402N and graphics processor 2408 use embedded memory modules 2418 as a shared Last Level Cache.

In some embodiments, processor cores 2402A-2402N are homogenous cores executing the same instruction set architecture. In another embodiment, processor cores 2402A-2402N are heterogeneous in terms of instruction set architecture (ISA), where one or more of processor cores 2402A-2402N execute a first instruction set, while at least one of the other cores executes a subset of the first instruction set or a different instruction set. In one embodiment processor cores 2402A-2402N are heterogeneous in terms of microarchitecture, where one or more cores having a relatively higher power consumption couple with one or more power cores having a lower power consumption. Additionally, processor 2400 can be implemented on one or more chips or as an SoC integrated circuit having the illustrated components, in addition to other components.

Figure 25:
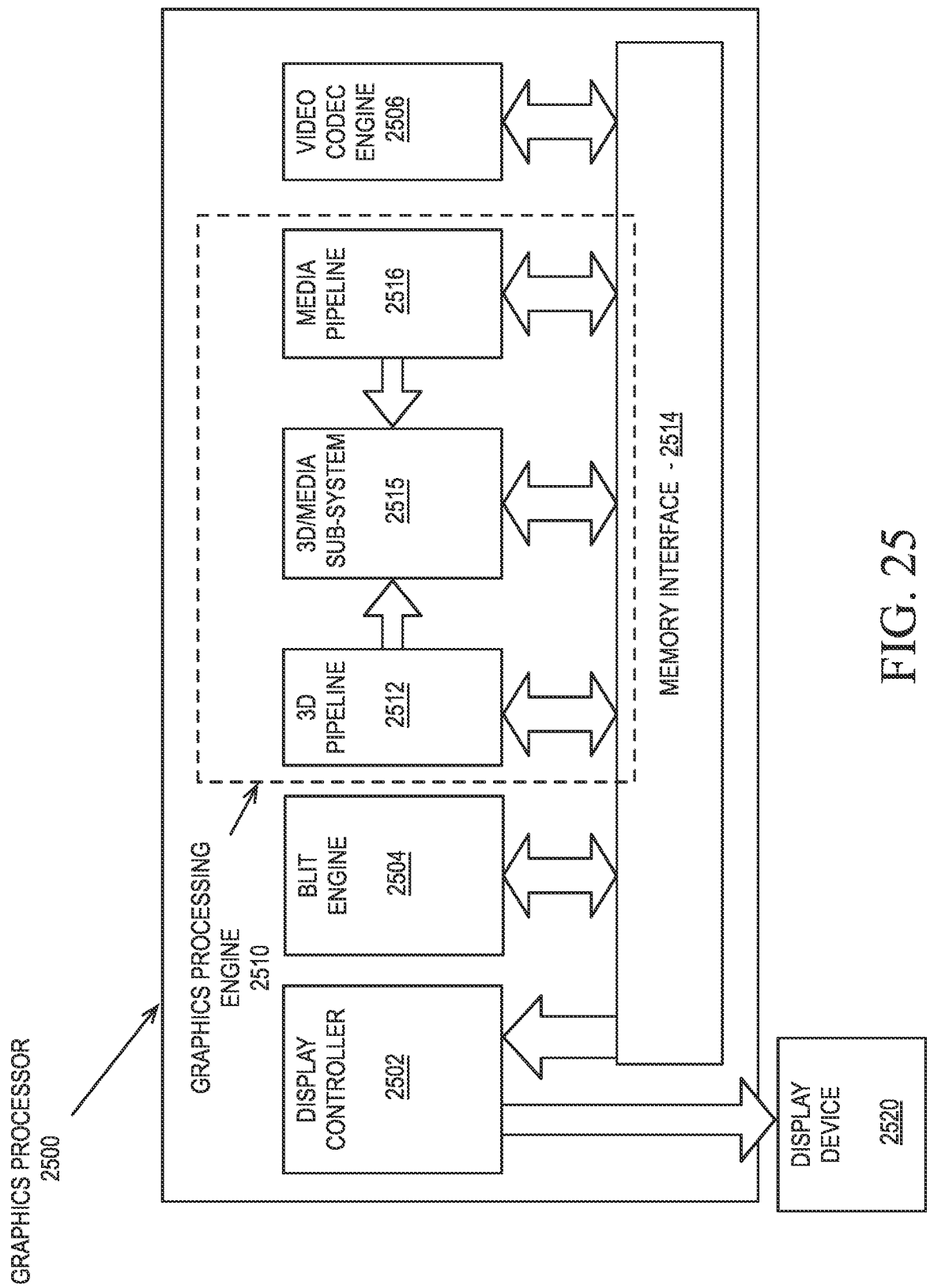
FIG. 25 is a block diagram of a graphics processor, according to an embodiment.

FIG. 25 is a block diagram of a graphics processor 2500, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 2500 includes a memory interface 2514 to access memory. Memory interface 2514 can be an interface to local memory, one or more internal caches, one or more shared external caches, and/or to system memory.

In some embodiments, graphics processor 2500 also includes a display controller 2502 to drive display output data to a display device 2520. Display controller 2502 includes hardware for one or more overlay planes for the display and composition of multiple layers of video or user interface elements. In some embodiments, graphics processor 2500 includes a video codec engine 2506 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture &

Television Engineers (SMPTE) 421M/VC-1, and Joint Photographic Experts Group (JPEG) formats such as JPEG, and Motion JPEG (MJPEG) formats.

In some embodiments, graphics processor 2500 includes a block image transfer (BLIT) engine 2504 to perform two-dimensional (2D) rasterizer operations including, for example, bit-boundary block transfers. However, in one embodiment, 2D graphics operations are performed using one or more components of graphics processing engine (GPE) 2510. In some embodiments, GPE 2510 is a compute engine for performing graphics operations, including three-dimensional (3D) graphics operations and media operations.

In some embodiments, GPE 2510 includes a 3D pipeline 2512 for performing 3D operations, such as rendering three-dimensional images and scenes using processing functions that act upon 3D primitive shapes (e.g., rectangle, triangle, etc.). The 3D pipeline 2512 includes programmable and fixed function elements that perform various tasks within the element and/or spawn execution threads to a 3D/Media sub-system 2515. While 3D pipeline 2512 can be used to perform media operations, an embodiment of GPE 2510 also includes a media pipeline 2516 that is specifically used to perform media operations, such as video post-processing and image enhancement.

In some embodiments, media pipeline 2516 includes fixed function or programmable logic units to perform one or more specialized media operations, such as video decode acceleration, video de-interlacing, and video encode acceleration in place of, or on behalf of video codec engine 2506. In some embodiments, media pipeline 2516 additionally includes a thread spawning unit to spawn threads for execution on 3D/Media sub-system 2515. The spawned threads perform computations for the media operations on one or more graphics execution units included in 3D/Media subsystem 2515.

In some embodiments, 3D/Media subsystem 2515 includes logic for executing threads spawned by 3D pipeline 2512 and media pipeline 2516. In one embodiment, the pipelines send thread execution requests to 3D/Media subsystem 2515, which includes thread dispatch logic for arbitrating and dispatching the various requests to available thread execution resources. The execution resources include an array of graphics execution units to process the 3D and media threads. In some embodiments, 3D/Media subsystem 2515 includes one or more internal caches for thread instructions and data. In some embodiments, the subsystem also includes shared memory, including registers and addressable memory, to share data between threads and to store output data.

Exemplary Additional Graphics Processing Engine

Figure 26:
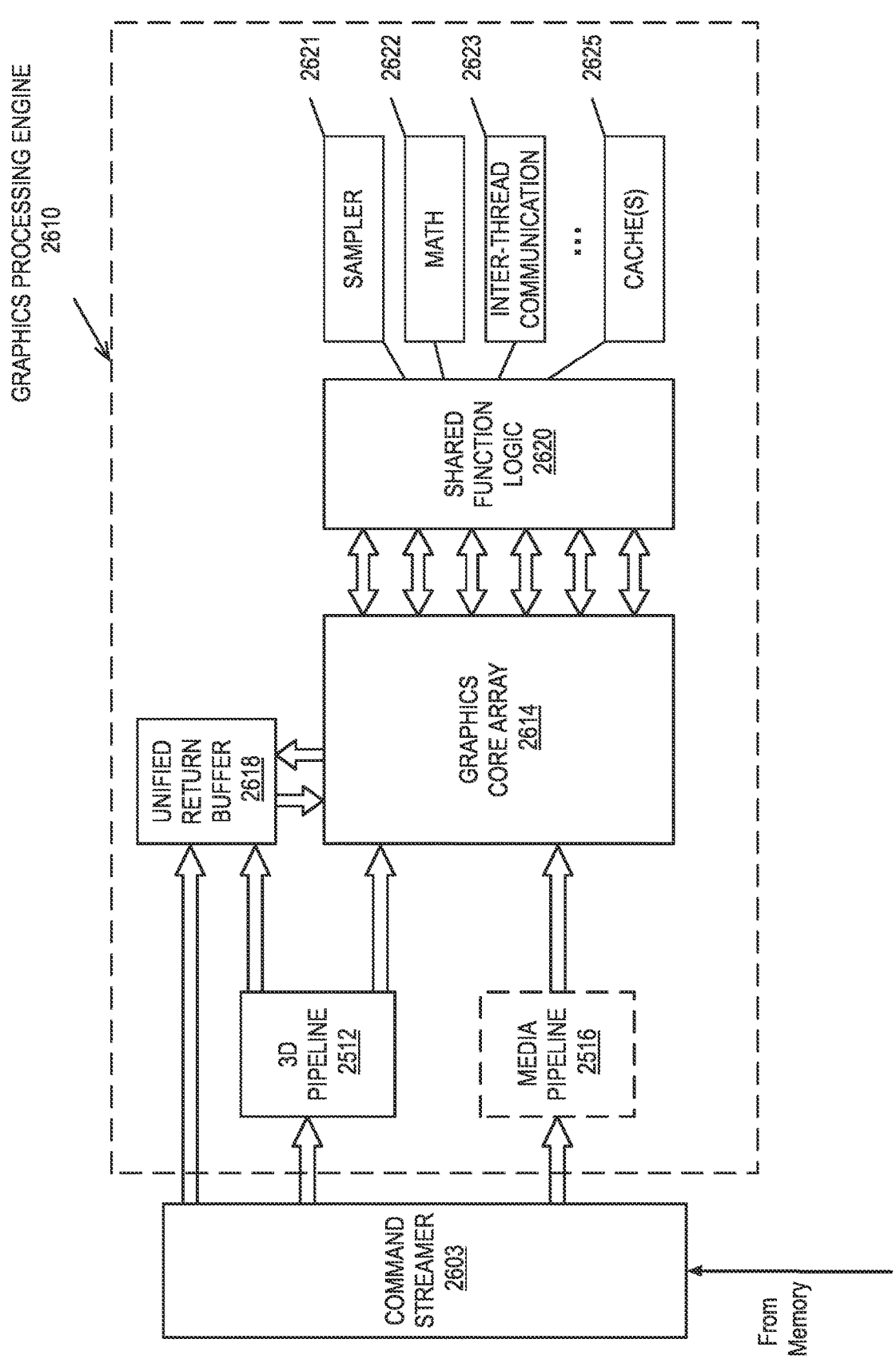
FIG. 26 is a block diagram of a graphics processing engine of a graphics processor in accordance with some embodiments.

FIG. 26 is a block diagram of a graphics processing engine 2610 of a graphics processor in accordance with some embodiments. In one embodiment, the graphics processing engine (GPE) 2610 is a version of the GPE 2510 shown in FIG. 25. Elements of FIG. 26 having the same reference numbers (or names) as the elements of any other figure herein can operate or function in any manner similar to that described elsewhere herein, but are not limited to such. For example, the 3D pipeline 2512 and media pipeline 2516 of FIG. 25 are illustrated. The media pipeline 2516 is optional in some embodiments of the GPE 2610 and may not be explicitly included within the GPE 2610. For example and in at least one embodiment, a separate media and/or image processor is coupled to the GPE 2610.

In some embodiments, GPE 2610 couples with or includes a command streamer 2603, which provides a command stream to the 3D pipeline 2512 and/or media pipelines 2516. In some embodiments, command streamer 2603 is coupled with memory, which can be system memory, or one or more of internal cache memory and shared cache memory. In some embodiments, command streamer 2603 receives commands from the memory and sends the commands to 3D pipeline 2512 and/or media pipeline 2516. The commands are directives fetched from a ring buffer, which stores commands for the 3D pipeline 2512 and media pipeline 2516. In one embodiment, the ring buffer can additionally include batch command buffers storing batches of multiple commands. The commands for the 3D pipeline 2512 can also include references to data stored in memory, such as but not limited to vertex and geometry data for the 3D pipeline 2512 and/or image data and memory objects for the media pipeline 2516. The 3D pipeline 2512 and media pipeline 2516 process the commands and data by performing operations via logic within the respective pipelines or by dispatching one or more execution threads to a graphics core array 2614.

In various embodiments the 3D pipeline 2512 can execute one or more shader programs, such as vertex shaders, geometry shaders, pixel shaders, fragment shaders, compute shaders, or other shader programs, by processing the instructions and dispatching execution threads to the graphics core array 2614. The graphics core array 2614 provides a unified block of execution resources. Multi-purpose execution logic (e.g., execution units) within the graphics core array 2614 includes support for various 3D API shader languages and can execute multiple simultaneous execution threads associated with multiple shaders.

In some embodiments the graphics core array 2614 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 2307 of FIG. 23 or core 2402A-2402N as in FIG. 24.

Output data generated by threads executing on the graphics core array 2614 can output data to memory in a unified return buffer (URB) 2618. The URB 2618 can store data for multiple threads. In some embodiments the URB 2618 may be used to send data between different threads executing on the graphics core array 2614. In some embodiments the URB 2618 may additionally be used for synchronization between threads on the graphics core array and fixed function logic within the shared function logic 2620.

In some embodiments, graphics core array 2614 is scalable, such that the array includes a variable number of graphics cores, each having a variable number of execution units based on the target power and performance level of GPE 2610. In one embodiment the execution resources are dynamically scalable, such that execution resources may be enabled or disabled as needed.

The graphics core array 2614 couples with shared function logic 2620 that includes multiple resources that are shared between the graphics cores in the graphics core array. The shared functions within the shared function logic 2620 are hardware logic units that provide specialized supplemental functionality to the graphics core array 2614. In various embodiments, shared function logic 2620 includes but is not limited to sampler 2621, math 2622, and inter-thread communication (ITC) 2623 logic. Additionally, some embodiments implement one or more cache(s) 2625 within the shared function logic 2620. A shared function is implemented where the demand for a given specialized function is insufficient for inclusion within the graphics core array 2614. Instead a single instantiation of that specialized function is implemented as a stand-alone entity in the shared function logic 2620 and shared among the execution resources within the graphics core array 2614. The precise set of functions that are shared between the graphics core array 2614 and included within the graphics core array 2614 varies between embodiments.

Figure 27:
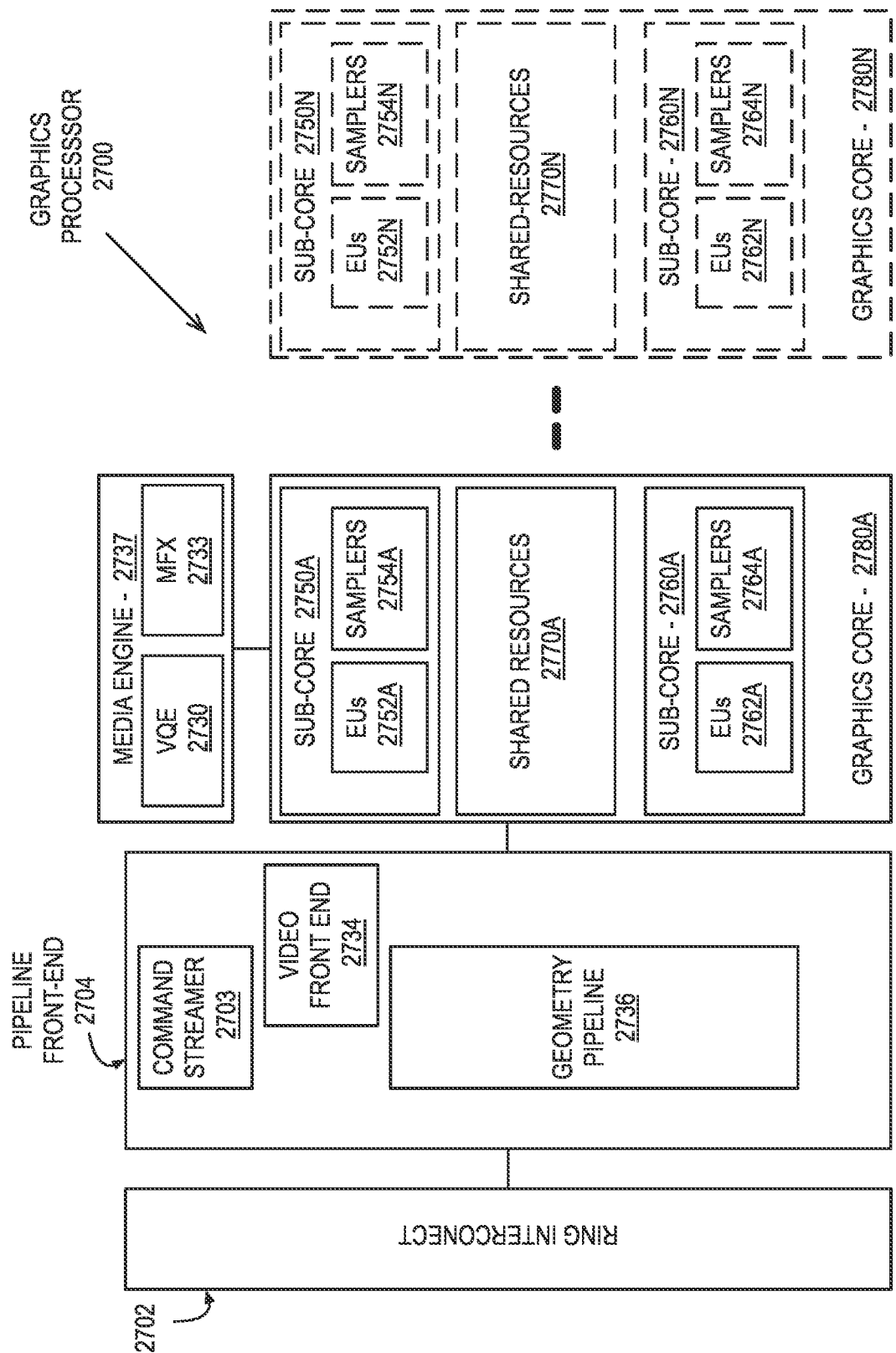
FIG. 27 is a block diagram of a graphics processor provided by an additional embodiment.

FIG. 27 is a block diagram of another embodiment of a graphics processor 2700. Elements of FIG. 27 having the same reference numbers (or names) as the elements of any other figure herein can operate or function in any manner similar to that described elsewhere herein, but are not limited to such.

In some embodiments, graphics processor 2700 includes a ring interconnect 2702, a pipeline front-end 2704, a media engine 2737, and graphics cores 2780A-2780N. In some embodiments, ring interconnect 2702 couples the graphics processor to other processing units, including other graphics processors or one or more general-purpose processor cores. In some embodiments, the graphics processor is one of many processors integrated within a multi-core processing system.

In some embodiments, graphics processor 2700 receives batches of commands via ring interconnect 2702. The incoming commands are interpreted by a command streamer 2703 in the pipeline front-end 2704. In some embodiments, graphics processor 2700 includes scalable execution logic to perform 3D geometry processing and media processing via the graphics core(s) 2780A-2780N. For 3D geometry processing commands, command streamer 2703 supplies commands to geometry pipeline 2736. For at least some media processing commands, command streamer 2703 supplies the commands to a video front-end 2734, which couples with a media engine 2737. In some embodiments, media engine 2737 includes a Video Quality Engine (VQE) 2730 for video and image post-processing and a multi-format encode/decode (MFX) 2733 engine to provide hardware-accelerated media data encode and decode. In some embodiments, geometry pipeline 2736 and media engine 2737 each generate execution threads for the thread execution resources provided by at least one graphics core 2780A.

In some embodiments, graphics processor 2700 includes scalable thread execution resources featuring modular cores 2780A-2780N (sometimes referred to as core slices), each having multiple sub-cores 2750A-550N, 2760A-2760N (sometimes referred to as core sub-slices). In some embodiments, graphics processor 2700 can have any number of graphics cores 2780A through 2780N. In some embodiments, graphics processor 2700 includes a graphics core 2780A having at least a first sub-core 2750A and a second sub-core 2760A. In other embodiments, the graphics processor is a low power processor with a single sub-core (e.g., 2750A). In some embodiments, graphics processor 2700 includes multiple graphics cores 2780A-2780N, each including a set of first sub-cores 2750A-2750N and a set of second sub-cores 2760A-2760N. Each sub-core in the set of first sub-cores 2750A-2750N includes at least a first set of execution units 2752A-2752N and media/texture samplers 2754A-2754N. Each sub-core in the set of second sub-cores 2760A-2760N includes at least a second set of execution units 2762A-2762N and samplers 2764A-2764N. In some embodiments, each sub-core 2750A-2750N, 2760A-2760N shares a set of shared resources 2770A-2770N. In some embodiments, the shared resources include shared cache memory and pixel operation logic. Other shared resources may also be included in the various embodiments of the graphics processor.

Exemplary Additional Execution Units

Figure 28:
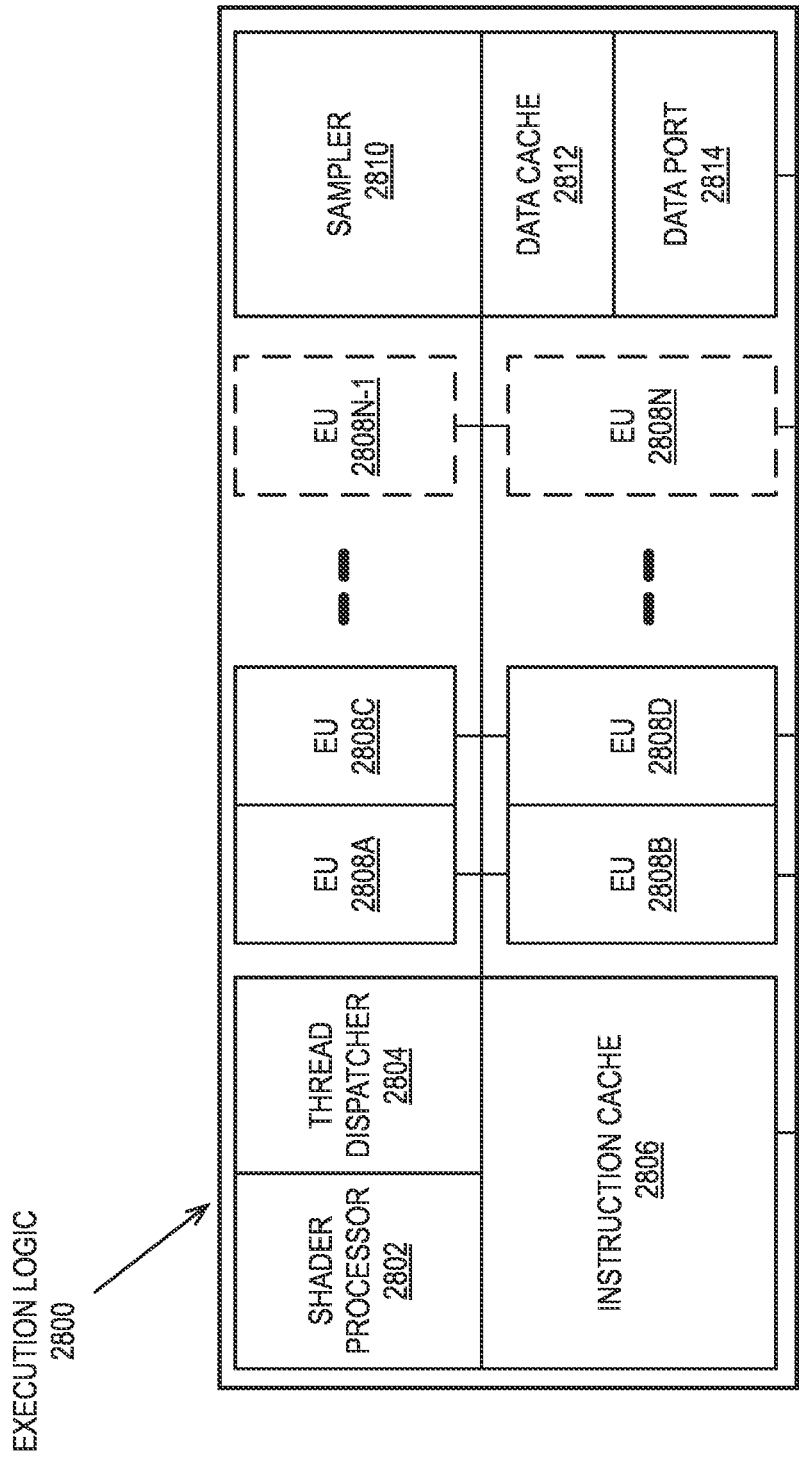
FIG. 28 illustrates thread execution logic including an array of processing elements employed in some embodiments.

FIG. 28 illustrates thread execution logic 2800 including an array of processing elements employed in some embodiments of a GPE. Elements of FIG. 28 having the same reference numbers (or names) as the elements of any other figure herein can operate or function in any manner similar to that described elsewhere herein, but are not limited to such.

In some embodiments, thread execution logic 2800 includes a shader processor 2802, a thread dispatcher 2804, instruction cache 2806, a scalable execution unit array including a plurality of execution units 2808A-2808N, a sampler 2810, a data cache 2812, and a data port 2814. In one embodiment the scalable execution unit array can dynamically scale by enabling or disabling one or more execution units (e.g., any of execution unit 2808A, 2808B, 2808C, 2808D, through 2808N−1 and 2808N) based on the computational requirements of a workload. In one embodiment the included components are interconnected via an interconnect fabric that links to each of the components. In some embodiments, thread execution logic 2800 includes one or more connections to memory, such as system memory or cache memory, through one or more of instruction cache 2806, data port 2814, sampler 2810, and execution units 2808A-2808N. In some embodiments, each execution unit (e.g. 2808A) is a stand-alone programmable general purpose computational unit that is capable of executing multiple simultaneous hardware threads while processing multiple data elements in parallel for each thread. In various embodiments, the array of execution units 2808A-2808N is scalable to include any number individual execution units.

In some embodiments, the execution units 2808A-2808N are primarily used to execute shader programs. A shader processor 2802 can process the various shader programs and dispatch execution threads associated with the shader programs via a thread dispatcher 2804. In one embodiment the thread dispatcher includes logic to arbitrate thread initiation requests from the graphics and media pipelines and instantiate the requested threads on one or more execution unit in the execution units 2808A-2808N. For example, the geometry pipeline (e.g., 2736 of FIG. 27) can dispatch vertex, tessellation, or geometry shaders to the thread execution logic 2800 (FIG. 28) for processing. In some embodiments, thread dispatcher 2804 can also process runtime thread spawning requests from the executing shader programs.

In some embodiments, the execution units 2808A-2808N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2808A-2808N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 2808A-2808N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 2808A-2808N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 2808A-2808N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 2806) are included in the thread execution logic 2800 to cache thread instructions for the execution units. In some embodiments, one or more data caches (e.g., 2812) are included to cache thread data during thread execution. In some embodiments, a sampler 2810 is included to provide texture sampling for 3D operations and media sampling for media operations. In some embodiments, sampler 2810 includes specialized texture or media sampling functionality to process texture or media data during the sampling process before providing the sampled data to an execution unit.

During execution, the graphics and media pipelines send thread initiation requests to thread execution logic 2800 via thread spawning and dispatch logic. Once a group of geometric objects has been processed and rasterized into pixel data, pixel processor logic (e.g., pixel shader logic, fragment shader logic, etc.) within the shader processor 2802 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 2802 then executes an application programming interface (API)-supplied pixel or fragment shader program. To execute the shader program, the shader processor 2802 dispatches threads to an execution unit (e.g., 2808A) via thread dispatcher 2804. In some embodiments, shader processor 2802 uses texture sampling logic in the sampler 2810 to access texture data in texture maps stored in memory. Arithmetic operations on the texture data and the input geometry data compute pixel color data for each geometric fragment, or discards one or more pixels from further processing.

In some embodiments, the data port 2814 provides a memory access mechanism for the thread execution logic 2800 output processed data to memory for processing on a graphics processor output pipeline. In some embodiments, the data port 2814 includes or couples to one or more cache memories (e.g., data cache 2812) to cache data for memory access via the data port.

FIG. 29 is a block diagram illustrating graphics processor instruction formats 2900 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, the graphics processor instruction formats 2900 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 2910. A 64-bit compacted instruction format 2930 is available for some instructions based on the selected instruction, instruction options, and number of operands. The native 128-bit instruction format 2910 provides access to all instruction options, while some options and operations are restricted in the 64-bit format 2930. The native instructions available in the 64-bit format 2930 vary by embodiment. In some embodiments, the instruction is compacted in part using a set of index values in an index field 2913. The execution unit hardware references a set of compaction tables based on the index values and uses the compaction table outputs to reconstruct a native instruction in the 128-bit instruction format 2910.

For each format, instruction opcode 2912 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2914 enables control over certain execution options, such as channels selection (e.g., predication) and data channel order (e.g., swizzle). For instructions in the 128-bit instruction format 2910 an exec-size field 2916 limits the number of data channels that will be executed in parallel. In some embodiments, exec-size field 2916 is not available for use in the 64-bit compact instruction format 2930.

Some execution unit instructions have up to three operands including two source operands, src0 2920, src1 2922, and one destination 2918. In some embodiments, the execution units support dual destination instructions, where one of the destinations is implied. Data manipulation instructions can have a third source operand (e.g., SRC2 2924), where the instruction opcode 2912 determines the number of source operands. An instruction's last source operand can be an immediate (e.g., hard-coded) value passed with the instruction.

In some embodiments, the 128-bit instruction format 2910 includes an access/address mode field 2926 specifying, for example, whether direct register addressing mode or indirect register addressing mode is used. When direct register addressing mode is used, the register address of one or more operands is directly provided by bits in the instruction.

In some embodiments, the 128-bit instruction format 2910 includes an access/address mode field 2926, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 2926 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 2912 bit-fields to simplify Opcode decode 2940. For an 8-bit opcode, bits 4, 5, and 6 allow the execution unit to determine the type of opcode. The precise opcode grouping shown is merely an example. In some embodiments, a move and logic opcode group 2942 includes data movement and logic instructions (e.g., move (mov), compare (cmp)). In some embodiments, move and logic group 2942 shares the five most significant bits (MSB), where move (mov) instructions are in the form of 0000xxxxb and logic instructions are in the form of 0001xxxxb. A flow control instruction group 2944 (e.g., call, jump (jmp)) includes instructions in the form of 000xxxxb (e.g., 0x20). A miscellaneous instruction group 2946 includes a mix of instructions, including synchronization instructions (e.g., wait, send) in the form of 0011xxxxb (e.g., 0x30). A parallel math instruction group 2948 includes component-wise arithmetic instructions (e.g., add, multiply (mul)) in the form of 0100xxxxb (e.g., 0x40). The parallel math group 2948 performs the arithmetic operations in parallel across data channels. The vector math group 2950 includes arithmetic instructions (e.g., dp4) in the form of 0101xxxxb (e.g., 0x50). The vector math group performs arithmetic such as dot product calculations on vector operands.

Exemplary Additional Graphics Pipeline

Figure 30:
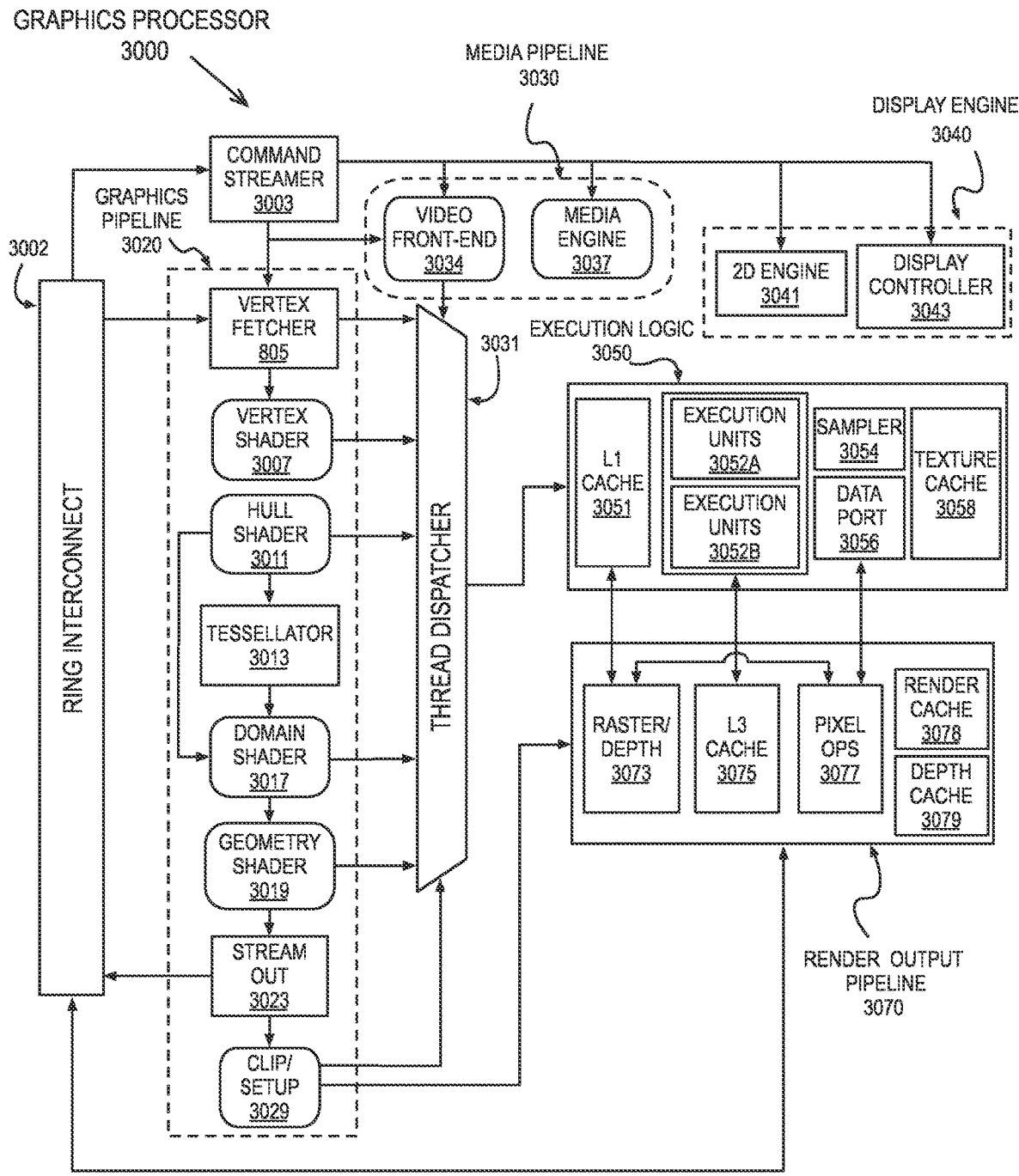
FIG. 30 is a block diagram of a graphics processor according to another embodiment.

FIG. 30 is a block diagram of another embodiment of a graphics processor 3000. Elements of FIG. 30 having the same reference numbers (or names) as the elements of any other figure herein can operate or function in any manner similar to that described elsewhere herein, but are not limited to such.

In some embodiments, graphics processor 3000 includes a graphics pipeline 3020, a media pipeline 3030, a display engine 3040, thread execution logic 3050, and a render output pipeline 3070. In some embodiments, graphics processor 3000 is a graphics processor within a multi-core processing system that includes one or more general purpose processing cores. The graphics processor is controlled by register writes to one or more control registers (not shown) or via commands issued to graphics processor 3000 via a ring interconnect 3002. In some embodiments, ring interconnect 3002 couples graphics processor 3000 to other processing components, such as other graphics processors or general-purpose processors. Commands from ring interconnect 3002 are interpreted by a command streamer 3003, which supplies instructions to individual components of graphics pipeline 3020 or media pipeline 3030.

In some embodiments, command streamer 3003 directs the operation of a vertex fetcher 3005 that reads vertex data from memory and executes vertex-processing commands provided by command streamer 3003. In some embodiments, vertex fetcher 3005 provides vertex data to a vertex shader 3007, which performs coordinate space transformation and lighting operations to each vertex. In some embodiments, vertex fetcher 3005 and vertex shader 3007 execute vertex-processing instructions by dispatching execution threads to execution units 3052A-3052B via a thread dispatcher 3031.

In some embodiments, execution units 3052A-3052B are an array of vector processors having an instruction set for performing graphics and media operations. In some embodiments, execution units 3052A-3052B have an attached L1 cache 3051 that is specific for each array or shared between the arrays. The cache can be configured as a data cache, an instruction cache, or a single cache that is partitioned to contain data and instructions in different partitions.

In some embodiments, graphics pipeline 3020 includes tessellation components to perform hardware-accelerated tessellation of 3D objects. In some embodiments, a programmable hull shader 3011 configures the tessellation operations. A programmable domain shader 3017 provides back-end evaluation of tessellation output. A tessellator 3013 operates at the direction of hull shader 3011 and contains special purpose logic to generate a set of detailed geometric objects based on a coarse geometric model that is provided as input to graphics pipeline 3020. In some embodiments, if tessellation is not used, tessellation components (e.g., hull shader 3011, tessellator 3013, and domain shader 3017) can be bypassed.

In some embodiments, complete geometric objects can be processed by a geometry shader 3019 via one or more threads dispatched to execution units 3052A-3052B, or can proceed directly to the clipper 3029. In some embodiments, the geometry shader operates on entire geometric objects, rather than vertices or patches of vertices as in previous stages of the graphics pipeline. If the tessellation is disabled the geometry shader 3019 receives input from the vertex shader 3007. In some embodiments, geometry shader 3019 is programmable by a geometry shader program to perform geometry tessellation if the tessellation units are disabled.

Before rasterization, a clipper 3029 processes vertex data. The clipper 3029 may be a fixed function clipper or a programmable clipper having clipping and geometry shader functions. In some embodiments, a rasterizer and depth test component 3073 in the render output pipeline 3070 dispatches pixel shaders to convert the geometric objects into their per pixel representations. In some embodiments, pixel shader logic is included in thread execution logic 3050. In some embodiments, an application can bypass the rasterizer and depth test component 3073 and access un-rasterized vertex data via a stream out unit 3023.

The graphics processor 3000 has an interconnect bus, interconnect fabric, or some other interconnect mechanism that allows data and message passing amongst the major components of the processor. In some embodiments, execution units 3052A-3052B and associated cache(s) 3051, texture and media sampler 3054, and texture/sampler cache 3058 interconnect via a data port 3056 to perform memory access and communicate with render output pipeline components of the processor. In some embodiments, sampler 3054, caches 3051, 3058 and execution units 3052A-3052B each have separate memory access paths.

In some embodiments, render output pipeline 3070 contains a rasterizer and depth test component 3073 that converts vertex-based objects into an associated pixel-based representation. In some embodiments, the rasterizer logic includes a windower/masker unit to perform fixed function triangle and line rasterization. An associated render cache 3078 and depth cache 3079 are also available in some embodiments. A pixel operations component 3077 performs pixel-based operations on the data, though in some instances, pixel operations associated with 2D operations (e.g. bit block image transfers with blending) are performed by the 2D engine 3041, or substituted at display time by the display controller 3043 using overlay display planes. In some embodiments, a shared L3 cache 3075 is available to all graphics components, allowing the sharing of data without the use of main system memory.

In some embodiments, graphics processor media pipeline 3030 includes a media engine 3037 and a video front-end 3034. In some embodiments, video front-end 3034 receives pipeline commands from the command streamer 3003. In some embodiments, media pipeline 3030 includes a separate command streamer. In some embodiments, video front-end 3034 processes media commands before sending the command to the media engine 3037. In some embodiments, media engine 3037 includes thread spawning functionality to spawn threads for dispatch to thread execution logic 3050 via thread dispatcher 3031.

In some embodiments, graphics processor 3000 includes a display engine 3040. In some embodiments, display engine 3040 is external to the graphics processor 3000 and couples with the graphics processor via the ring interconnect 3002, or some other interconnect bus or fabric. In some embodiments, display engine 3040 includes a 2D engine 3041 and a display controller 3043. In some embodiments, display engine 3040 contains special purpose logic capable of operating independently of the 3D pipeline. In some embodiments, display controller 3043 couples with a display device (not shown), which may be a system integrated display device, as in a laptop computer, or an external display device attached via a display device connector.

In some embodiments, graphics pipeline 3020 and media pipeline 3030 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 31A is a block diagram illustrating a graphics processor command format 3100 according to some embodiments. FIG. 31B is a block diagram illustrating a graphics processor command sequence 3110 according to an embodiment. The solid lined boxes in FIG. 31A illustrate the components that are generally included in a graphics command while the dashed lines include components that are optional or that are only included in a sub-set of the graphics commands. The exemplary graphics processor command format 3100 of FIG. 31A includes data fields to identify a target client 3102 of the command, a command operation code (opcode) 3104, and the relevant data 3106 for the command. A sub-opcode 3105 and a command size 3108 are also included in some commands.

In some embodiments, client 3102 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 3104 and, if present, sub-opcode 3105 to determine the operation to perform. The client unit performs the command using information in data field 3106. For some commands an explicit command size 3108 is expected to specify the size of the command. In some embodiments, the command parser automatically determines the size of at least some of the commands based on the command opcode. In some embodiments commands are aligned via multiples of a double word.

The flow diagram in FIG. 31B shows an exemplary graphics processor command sequence 3110. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 3110 may begin with a pipeline flush command 3112 to cause any active graphics pipeline to complete the currently pending commands for the pipeline. In some embodiments, the 3D pipeline 3122 and the media pipeline 3124 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 3112 can be used for pipeline synchronization or before placing the graphics processor into a low power state.

In some embodiments, a pipeline select command 3113 is used when a command sequence requires the graphics processor to explicitly switch between pipelines. In some embodiments, a pipeline select command 3113 is required only once within an execution context before issuing pipeline commands unless the context is to issue commands for both pipelines. In some embodiments, a pipeline flush command 3112 is required immediately before a pipeline switch via the pipeline select command 3113.

In some embodiments, a pipeline control command 3114 configures a graphics pipeline for operation and is used to program the 3D pipeline 3122 and the media pipeline 3124. In some embodiments, pipeline control command 3114 configures the pipeline state for the active pipeline. In one embodiment, the pipeline control command 3114 is used for pipeline synchronization and to clear data from one or more cache memories within the active pipeline before processing a batch of commands.

In some embodiments, commands for the return buffer state 3116 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 3116 includes selecting the size and number of return buffers to use for a set of pipeline operations.

The remaining commands in the command sequence differ based on the active pipeline for operations. Based on a pipeline determination 3120, the command sequence is tailored to the 3D pipeline 3122 beginning with the 3D pipeline state 3130 or the media pipeline 3124 beginning at the media pipeline state 3140.

The commands to configure the 3D pipeline state 3130 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 3130 commands are also able to selectively disable or bypass certain pipeline elements if those elements will not be used.

In some embodiments, 3D primitive 3132 command is used to submit 3D primitives to be processed by the 3D pipeline. Commands and associated parameters that are passed to the graphics processor via the 3D primitive 3132 command are forwarded to the vertex fetch function in the graphics pipeline. The vertex fetch function uses the 3D primitive 3132 command data to generate vertex data structures. The vertex data structures are stored in one or more return buffers. In some embodiments, 3D primitive 3132 command is used to perform vertex operations on 3D primitives via vertex shaders. To process vertex shaders, 3D pipeline 3122 dispatches shader execution threads to graphics processor execution units.

In some embodiments, 3D pipeline 3122 is triggered via an execute 3134 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 3110 follows the media pipeline 3124 path when performing media operations. In general, the specific use and manner of programming for the media pipeline 3124 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 3124 is configured in a similar manner as the 3D pipeline 3122. A set of commands to configure the media pipeline state 3140 are dispatched or placed into a command queue before the media object commands 3142. In some embodiments, media pipeline state commands 3140 include data to configure the media pipeline elements that will be used to process the media objects. This includes data to configure the video decode and video encode logic within the media pipeline, such as encode or decode format. In some embodiments, commands to configure the media pipeline state 3140 also support the use of one or more pointers to "indirect" state elements that contain a batch of state settings.

In some embodiments, media object commands 3142 supply pointers to media objects for processing by the media pipeline. The media objects include memory buffers containing video data to be processed. In some embodiments, all media pipeline states must be valid before issuing a media object command 3142. Once the pipeline state is configured and media object commands 3142 are queued, the media pipeline 3124 is triggered via an execute command 3144 or an equivalent execute event (e.g., register write). Output from media pipeline 3124 may then be post processed by operations provided by the 3D pipeline 3122 or the media pipeline 3124. In some embodiments, GPGPU operations are configured and executed in a similar manner as media operations.

Graphics Software Architecture

Figure 32:
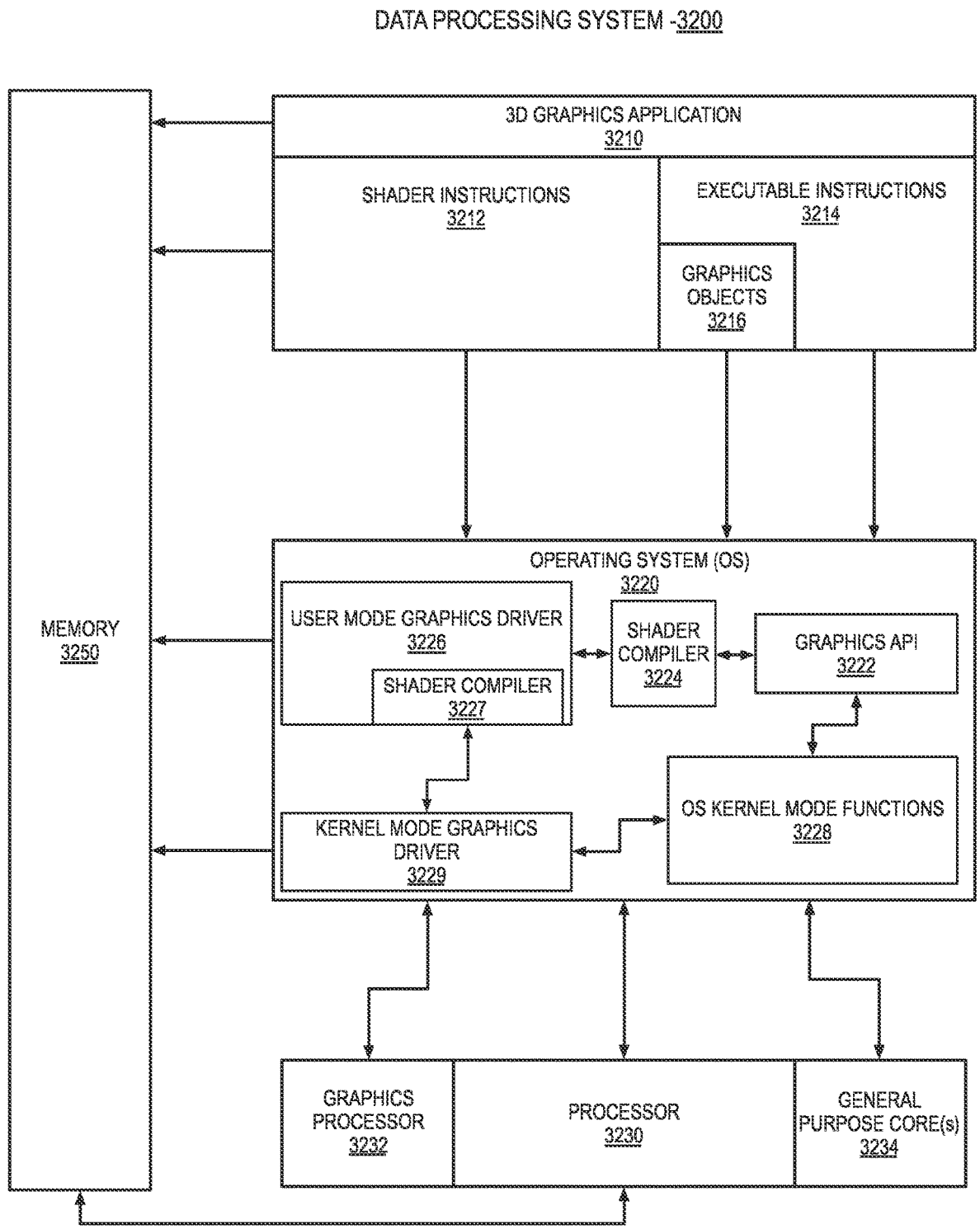
FIG. 32 illustrates exemplary graphics software architecture for a data processing system according to some embodiments.

FIG. 32 illustrates exemplary graphics software architecture for a data processing system 3200 according to some embodiments. In some embodiments, software architecture includes a 3D graphics application 3210, an operating system 3220, and at least one processor 3230. In some embodiments, processor 3230 includes a graphics processor 3232 and one or more general-purpose processor core(s) 3234. The graphics application 3210 and operating system 3220 each execute in the system memory 3250 of the data processing system.

In some embodiments, 3D graphics application 3210 contains one or more shader programs including shader instructions 3212. The shader language instructions may be in a high-level shader language, such as the High Level Shader Language (HLSL) or the OpenGL Shader Language (GLSL). The application also includes executable instructions 3214 in a machine language suitable for execution by the general-purpose processor core 3234. The application also includes graphics objects 3216 defined by vertex data.

In some embodiments, operating system 3220 is a Microsoft® Windows® operating system from the Microsoft Corporation, a proprietary UNIX-like operating system, or an open source UNIX-like operating system using a variant of the Linux kernel. The operating system 3220 can support a graphics API 3222 such as the Direct3D API, the OpenGL API, or the Vulkan API. When the Direct3D API is in use, the operating system 3220 uses a front-end shader compiler 3224 to compile any shader instructions 3212 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 3210. In some embodiments, the shader instructions 3212 are provided in an intermediate form, such as a version of the Standard Portable Intermediate Representation (SPIR) used by the Vulkan API.

In some embodiments, user mode graphics driver 3226 contains a back-end shader compiler 3227 to convert the shader instructions 3212 into a hardware specific representation. When the OpenGL API is in use, shader instructions 3212 in the GLSL high-level language are passed to a user mode graphics driver 3226 for compilation. In some embodiments, user mode graphics driver 3226 uses operating system kernel mode functions 3228 to communicate with a kernel mode graphics driver 3229. In some embodiments, kernel mode graphics driver 3229 communicates with graphics processor 3232 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 33:
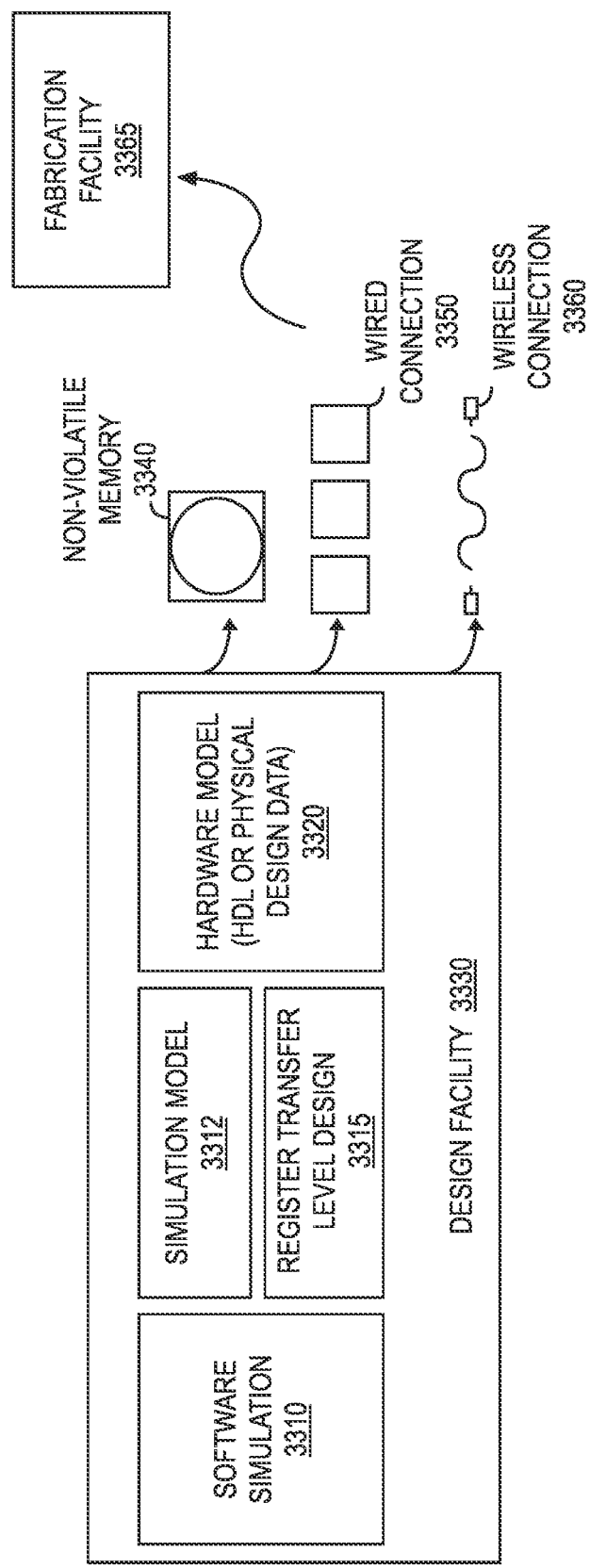
FIG. 33 is a block diagram illustrating an IP core development system, according to an embodiment.

FIG. 33 is a block diagram illustrating an IP core development system 3300 that may be used to manufacture an integrated circuit to perform operations according to an embodiment. The IP core development system 3300 may be used to generate modular, re-usable designs that can be incorporated into a larger design or used to construct an entire integrated circuit (e.g., an SOC integrated circuit). A design facility 3330 can generate a software simulation 3310 of an IP core design in a high-level programming language (e.g., C/C++). The software simulation 3310 can be used to design, test, and verify the behavior of the IP core using a simulation model 3312. The simulation model 3312 may include functional, behavioral, and/or timing simulations. A register transfer level (RTL) design 3315 can then be created or synthesized from the simulation model 3312. The RTL design 3315 is an abstraction of the behavior of the integrated circuit that models the flow of digital signals between hardware registers, including the associated logic performed using the modeled digital signals. In addition to an RTL design 3315, lower-level designs at the logic level or transistor level may also be created, designed, or synthesized. Thus, the particular details of the initial design and simulation may vary.

The RTL design 3315 or equivalent may be further synthesized by the design facility into a hardware model 3320, which may be in a hardware description language (HDL), or some other representation of physical design data. The HDL may be further simulated or tested to verify the IP core design. The IP core design can be stored for delivery to a $3^{rd}$ party fabrication facility 3365 using non-volatile memory 3340 (e.g., hard disk, flash memory, or any non-volatile storage medium). Alternatively, the IP core design may be transmitted (e.g., via the Internet) over a wired connection 3350 or wireless connection 3360. The fabrication facility 3365 may then fabricate an integrated circuit that is based at least in part on the IP core design. The fabricated integrated circuit can be configured to perform operations in accordance with at least one embodiment described herein.

Exemplary System on a Chip Integrated Circuit

Figure 34:
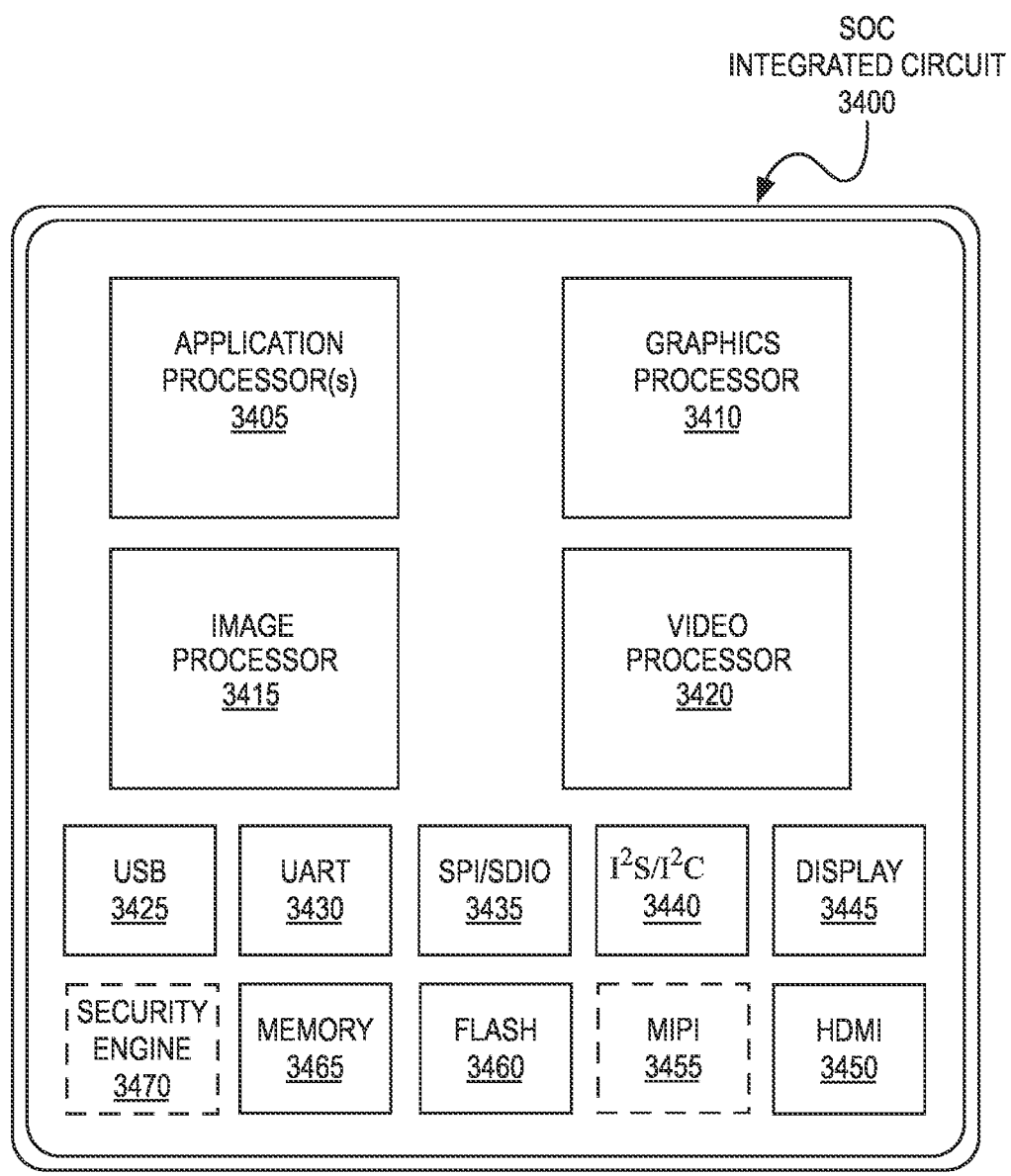
FIG. 34 is a block diagram illustrating an exemplary system on a chip integrated circuit, according to an embodiment.
Figure 35:
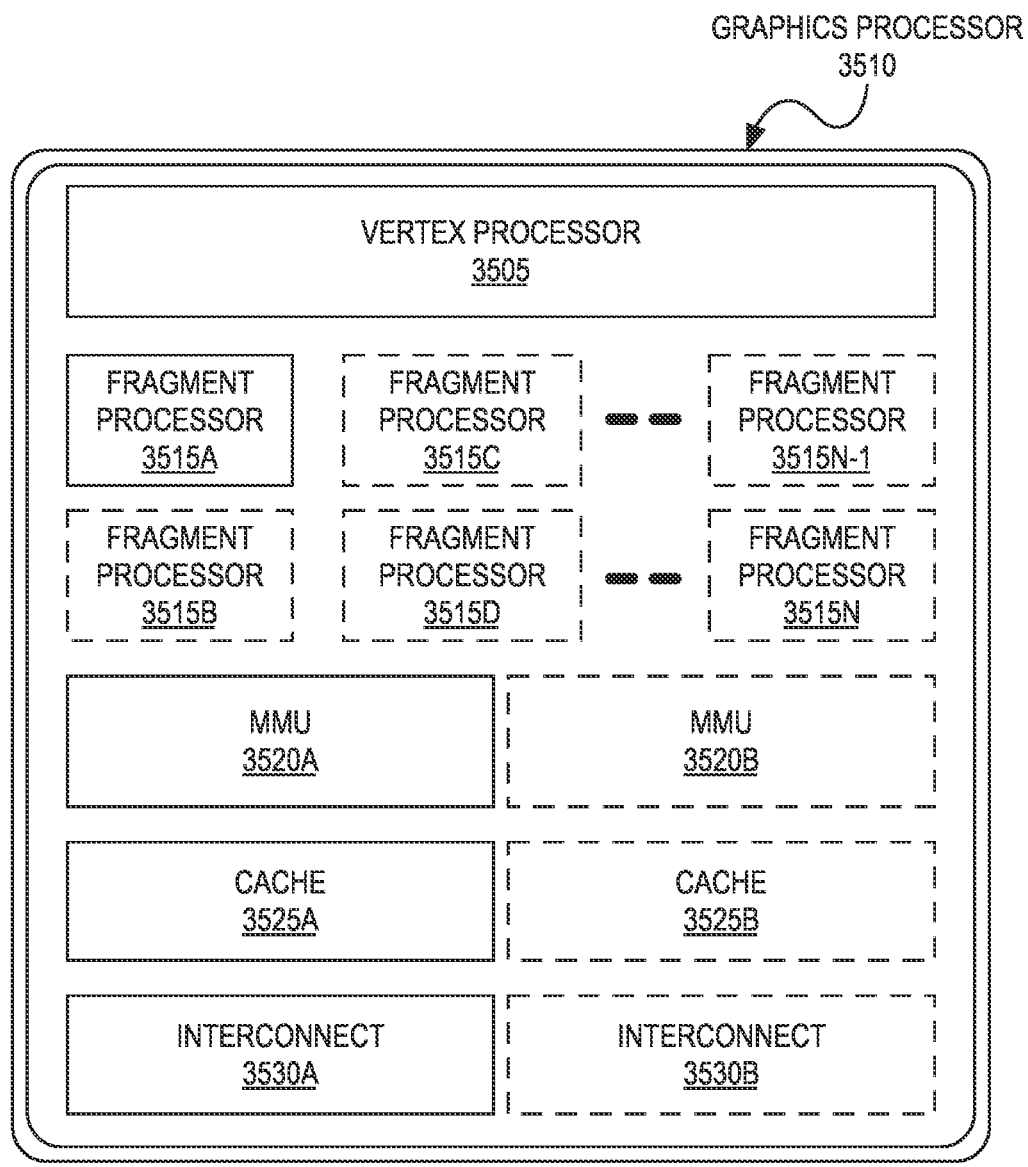
FIG. 35 is a block diagram illustrating an additional graphics processor, according to an embodiment.
Figure 36:
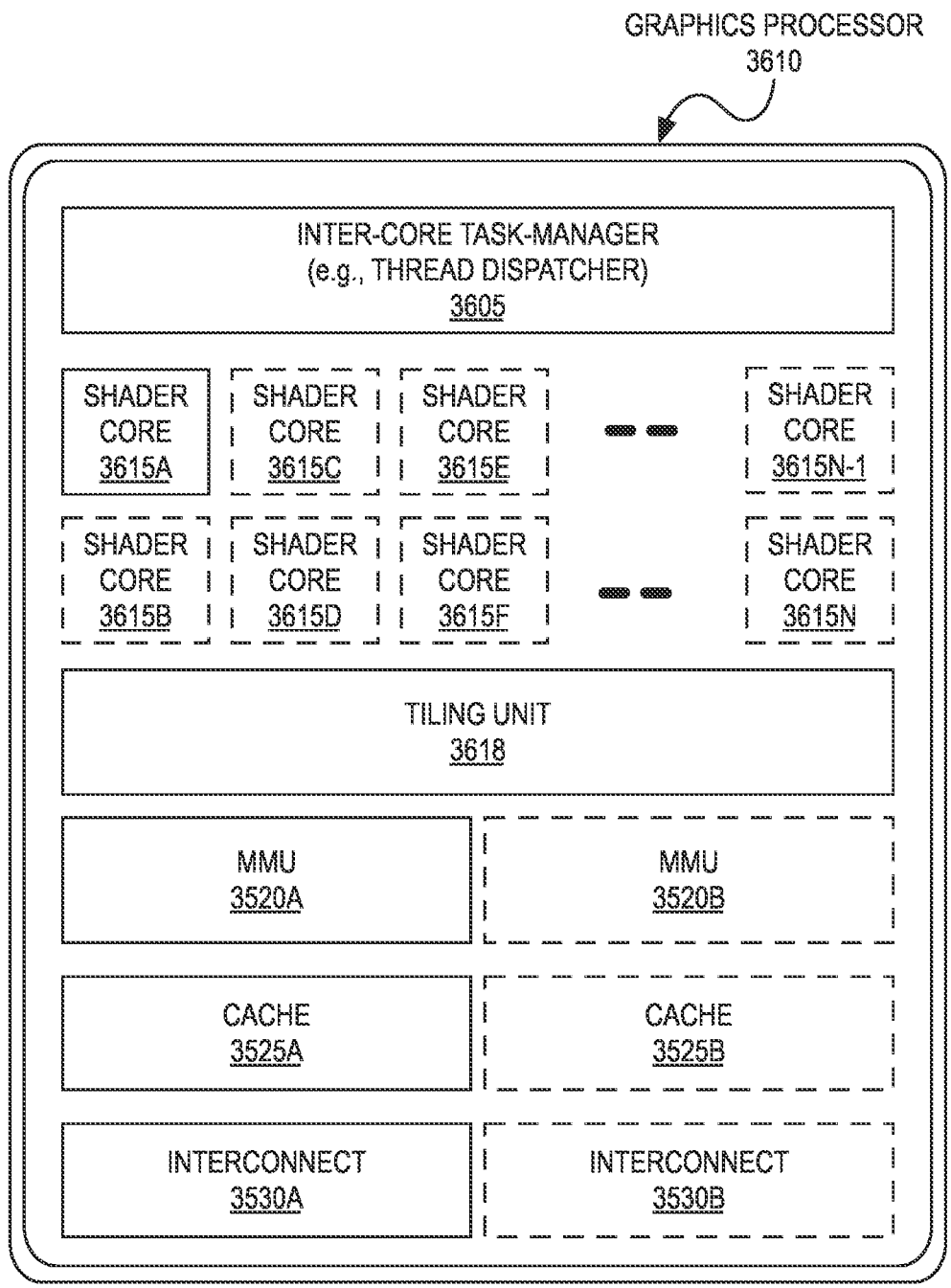
FIG. 36 is a block diagram illustrating an additional exemplary graphics processor of a system on a chip integrated circuit, according to an embodiment.

FIGS. 34-36 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 34 is a block diagram illustrating an exemplary system on a chip integrated circuit 3400 that may be fabricated using one or more IP cores, according to an embodiment. Exemplary integrated circuit 3400 includes one or more application processor(s) 3405 (e.g., CPUs), at least one graphics processor 3410, and may additionally include an image processor 3415 and/or a video processor 3420, any of which may be a modular IP core from the same or multiple different design facilities. Integrated circuit 3400 includes peripheral or bus logic including a USB controller 3425, UART controller 3430, an SPI/SDIO controller 3435, and an $I^2S/I^2C$ controller 3440. Additionally, the integrated circuit can include a display device 3445 coupled to one or more of a high-definition multimedia interface (HDMI) controller 3450 and a mobile industry processor interface (MIPI) display interface 3455. Storage may be provided by a flash memory subsystem 3460 including flash memory and a flash memory controller. Memory interface may be provided via a memory controller 3465 for access to SDRAM or SRAM memory devices. Some integrated circuits additionally include an embedded security engine 3470.

FIG. 35 is a block diagram illustrating an exemplary graphics processor 3510 of a system on a chip integrated circuit that may be fabricated using one or more IP cores, according to an embodiment. Graphics processor 3510 can be a variant of the graphics processor 3410 of FIG. 34. Graphics processor 3510 includes a vertex processor 3505 and one or more fragment processor(s) 3515A-3515N (e.g., 3515A, 3515B, 3515C, 3515D, through 3515N-1, and 3515N). Graphics processor 3510 can execute different shader programs via separate logic, such that the vertex processor 3505 is optimized to execute operations for vertex shader programs, while the one or more fragment processor(s) 3515A-3515N execute fragment (e.g., pixel) shading operations for fragment or pixel shader programs. The vertex processor 3505 performs the vertex processing stage of the 3D graphics pipeline and generates primitives and vertex data. The fragment processor(s) 3515A-3515N use the primitive and vertex data generated by the vertex processor 3505 to produce a framebuffer that is displayed on a display device. In one embodiment, the fragment processor(s) 3515A-3515N are optimized to execute fragment shader programs as provided for in the OpenGL API, which may be used to perform similar operations as a pixel shader program as provided for in the Direct 3D API.

Graphics processor 3510 additionally includes one or more memory management units (MMUs) 3520A-3520B, cache(s) 3525A-3525B, and circuit interconnect(s) 3530A-3530B. The one or more MMU(s) 3520A-3520B provide for virtual to physical address mapping for graphics processor 3510, including for the vertex processor 3505 and/or fragment processor(s) 3515A-3515N, which may reference vertex or image/texture data stored in memory, in addition to vertex or image/texture data stored in the one or more cache(s) 3525A-3525B. In one embodiment the one or more MMU(s) 3520A-3520B may be synchronized with other MMUs within the system, including one or more MMUs associated with the one or more application processor(s) 3405, image processor 3415, and/or video processor 3420 of FIG. 34, such that each processor 3405-3420 can participate in a shared or unified virtual memory system. The one or more circuit interconnect(s) 3530A-3530B enable graphics processor 3510 to interface with other IP cores within the SoC, either via an internal bus of the SoC or via a direct connection, according to embodiments.

FIG. 36 is a block diagram illustrating an additional exemplary graphics processor 3610 of a system on a chip integrated circuit that may be fabricated using one or more IP cores, according to an embodiment. Graphics processor 3610 can be a variant of the graphics processor 3410 of FIG. 34. Graphics processor 3610 includes the one or more MMU(s) 3620A-3620B, caches 3625A-3625B, and circuit interconnects 3630A-3630B of the graphics processor 3610 of FIG. 36.

Graphics processor 3610 includes one or more shader core(s) 3615A-3615N (e.g., 3615A, 3615B, 3615C, 3615D, 3615E, 3615F, through 3615N−1, and 3615N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 3610 includes an inter-core task manager 3605, which acts as a thread dispatcher to dispatch execution threads to one or more shader cores 3615A-3615N and a tiling unit 3618 to accelerate tiling operations for tile-based rendering, in which rendering operations for a scene are subdivided in image space, for example to exploit local spatial coherence within a scene or to optimize use of internal caches.

Embodiments described herein can be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of non-transitory machine-readable media suitable for storing machine-executable instructions.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for a method of transmitting data between multiple compute nodes of a distributed compute system, the method comprising creating a global view of communication operations to be performed between the multiple compute nodes of the distributed compute system, the global view created using information specific to a machine learning model associated with the distributed compute system; using the global view to determine a communication cost of the communication operations; and automatically determining a number of network endpoints for use in transmitting the data between the multiple compute nodes of the distributed compute system.

One embodiment provides for a system to compute and distribute data for distributed training of a neural network, the system including system memory to store a set of trainable machine learning parameters and a library to facilitate data transmission during distributed training of the neural network; a fabric interface to enable transmission and receipt of data associated with the set of trainable machine learning parameters; a first set of general-purpose processor cores to execute instructions provided by the library, the instructions to control a data transmission library; and a general-purpose graphics processor to perform compute operations associated with machine learning framework workflow to generate gradient data for the trainable machine learning parameters, wherein the first set of general-purpose processor cores are to control the data transmission library to send and receive training data via the fabric interface during the machine learning framework workflow, the compute operations to overlap with communication operations to send and receive training data via the fabric interface, the communication operations performed via point-to-point communication primitives provided via the fabric interface.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing unit of a first distributed training node, the graphics processing unit comprising:
   a compute block including one or more processing clusters, the one or more processing clusters to perform compute operations associated with a machine learning framework workflow, the compute operations to generate gradient data associated with trainable parameters of a neural network;
a memory device to store gradient data during distributed training of the neural network, the gradient data stored at a memory address in the memory device; and
a fabric interface coupled with the memory device and the compute block, the fabric interface configured to transmit gradient data stored in the memory device according to a pre-defined communication operation, wherein the memory device is a physical memory device shared with the compute block and the fabric interface is to automatically transmit the gradient data stored in memory to a second distributed training node, the second distributed training node determined based on the memory address of the gradient data in the memory device.

2. The graphics processing unit as in claim 1, wherein the first distributed training node is mapped to a first memory address range in a distributed memory address space and the second distributed training node is mapped to a second memory address range in the distributed memory address space.

3. The graphics processing unit as in claim 2, wherein the fabric interface is configured to:
detect a write of the gradient data to the memory address of the gradient data in the memory device;
determine that the memory address of the gradient data in the memory device is mapped to a memory address range associated with the second distributed training node; and
transmit the gradient data to the second distributed training node.

4. The graphics processing unit as in claim 3, wherein the fabric interface is configured to:
receive a message from the second distributed training node having data and a target memory address, wherein the target memory address is a memory address in the first memory address range in the distributed memory address space; and
write the data to the memory device at a memory address in the memory address range that is mapped to the first memory address range in the distributed memory address space.

5. The graphics processing unit as in claim 4, the fabric interface including a cache to store gradient data before transmission of the gradient data or after receipt of the gradient data.

6. The graphics processing unit as in claim 4, wherein the fabric interface has a memory address space mapped to at least a portion of the memory device.

7. The graphics processing unit as in claim 6, wherein the compute block and the fabric interface have a unified memory address space.

8. A method comprising:
performing computing operations associated with a machine learning framework workflow via a compute block of a general purpose graphics processor of a first distributed training node, the computing operations performed to generate gradient data associated with trainable parameters of a neural network during distributed training of the neural network;
storing the gradient data on a memory device of the general purpose graphics processor, the gradient data stored at a memory address in the memory device; and
automatically transmitting the gradient data stored in memory to a second distributed training node via a fabric interface coupled with the memory device and the compute block, the gradient data automatically transmitted to the second distributed training node, the second distributed training node determined based on the memory address of the gradient data in the memory device.

9. The method as in claim 8, further comprising automatically transmitting the gradient data according to a pre-defined communication operation.

10. The method as in claim 9, further comprising:
mapping the first distributed training node to a first memory address range in a distributed memory address space; and
mapping the second distributed training node to a second memory address range in the distributed memory address space.

11. The method as in claim 10, further comprising, via the fabric interface:
detecting a write of the gradient data to the memory address of the gradient data in the memory device;
determining that the memory address of the gradient data in the memory device is mapped to a memory address range associated with the second distributed training node; and
transmitting the gradient data to the second distributed training node.

12. The method as in claim 11, further comprising, via the fabric interface:
receiving a message from the second distributed training node having data and a target memory address, wherein the target memory address is a memory address in the first memory address range in the distributed memory address space; and
writing the data to the memory device at a memory address in the memory address range that is mapped to the first memory address range in the distributed memory address space.

13. The method as in claim 12, further comprising storing gradient data in a cache within the fabric interface before transmitting the gradient data or after receiving the gradient data.

14. A system comprising:
an interconnect fabric; and
a first distributed training node including a graphics processing unit comprising:
a compute block including one or more processing clusters, the one or more processing clusters to perform compute operations associated with a machine learning framework workflow, the compute operations to generate gradient data associated with trainable parameters of a neural network;
a memory device to store gradient data during distributed training of the neural network, the gradient data stored at a memory address in the memory device; and
a fabric interface coupled with the memory device and the compute block, the fabric interface configured to transmit gradient data stored in the memory device according to a pre-defined communication operation, wherein the memory device is a physical memory device shared with the compute block and the fabric interface is to automatically transmit the gradient data stored in memory to a second distributed training node, the second distributed training node determined automatically based on the memory address of the gradient data in the memory device.

15. The system as in claim 14, wherein the first distributed training node is mapped to a first memory address range in a distributed memory address space and the second distributed training node is mapped to a second memory address range in the distributed memory address space.

16. The system as in claim 15, wherein the fabric interface is configured to:
   detect a write of the gradient data to the memory address of the gradient data in the memory device;
   determine that the memory address of the gradient data in the memory device is mapped to a memory address range associated with the second distributed training node; and
   transmit the gradient data to the second distributed training node.

17. The system as in claim 16, wherein the fabric interface is configured to:
   receive a message from the second distributed training node having data and a target address, wherein the target address is a memory address in the first memory address range in the distributed memory address space; and
   write the data to the memory device at a memory address in the memory address range that is mapped to the first memory address range in the distributed memory address space.

18. The system as in claim 17, the fabric interface including a cache to store gradient data before transmission of the gradient data or after receipt of the gradient data.

19. The system as in claim 17, wherein the fabric interface has a memory address space mapped to at least a portion of the memory device.

20. The system as in claim 19, wherein the compute block and the fabric interface have a unified memory address space.

\* \* \* \* \*